US010802161B1

(12) United States Patent
Newman

(10) Patent No.: US 10,802,161 B1
(45) Date of Patent: *Oct. 13, 2020

(54) RADIATION DETECTOR WITH TWO-DIMENSIONAL DIRECTIONALITY

(71) Applicant: David Edward Newman, Poway, CA (US)

(72) Inventor: David Edward Newman, Poway, CA (US)

(*) Notice: Subject to any disclaimer, the term of this patent is extended or adjusted under 35 U.S.C. 154(b) by 174 days.

This patent is subject to a terminal disclaimer.

(21) Appl. No.: 16/407,762

(22) Filed: May 9, 2019

Related U.S. Application Data

(63) Continuation of application No. 16/111,445, filed on Aug. 24, 2018, now Pat. No. 10,302,777, which is a continuation of application No. 15/974,371, filed on May 8, 2018, now Pat. No. 10,101,472.

(60) Provisional application No. 62/569,581, filed on Oct. 8, 2017, provisional application No. 62/580,960, filed on Nov. 2, 2017, provisional application No. 62/626,115, filed on Feb. 4, 2018, provisional application No. 62/661,072, filed on Apr. 22, 2018.

(51) Int. Cl.
*G01T 1/208* (2006.01)
*G01T 3/06* (2006.01)
*G01V 5/00* (2006.01)
*G01T 1/20* (2006.01)
*G01T 1/29* (2006.01)

(52) U.S. Cl.
CPC ............ *G01T 1/208* (2013.01); *G01T 1/2002* (2013.01); *G01T 1/2018* (2013.01); *G01T 1/2907* (2013.01); *G01T 3/06* (2013.01); *G01V 5/0075* (2013.01)

(58) Field of Classification Search
CPC ................................ G01T 3/06; G01T 1/2002
See application file for complete search history.

(56) References Cited

U.S. PATENT DOCUMENTS

| | | | |
|---|---|---|---|
| 3,047,721 A | 9/1959 | Folsom |
| 3,436,539 A | 4/1969 | Wilcox |
| 3,581,090 A | 5/1971 | Brown |
| 5,345,084 A | 9/1994 | Byrd |
| 5,665,970 A | 9/1997 | Kronenberg |
| 7,026,627 B2 | 4/2006 | Fowler |
| 7,470,909 B2 | 12/2008 | Larsson |
| 7,655,912 B2 | 2/2010 | Shirakawa |

(Continued)

*Primary Examiner* — Yara B Green

(57) ABSTRACT

Disclosed is a directional gamma ray or neutron detector that locates a source both horizontally and vertically. In some embodiments, the detector comprises four "rod" scintillators around a shield, and an orthogonal "panel" scintillator mounted frontward of the rod scintillators. The azimuthal angle of the source may be calculated according to the detection rates of the rod scintillators, while the polar angle of the source may be calculated from the panel scintillator rate using a predetermined angular correlation function. Thus, the exact location of the source can be found from a single data set without iterative rotations. Embodiments of the detector enable rapid detection and precise localization of clandestine nuclear and radiological weapons in applications ranging from hand-held survey meters and walk-through portals, to vehicle cargo inspection stations and mobile area scanners. Such detectors are needed to detect clandestine nuclear weapons worldwide.

20 Claims, 24 Drawing Sheets

(56) References Cited

U.S. PATENT DOCUMENTS

| | | |
|---|---|---|
| 7,734,447 B2 | 6/2010 | Shirakawa |
| 7,952,079 B2 | 5/2011 | Neustadter |
| 7,994,482 B2 | 8/2011 | Frank |
| 8,067,742 B2 | 11/2011 | Winso |
| 8,198,600 B2 | 6/2012 | Neustadter |
| 8,242,456 B1 | 8/2012 | Hecht |
| 8,247,776 B2 | 8/2012 | Peng |
| 8,319,188 B2 | 11/2012 | Ramsden |
| 8,796,636 B2 | 8/2014 | Kline |
| 8,930,165 B2 | 1/2015 | Vilim |
| 9,158,012 B2 | 10/2015 | Willis |
| 9,575,189 B2 | 2/2017 | Groves |
| 10,024,985 B1 | 7/2018 | Newman |
| 2005/0121618 A1* | 6/2005 | Fowler, Jr. .............. G01T 1/169 250/394 |
| 2006/0065840 A1 | 3/2006 | Joung |
| 2007/0221854 A1 | 9/2007 | Shirakawa |
| 2008/0048123 A1 | 2/2008 | Larsson |
| 2009/0309032 A1* | 12/2009 | Ramsden .................. G01T 7/00 250/370.1 |
| 2010/0006769 A1* | 1/2010 | Kraft ..................... G01T 1/2907 250/370.11 |
| 2013/0329859 A1 | 12/2013 | Groves |

\* cited by examiner

RADIATION DETECTOR WITH TWO-DIMENSIONAL DIRECTIONALITY

CROSS REFERENCES TO RELATED APPLICATIONS

This application is a continuation of U.S. patent application Ser. No. 16/111,445 entitled "Radiation Detector with Two-Dimensional Directionality" and filed on Aug. 24, 2018, which is a continuation of U.S. patent application Ser. No. 15/974,371 entitled "Radiation Detector with Two-Dimensional Directionality" and filed on May 8, 2018, which claims the benefit of U.S. Provisional Patent Application No. 62/569,581 entitled "Gamma Ray Detector with Two-Dimensional Directionality" and filed on Oct. 8, 2017, and U.S. Provisional Patent Application No. 62/580,960 entitled "Gamma Ray Detector with Two-Dimensional Directionality" and filed on Nov. 2, 2017, and U.S. Provisional Patent Application No. 62/626,115 entitled "Directional Radiation Detector with Front Scintillator" and filed on Feb. 4, 2018, and U.S. Provisional Patent Application No. 62/661,072 entitled "Radiation Detector with Two-Dimensional Directionality" and filed on Apr. 22, 2018, the entire disclosures of which are incorporated herein by reference.

FIELD OF THE INVENTION

The present invention relates generally to nuclear weapon detection. More particularly, the present invention is directed in one exemplary aspect to a particle detector that determines a radiation source direction in two dimensions.

BACKGROUND

Clandestine nuclear weapons are an immediate threat to every country and every city in the world. A rogue nation with a nuclear weapon, or a terrorist group that acquires radiological material, could deliver it to a victim city via commercial shipping at low cost and low risk. Nuclear weapons are difficult to detect when shielded. Advanced radiation detectors are necessary to reveal such weapons among backgrounds and benign clutter. An urgent priority of the United States, and indeed of all countries, is the development of radiation detectors that both detect and localize clandestine nuclear material.

A signature of all nuclear and radiological weapons is radiation, principally gamma rays ("gammas") and neutrons. Gamma rays are detected when they interact with matter via photoelectric absorption in which the gamma ray is absorbed and a photoelectron is emitted, Compton scattering which generates a Compton electron and a scattered gamma ray, or electron-positron pair production. In each case, the energetic electron (or positron, treated as an electron herein) can be detected in a charged-particle detector such as a scintillator. Neutrons are usually classified according to energy as fast, intermediate, and slow. A fast or high-energy neutron, as used herein, has 100 keV to several MeV of energy. Fast neutrons can be detected by neutron-proton elastic scattering in which the recoil proton passes through a detector such as a scintillator. Slow or low-energy neutrons (1 eV or less, also called thermal or epithermal) are detected by a capture reaction in a neutron-capture nuclide, usually $^{10}B$ or $^{6}Li$, causing emission of prompt ions such as alpha and triton particles which can be detected in a scintillator or other ionization detector. Intermediate-energy neutrons may be moderated or decelerated by multiple elastic scattering in a hydrogenous material such as HDPE (high-density polyethylene), and then detected as slow neutrons.

Numerous directional radiation detectors have been proposed. Typically, they have one-dimensional directionality, meaning that they indicate whether the source is to the left or right of the detector. Multiple iterative rotations are then needed to specify the source location in one dimension, such as the bearing of the source in a horizontal plane. This iterative rotation process is extremely time-consuming. In addition, a one-dimensional scan is not sufficient to localize a threat in large inspection items such as trucks and railcars and shipping containers; a two-dimensional determination is needed. Although a pair of one-dimensional directional detectors might conceivably be used to separately scan horizontally and vertically, this would require two separate systems and would entail some kind of coordination between them. Also, the two systems would each have their own background rate, further diluting the threat signature and requiring longer scan times. Alternatively, a single prior-art directional detector might conceivably be able to scan horizontally first, then roll by 90 degrees, and then scan vertically, but this would take twice as long and would require a complicated mechanical joint.

Prior art further includes ostensibly directional gamma ray detectors (U.S. Pat. No. 8,319,188 to Ramsden, U.S. Pat. No. 7,944,482 to Frank, for example) comprising four scintillators packed around a detector axis and analyzed to determine an azimuthal angle and, in the case of the Ramsden device, a low-resolution indication of the polar angle as well. These configurations lack a central shield and thus must depend on the various scintillators to shield each other, which greatly limits the angular contrast achievable.

What is needed, then, is a gamma ray or neutron detector system with two-dimensional directionality, that preferably provides superior angular resolution extending all the way around the detector including polar angles near the midplane of the detector, and with enough sensitivity to detect a shielded source. Preferably the detector would indicate the direction toward the source, in two dimensions, using a single data set acquired at a single orientation of the detector, thereby avoiding the need for iterative rotations. Preferably such a detector would be compact, fast, efficient, easy to build, easy to use, and low in cost.

SUMMARY

Disclosed herein are systems for nuclear weapon detection. In one embodiment, a directional detector device (the "detector") can be configured to detect particles from a radioactive source, and to determine the direction of the source in two dimensions, such as the azimuthal and polar angles of a spherical coordinate system. FIG. 1 shows how the polar and azimuthal angles are related to a directional measurement. In one embodiment, the directional detector determines the source location from scintillator detection data acquired at a single position and a single orientation of the detector. The examples are directed to particles comprising gamma rays, fast neutrons, and slow neutrons, but the principles disclosed herein are readily applicable to any particle type.

Some embodiments of the detector comprise a shield, a "panel" scintillator, and N "rod" scintillators, where N is equal to three or more (in preferred embodiments, N=4). The panel and rod scintillators may be configured to detect the source particles according to interactions by the source particles in the various scintillators. The interactions can generate "secondaries" comprising energetic charged particles such as gamma-generated electrons, recoil protons, or ions emitted following neutron capture, and those charged particles produce scintillation light, which may then be detected by a light sensor. The light sensor may responsively produce an electronic signal related to the scintillation light, and a processor may then analyze those signals and calculate the azimuthal and polar angles of the source. The detector has a "detector axis" which is an axis that extends from the back to the front of the detector and passes through the center of the detector. In some embodiments, the rod scintillators comprise elongated prism-shaped bodies, positioned symmetrically around the detector axis, and oriented with their longest dimension parallel to the detector axis. In some embodiments, the panel scintillator may be a slab-shaped scintillator oriented perpendicular to the detector axis, and may be positioned frontward of the rod scintillators. In some embodiments, the shield comprises N plates of shielding material thick enough to block or attenuate most (i.e., over 50%) of the source particles incident orthogonally on the shield plate. In some embodiments, the detector may be configured to calculate the azimuthal angle of the source by analyzing particle detection data, such as counting rates, in the various rod scintillators. In some embodiments, the detector may also be configured to calculate the polar angle of the source by analyzing particle detection data in the panel scintillator, using, for example, a predetermined angular correlation function that relates the polar angle to the various scintillator counting rates.

In some embodiments, the various shield plates are arranged in a radially-oriented array wherein each shield plate abuts or joins to all the other shield plates at or near the detector axis. Alternatively, when N is an even number, the shield may comprise N/2 plates that mutually intersect at the midline of each plate. In some embodiments, the shield extends frontward to the panel scintillator and may substantially abut the back surface of the panel scintillator. In other embodiments, a space may be provided between the panel scintillator and the shield. In some embodiments, the shield is configured to substantially prevent the source particles and their secondaries from passing between the rod scintillators. More specifically, the shield plates prevent particles from passing out of any one of the rod scintillators and into any other rod scintillator, thereby isolating the various rod scintillators from each other. In some embodiments, the rod scintillators and the panel scintillator are configured to surround or almost surround the shield, so that only the edges of the shield plates are exposed to the outside. In such a configuration, the source particles cannot reach the shield (other than the edges) without first passing through at least one scintillator. As a result, substantially all of the particles impact scintillator material before reaching any shield material, resulting in few particles lost in shielding material and thus a high overall detection efficiency.

In some embodiments, the shield may protrude, or extend beyond, the rod scintillators in the frontward direction. Such a protrusion may sharpen the angular resolution by preventing particles that pass in front of the shield from reaching the downstream rod scintillator. Particles arriving at an oblique angle and striking the downstream rod scintillator can partially dilute the angular data, reducing the angular contrast achievable. The protrusion distance is preferably sufficient to block particles arriving at large polar angles, such as polar angles greater than 30 degrees, 45 degrees, or 60 degrees. Therefore, in some embodiments, the protrusion distance is related to the lateral dimensions of the rod scintillators, where a "lateral dimension" is a size measured perpendicular to the detector axis. For example, in some embodiments, the protrusion distance may be equal to 0.5 times one of the lateral dimensions of the rod scintillators, or 1.0 times the average of the two lateral dimensions, or other function of the lateral dimensions of the rod scintillators.

In some embodiments, the shield may be truncated, or cut short, at the back end, so as to reduce the weight of the detector for example. Stated differently, the rod scintillators may extend in the rearward direction substantially beyond the shield. In many applications, the source is expected to be in the front half-space of the detector, in which case the rearmost portion of the shield has practically no effect on the particle trajectories. Therefore, in some embodiments, the rearmost portion of the shield may be truncated without significantly impacting the performance of the detector.

In some embodiments, the shield may be tapered to reduce the weight while still retaining some shielding effect from front to back. For example, each shield plate may be tapered in thickness, being thicker at the front and thinner at the back of the detector. Tapering in this way could reduce the shield weight by 50% while having little effect on the source location determination.

In some embodiments, each rod scintillator may be a solid body shaped as a right prism, which may be beveled or tapered or shaped in various ways. The rod scintillators may have a cross-sectional shape (often called the "base" of the prism) which is typically a square or a rectangle or a triangle or a pie-sector or an arcuate shape. The base shape may then be extruded along an extrusion axis. Each rod scintillator may be positioned in the angular openings between the plates of the shield, adjacent to two of the shield plates respectively. Likewise, each shield plate may be positioned between and adjacent to two of the rod scintillators, respectively. In some embodiments, each rod scintillator may be oriented with its longest dimension perpendicular to the panel scintillator. Usually the longest dimension is the extrusion axis of the prism shape. In such embodiments, the rod scintillators may be parallel to the detector axis while the panel scintillator is perpendicular to the detector axis. In other embodiments, the extrusion dimension may be less than the lateral dimensions, or the extrusion dimension may be substantially equal to the lateral dimensions (for example, a cube-shaped rod scintillator). According to some embodiments, the angular sensitivity of the rod scintillators is opposite to the angular sensitivity of the panel scintillator. Specifically, in some embodiments, each rod scintillator is mainly sensitive to particles arriving from one side, due to the presence of the shield, whereas the panel scintillator is mainly sensitive to particles arriving from the front. The polar angle may then be calculated by exploiting those contrasting angular sensitivity distributions, as discussed in detail below. Each rod scintillator may be positioned in the angular openings between the plates of the shield, adjacent to two of the shield plates respectively. Likewise, each shield plate may be positioned between and adjacent to two of the rod scintillators, respectively.

In some embodiments, the panel scintillator may be a slab-shaped body oriented perpendicular to the detector axis, positioned frontward of the rod scintillators, and centered on the detector axis. The panel scintillator may be thick enough to detect all, or substantially all, of the particles orthogonally incident on the panel scintillator, while the rod scintillators may detect particles that pass beside the panel scintillator as well as particles that scatter in the panel scintillator and then pass through to the rod scintillators. Alternatively, the panel scintillator thickness may be thin enough that most of the orthogonally incident particles pass through the panel scintillator and can then be detected in the rod scintillators, yet thick enough to provide a sufficient detection efficiency for determining the polar angle of the source. A particle "passes through" the panel scintillator when the particle exits the back surface of the panel scintillator with enough energy to be detected in a rod scintillator. For example, a particle may pass through the panel scintillator without interacting, or the particle may scatter and be detected in the panel scintillator and then go on to be detected again in the rod scintillator. In some embodiments, the panel scintillator thickness is such that at least 10% of the orthogonally incident source particles are detected in the panel scintillator, while over 50% of the orthogonally incident particles pass through the panel scintillator (possibly with some scattering) and are then detectable in the rod scintillators. These values ensure that the panel scintillator detects enough particles to provide a measure of the polar angle, while not blocking the rod scintillators from receiving enough particles to provide a measure of the azimuthal angle.

In some embodiments, the panel scintillator may enable the detector to calculate the polar angle precisely. The panel scintillator may have an angular sensitivity distribution that is substantially opposite to the angular sensitivity distribution of the rod scintillators, so that particles from a discrete source produce different detection rates in the panel and rod scintillators depending on the polar angle of the source. According to some embodiments of the panel scintillator, the lateral dimensions of the panel scintillator may each be at least two times, and more preferably three times or four times, the thickness of the panel scintillator. In some embodiments, the lateral dimensions may be substantially larger, such as 10 or 20 times the thickness of the panel scintillator. Due to its thinness, in some embodiments, the panel scintillator may be mainly sensitive to particles arriving from the front, while being substantially less sensitive to particles arriving from the midplane, since the panel scintillator is "edge-on" to the particles arriving from the side. In some embodiments, this angular sensitivity distribution is opposite to the angular sensitivities of the rod scintillators, which are mainly sensitive to particles arriving from one side. The processor may employ that sensitivity contrast to calculate the polar angle from the various scintillator particle detection rates.

In some embodiments, the thickness of the panel scintillator may be substantially less than an average interaction distance of the particle in the panel scintillator material, while the panel scintillator lateral dimensions may both be substantially greater than the particle average interaction distance. The "average interaction distance" of a particle is the distance that the particle would travel in a particular material, on average, before interacting in a way that would cause the particle to be detected. For gamma rays, the average interaction distance is the mean free path for Compton scattering or photoelectric absorption or pair-production, or alternatively is the inverse of the mass attenuation factor which includes all those interaction types. For fast neutrons, the average interaction distance is the mean free path for n-p scattering. For slow neutrons, the average interaction distance is the mean free path for neutron capture. In some embodiments, the panel scintillator may be configured so that each lateral dimension of the panel scintillator is at least two times the average interaction distance, while the thickness is at most 0.5 times the average interaction distance (hence the average interaction distance is at least two times the thickness of the panel scintillator).

In some embodiments, the panel scintillator may be shaped like the shield in transverse cross-section, that is, with N arms extending from the center. The panel scintillator so shaped may substantially match the N plates of the shield, and thus can reside directly over the shield plates according to some embodiments. One advantage of shaping the panel scintillator in this way is that when the detector axis is aimed directly at the source, the rod scintillators can be completely unobscured by the shaped panel scintillator.

In some embodiments, the detector may further include a second panel scintillator, which may be identical to the first-mentioned panel scintillator but positioned behind, or rearward of, the rod scintillators. In such a double-ended configuration, the first and second panel scintillators may both be perpendicular to the detector axis. In some embodiments, the double-ended detector may be configured to compare the detection rates in the first and second panel scintillators to determine whether the source is in the front or back half-space. Then whichever one has the higher counting rate can be used in the polar angle calculation. Alternatively, a source-location fitting program may use data from all the scintillators to determine the polar and azimuthal angles. In this way, the double-ended configuration can view a full $4\pi$ of solid angle everywhere around the detector, and thus determine the source location everywhere around the detector including the midplane, directly behind and directly in front of the detector, and everywhere else.

The rod scintillators may be shaped or beveled to reduce their susceptibility to particles that arrive from an oblique angle such as 30, 45, or 60 degrees relative to the detector axis. Particles that pass over the shield and then strike the downstream rod scintillator represent an erroneous event that dilutes the angular sensitivity, as mentioned. To avoid this, the rod scintillators may be cut back at an angle, or beveled, to remove scintillator material farthest from the shield axis.

In particular embodiments, (a) the lateral dimensions of the panel scintillator may substantially match the lateral extent of the rod scintillator array, or (b) the panel scintillator may extend laterally beyond the rod scintillators, or (c) the panel scintillator may be smaller than the rod scintillator array. Each such configuration has advantages. An extended panel scintillator that extends laterally beyond the rod scintillators may have extra detection efficiency due to its larger size. A panel scintillator that matches the rod scintillator array size can provide a tidy and compact structure which is easy to fabricate and easy to mount in a holder or case. A smaller panel scintillator may leave part of the rod scintillators unobstructed to particles arriving from the front, thereby enhancing the rod scintillator detection efficiency.

The panel scintillator may comprise a single monolithic body oriented perpendicular to the detector axis and positioned frontward of the rod scintillators. Alternatively, the panel scintillator may be divided into N portions which are each slab-shaped and oriented perpendicular to the detector axis and positioned frontward of the rod scintillators. In some embodiments, the panel scintillator portions may be shaped as small slabs. Each of the panel scintillator portions may be positioned adjacent to, and frontward of, one of the rod scintillators respectively, and each rod scintillator may be adjacent to, and rearward of, one of the panel scintillator portions respectively. In addition, the shield may protrude frontward of the panel scintillator portions, to improve the angular resolution for example.

When the panel scintillator is divided into portions, each such panel scintillator portion may be optically isolated from the adjacent rod scintillators, in which case each panel scintillator portion may be viewed by a separate light sensor respectively, and each rod scintillator may be viewed by a separate light sensor respectively. This has the advantage of simplicity since each scintillator provides a separate signal on a separate conductor. In another embodiment, each panel scintillator portion may be optically coupled to the adjacent rod scintillator, and each rod scintillator may be optically coupled to one of the panel scintillator portions respectively. In that case, the coupled scintillators may be viewed simultaneously by a shared light sensor. Such optically coupled panel and rod scintillators preferably comprise different scintillator materials that produce detectably different pulses, such as differently shaped light pulses or different wavelength pulses.

As a further option, the shield or a portion of the shield may be made from a material that is transparent to the light emitted by the panel scintillator, and can thereby serve as a light guide for the panel scintillator. Such a transparent shield (or shield portion) may be optically coupled to the panel scintillator and to a light sensor according to some embodiments. Preferably, the transparent shield portion provides sufficient shielding property, such as blocking or attenuating over 50% of the particles orthogonally incident thereon. One advantage of such a light-guide-shield is that it can allow all of the light sensors to be mounted on the back surface of the detector, thereby keeping the light sensors out of the way of incoming particles from the front.

As a further option, the shield (or a portion thereof) may comprise a scintillator as well as a shield. A scintillating shield for gamma rays may comprise a high-Z, high-density scintillating material such as BGO, LYSO, LuAP, or $CdWO_4$ for example. In addition, the scintillating shield may also be a spectroscopic-type detector such as NaI or $LaBr_3$ or other spectroscopic scintillator. A "spectroscopic" type scintillator measures the total energy of the particle, preferably with an energy resolution of 10% or better, and thus helps to identify the isotopic content of the source. One or more light sensors may then be coupled to the scintillating shield. One advantage of a scintillating shield is that it can provide an additional, high-sensitivity measure of the radiation background. In addition, if the scintillating shield is spectroscopic, signals from the scintillating shield may reveal the isotopic content of the source according to the energies of the particles (usually gammas) detected by the spectroscopic shield.

In some embodiments, a shaped "shield slug" may be mounted frontward of the panel scintillator. The shield slug may be shaped similarly to the shield itself in cross-section, and configured to block or attenuate most of the particles orthogonally incident thereon. The shield slug may thus serve a similar function as a shield protrusion, blocking particles that arrive at oblique angles to the detector axis and preventing those particles from striking the downstream rod scintillator.

Typically, each of the panel and rod scintillators, and a second panel scintillator if present, (collectively, "the scintillators") may be configured to emit a light pulse when traversed by a charged particle such as a gamma-generated electron or a neutron-generated ion. Each scintillator may be connected directly, or through a light guide, to a light sensor, which is a transducer such as a photomultiplier tube or a photodiode, configured to produce an electronic signal responsive to each scintillator light pulse. In some embodiments, the electronic signals from particle interactions in each scintillator are distinct, so that the particular scintillator associated with each signal can be determined. For example, the signals may appear on separate conductors or may have different pulse properties, so that the processor can determine which scintillator was involved. Optionally, the panel scintillator and/or rod scintillators may comprise a spectroscopic type scintillator that measures the energy of the particles and thus helps identify the source composition.

In some embodiments, the detector may include a processor comprising digital, and optionally analog, electronics configured to read instructions from a non-transient computer-readable medium. The instructions, when executed by the processor, cause the processor to perform a method that includes analyzing the electronic signals from the light sensors, determining which scintillator produced each signal, accumulating detection data for each scintillator during a time interval, and thereby determining particle detection rates or interaction tallies for each of the scintillators. The method may then include subtracting each rod scintillator rate from that of the diametrically opposite rod scintillator, thereby determining a differential for each rod scintillator, and then calculating the source azimuthal angle by analyzing the rod scintillator data or the differentials. The processor may use weighted averaging or interpolation or a fitting function or a variable source model or other analysis steps to determine the azimuthal angle of the source from the detection data of the rod scintillators. The method may further include determining the polar angle of the source, for example by calculating a function of the differentials divided by the panel scintillator detection rate, thereby obtaining a ratio, and comparing the ratio (or its inverse) to a predetermined angular correlation function which yields the polar angle of the source.

In some embodiments, the panel scintillator is centrally mounted and is unshielded, and therefore has a symmetrical angular sensitivity. The rod scintillators, on the other hand, can be mainly sensitive to particles that arrive from one side, since the shield blocks particles arriving from the other side. Therefore, according to some embodiments, each rod scintillator may have a strongly antisymmetric angular sensitivity distribution. The detector may exploit these contrasting angular sensitivities to derive a unique formula that yields the polar angle. In some embodiments, the azimuthal and polar angles may be calculated from detection data acquired at a single orientation of the detector. The correlation may provide precise values for the azimuthal angle from 0 to 360 degrees, and for the polar angle from zero to 90 degrees (that is, from straight-ahead to the midplane of the detector). For the double-ended version of the detector, polar angles may be determined from zero to 180 degrees, thereby encompassing the entire sphere, without rotating or moving the detector. This truly omnidirectional capability is in contrast to prior-art detectors that provide polar angle determination only for small polar angles in the front half-sphere.

The processor may be further configured to compare the particle detection data in the various rod scintillators and to determine, when they are all substantially the same, that the detector axis is substantially aligned with the source. The processor may be further configured to refine the polar angle determination based on the remaining differences between the various rod scintillator counting rates.

Optionally, the detector may include a light beam emitter, such as a low-power laser pointer or flashlight. In a first embodiment, the light beam may be fixedly aligned with the detector axis, thereby illuminating the aim point of the detector. In preferred embodiments, the shape or other property of the light beam may be varied according to the calculated azimuthal and polar angles of the source, thereby causing the beam spot shape to indicate or point toward the source location in real-time. For example, in some embodiments, the light beam may be shaped as a wedge or arrow, pointing toward the source azimuthal angle, and with a length or shape indicative of the polar angle. In a second embodiment, the light beam is not aimed along the detector axis, but rather, is redirected so as to point directly at the calculated source location using, for example, a rotatable mirror that is driven according to the calculated azimuthal and polar angles, thereby bathing the suspected source location with the light beam. The redirected beam may also be modulated to indicate the radiation level or the type of particle detected or other information. Alternatively, the beam may be made wider or narrower according to the uncertainty in the source location. The operator of the detector can then learn a great deal of information about any source detected simply from the light beam in real-time, without having to look away from the scene.

Optionally, the detector may include imaging means, such as a still or video camera. In a first camera embodiment, the camera is aligned with the detector axis, and is configured to record the scene centered on the detector axis. In a second camera embodiment, the camera is configured to center the image on the calculated source location, thereby recording the detected source along with surrounding items. Such a source-centered image has an advantage that the image fully views the source location, rather than the aim point of the detector which may or may not be relevant. Also, the image which is centered on the source location may be easily magnified using a zoom lens, for example. By varying the zoom lens, successive images can be acquired, from a wide-angle view all the way to a telescopic close-up view of the source location, without having to readjust the aim point. The camera may be activated to acquire the image as soon as the source location is determined, when the radiation level exceeds background levels, when the detector is substantially aimed at the source according to the rod scintillator rates being equal, or manually by the operator, or whenever the detector is rotated. In some embodiments, the source location and other information may be superposed upon the camera image. If the detector is subsequently rotated, the rotation angle may be determined by image analysis of images taken before and after the rotation.

The detector may include non-visual indicators such as sonic or haptic indicators. The non-visual indicators may be activated according to the calculated azimuthal or polar angles, thereby assisting the operator in localizing the source.

Background events such as cosmic rays, and complex events such as multiscattering events, may be excluded by signal processing and electronic logic according to some embodiments. For example, any event in which more than one rod scintillator is triggered at the same time can be rejected. Pulses that are too large to be produced by the particles of interest can also be rejected using a second discrimination threshold set just above the gamma ray or neutron energy, thereby eliminating most cosmic rays.

Various embodiments provide many advantages over prior-art directional detectors. (a) The detector can determine both the azimuthal angle and polar angle of the source, thereby locating the source in two dimensions. (b) The detector can determine the source location using only a single acquisition of scintillator data at a single orientation of the detector, thereby avoiding extensive iteration and rotations. (c) By use of the panel scintillator detection rates, the detector can provide high-resolution polar angle determination, for source angles throughout the front half-sphere from the detector axis to the midplane and, with the addition of a second panel scintillator, can cover the entire 4π sphere. (d) The detector can specifically detect when the detector axis is aligned with the source, by comparing the rod scintillator signals. (e) The detector can provide high detection efficiency since, in some embodiments, the scintillators nearly surround the exterior surface of the shield, thereby presenting maximum detection area with very few source particles lost to the shield material. This also can ensure particle detection from all directions at all times. (f) Various embodiments can detect all three major particle types for security inspections—gamma rays, fast neutrons, and slow neutrons—by substituting appropriate scintillator and shield materials. (g) The detector can be low in weight due to the shield being configured not for collimation, but only for isolating the rod scintillators from each other. (h) The detector can be compact, due primarily to the placement of the scintillators in close proximity to the shield, thereby minimizing the overall envelope of the system. This may also greatly enhance the angular performance. (i) Various embodiments of the detector are economical, easy to build, easy to use, and require no exotic/rare/expensive materials. (j) The detector may be suitable for critically important security applications including as a portable survey instrument, a walk-through portal, a fixed-site cargo and vehicle scanner, and a mobile area scanner for concealed weapons. (k) By raising an alarm when several particles are detected coming from the same location, various embodiments can provide greatly improved speed and sensitivity compared with conventional non-directional detectors. The detector can thereby defeat any attempt to obscure a concealed weapon with shielding and obfuscation.

DETAILED DESCRIPTION OF INVENTION

Figure 1:
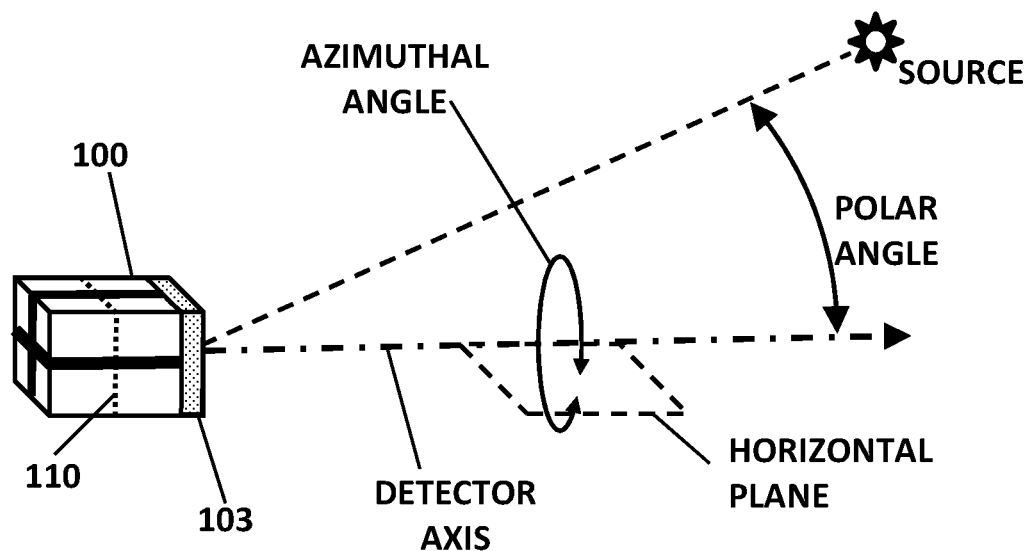
FIG. 1 is a perspective sketch showing how the azimuthal and polar angles are related to the detector axis and the source location.

In the following description, reference is made to the accompanying drawings in which it is shown by way of illustration specific embodiments in which the invention can be practiced. Not all of the described components are necessarily drawn to scale in order to emphasize certain features and to better facilitate the reader's conception of the disclosed embodiments. It is to be understood that other embodiments can be used and structural changes can be made without departing from the scope of the embodiments of disclosed herein.

A directional particle detector, configured to determine the azimuthal and polar angles of a radioactive source location relative to the detector axis, may detect any type of source and any type of particle, but the examples and applications disclosed herein are primarily applied to gamma ray and/or neutron detection. In some embodiments, the detector can determine the azimuthal angle of the source according to the particle detection rates of the rod scintillators, and can determine the polar angle of the source by comparing a ratio of the panel scintillator rates to a predetermined angular correlation function. In some embodiments, the detector can determine the source location in two dimensions, from a single set of scintillator data, which can be acquired at a single position and a single orientation of the detector. Specifically, the detector can localize the source anywhere throughout the front half-space of polar angles of 0 to 90 degrees, or with front and back panel scintillators can cover the entire $4\pi$ space including azimuthal angles of 0-360 degrees and polar angles of 0-180 degrees with high precision throughout.

In some embodiments, the detector can be adapted to detect gamma rays, fast neutrons, or slow neutrons by adjusting the compositions of the shield and scintillators. The properties of the light sensors and the processor, and particularly the analog electronics, can also be adjusted according to the scintillator choices. For detecting gamma rays, the scintillators may be any of the economical plastic scintillator types such as common PVT-based plastic, or stilbene, or other polymer. More preferably, the panel scintillator is a higher-density material such as LYSO, BGO, $CdWO_4$, LuAP, CsI, or NaI, among many other possibilities. The panel and rod scintillators may all comprise the same material, or the panel scintillator may be different from the others according to some embodiments. Preferably the rod scintillators are all identical in composition and shape, for ease of calculating the azimuthal angle. The shield, adapted to gamma rays, may be any high-Z, high-density material (Z being the atomic number), such as lead, tungsten, bismuth, or the like, and sufficiently thick to substantially prevent gamma rays from passing from any rod scintillator to any other rod scintillator. The gamma ray shield may alternatively comprise lower-density materials such as steel, or a mixture of materials such as leaded glass, or layers such as polyethylene coated with lead and LiF, provided that the shield plates are thick enough to block or attenuate over 50% of the gamma rays incident orthogonally on the shield plate.

For detecting fast neutrons, according to some embodiments, the scintillators may be a hydrogenous material that provides abundant n-p scattering targets. Common plastic scintillators detect fast neutrons in this way, but they are also sensitive to gammas, which may be a problem in applications where background gamma rays greatly outnumber the threat neutrons. Therefore, according to some embodiments, the scintillators may comprise stilbene, or may include a special fluor that emits different shaped light pulses depending on the ionization density of the particle (also called "PSD scintillators", standing for pulse-shape discrimination). Certain inorganic scintillators also have this ionization-dependent pulse shape property and, if blended or layered with a hydrogenous matrix, can detect n-p scattering selectively. Currently the obtainable separation in pulse shape is not large, but improved PSD scintillator materials are being developed. Alternatively, the scintillators may comprise a material such as ZnS, which produces little or no light for gamma-generated electrons which have a low ionization density, but a very large light pulse for recoil protons or neutron-capture ions which have a very high ionization density for a short track. Such intrinsically gamma-blind scintillators may be embedded in or adjacent to a hydrogenous material such as an acrylic or other transparent polymer matrix that provides n-p scattering targets. The transparent matrix may include a wavelength shifter for improved light propagation according to some embodiments. The shield, adapted to fast neutrons, is preferably HDPE or paraffin, or other material with a high density of hydrogen, and is sufficiently thick to degrade the energy of the fast neutrons sufficiently that they are no longer detectable in scintillators by n-p scattering.

For detecting slow neutrons, the scintillators may comprise any of the above listed scintillators, combined with a neutron-capture nuclide such as $^{10}B$ or $^{6}Li$. Ions emitted from the neutron capture can then excite the adjacent scintillator. The capture nuclide may be in a particulate form distributed in a scintillating matrix, or it may be a thin film coated onto a scintillator, or other forms that enable the reaction ions to pass into the scintillator. Alternatively, the scintillator could comprise the neutron-capture nuclide in its composition such as LiI(Eu). However, LiI is sensitive to gammas, as are most of the scintillator types currently available. The shield for slow neutrons is preferably HDPE or paraffin, loaded or coated with a neutron-capture material. The neutron-capture nuclide is preferably lithium if the scintillators are sensitive to gamma rays, since lithium produces negligible gamma background upon neutron capture. But if the scintillators are gamma-blind, then any neutron-capture material such as boron or gadolinium may be suitable. According to some embodiments, the amount of such neutron-capture material is preferably sufficient to capture any slow neutrons that pass through one of the rod scintillators, and thereby prevent that neutron from going into another rod scintillator.

In an embodiment, the processor can accumulate counts from the various scintillators for a specific time interval termed the integration time, and then calculate the polar and azimuthal angles from the accumulated particle detection data. Optionally, the integration time may be manually variable, so that the operator can select a short integration time for a quick initial indication of the source direction, and then a longer integration time to obtain a more precise result. Or, the integration time can be adjusted automatically, based on scintillator counting rates for example. In a high-radiation environment with high counting rates, the processor can select a short integration time, thereby obtaining precise azimuthal and polar angles quickly, and thereby reduce operator exposure in the hazardous environment. If the source is faint or well-shielded, the low counting rates may require a longer integration time to provide a reliable detection.

The detector may include an indicator or display for visually reporting the calculated source location in two dimensions. In some embodiments, the indicator or display shows both the azimuthal angle and the polar angle of the source relative to the current detector axis. The indicator may comprise a circle (or a plurality of concentric circles) of LEDs (light emitting diodes) or other luminous components, and a particular LED may be illuminated so as to indicate the calculated azimuthal and polar angles of the source. For example, the display may comprise a single circular array of LEDs of which one particular LED is illuminated, thereby indicating the azimuthal angle, and that LED may be flashed or otherwise modulated to indicate the size of the polar angle. In some embodiments, the illuminated LED may be steady when the polar angle is large, and may be flashed or modulated increasingly rapidly as the detector axis approaches the source location. In another embodiment, multiple concentric circles of LEDs may be provided, each circle corresponding to small, medium, and large polar angles for example. In some embodiments, a specially-colored central LED may be provided and illuminated only when the detector axis is aligned with the source. The LED display is easy to learn and use, enabling inspectors to rapidly locate radioactive sources using, for example, a hand-held detector.

In another embodiment, the indicator may comprise a flat-screen display that shows an arrow or other rotatable icon, arranged to point at the calculated azimuthal angle, thereby pointing toward the source. The icon may be varied to show the magnitude of the polar angle, for example by showing a longer or brighter or distinctively colored arrow depending on whether the polar angle is large or small. In some embodiments, the icon may be flashed or otherwise modulated according to the size of the polar angle. In some embodiments, the polar angle may be indicated separately from the rotatable icon, using for example a bar widget on the screen. In addition, or alternatively, the screen may show numerical values (in degrees, for example) corresponding to the calculated azimuthal and/or polar angles. The rotatable icon may be changed to a special alignment indicator when the detector axis is aimed at the source, such as a prominently flashing non-directional icon, or a flashing light or a tone.

To calculate the azimuthal angle of the source, the detector may be configured to analyze the rod scintillator detection rates or other equivalent data related to particle interactions in the rod scintillators. The detector may then calculate the azimuthal angle of the source relative to the position angle of each rod scintillator. The "position angle" of each rod scintillator is the azimuthal angle of the centroid of that rod scintillator, measured clockwise around the detector axis as viewed from the rear, and starting at an arbitrary zero position such as the horizontal right-hand side as viewed from the rear. In some embodiments, the detector may calculate the azimuthal angle by interpolating between the position angles of the particular two rod scintillators that have the highest counting rates. Alternatively, the detector may use weighted averaging, numerical fitting of the rod scintillator detection rates using a source model in which the azimuthal angle is variable, or another suitable method for calculating the source azimuthal angle from the rod scintillator data.

Alternatively, the detector may be configured to calculate a differential for each rod scintillator, each differential being equal to the difference between the counting rate of each rod scintillator minus the counting rate of the diametrically opposite rod scintillator. If the detector has an odd number of rod scintillators, then the differential equals the rod scintillator detection rate minus the average of the detection rates of the two opposing rod scintillators. In some embodiments, the detector then calculates the azimuthal angle by linearly interpolating between the two highest differentials. Alternatively, the detector may be configured to calculate the azimuthal angle by a weighted average of all the positive differential values (negative differentials being ignored), or by performing an angular fit to the differentials of all the rod scintillators, or by any other suitable analysis means for determining the azimuthal angle from the rod scintillator differentials.

The polar angle is the overall angle between the detector axis and the source direction. Theoretically, polar angle is orthogonal to the azimuthal angle and does not depend on the azimuthal angle. In some embodiments, the detector may determine the polar angle using the panel scintillator detection rate in comparison to a function of the rod scintillator counting rates. The panel scintillator may have a symmetrical angular sensitivity distribution, whereas the rod scintillators may have a strongly antisymmetric angular sensitivity due to the shield which blocks particles from one side only.

As a result, the panel and rod scintillators can have opposite sensitivity distributions, which enables a unique polar angle determination based on the scintillator data alone. Thus, the source location may be determined from data acquired at a single orientation and a single position of the detector according to some embodiments.

To calculate the polar angle, the detector may calculate a ratio in which the numerator is a function related to the highest rod scintillator rates or differentials, and the denominator is equal to the panel scintillator rate. The detector can then compare the ratio or its inverse to a predetermined angular correlation function which can directly indicate the polar angle of the source. Preferably, the polar angle calculation is arranged to be independent of the calculated azimuthal angle, so that a single angular correlation function can be used to calculate polar angle regardless of the azimuthal angle. However, the detection sensitivity of the rod scintillators is intentionally a very strong function of the azimuthal angle. To normalize the rod scintillator response, the detector may calculate a numerator equal to the highest rod scintillator rate, plus a geometrical factor times the second-highest rate, wherein the geometrical factor can account for the fact that the detection efficiencies of the rod scintillators are generally different for particles arriving at different azimuthal angles. The geometrical factor may thereby correct for the shape-dependent detection efficiency of each rod scintillator in the presence of the shield. In some embodiments, the geometrical factor may be adjusted to equalize the response of the rod scintillators for azimuthal angles of zero degrees and 45 degrees. By symmetry, then, all the other multiples of 45 degrees (such as 90, 135, etc) have the same angular correlation function, and the intermediate angles such as 22.5 degrees are very close. In embodiments, it is found that a geometrical factor of $(2\pi\sqrt{2})^{-1} \approx 0.11$ accomplishes this desired equalization, which thereby provides that the resulting angular correlation function is independent of the azimuthal angle to high precision. Therefore, using the corrected ratio with the geometrical factor, the polar angle may be obtained from the correlation function according to the panel and rod scintillator rates directly, throughout the $4\pi$ sphere, without the need for azimuthal angle corrections or any other corrections according to some embodiments.

The azimuthal and polar angles may be calculated using the following equations. Equation 1 specifies one way to perform the angular interpolation, where $\varphi(source)$ is the calculated azimuthal angle of the source, $\varphi(i)$ is the positional angle of the i'th rod scintillator, Dm is the maximum differential, $\varphi(m)$ is the positional angle of the rod scintillator with the maximum differential, Di are the other positive differentials (other than the maximum one), and i ranges over all the positive differential scintillators in the detector, other than Dm. Thus Di steps through the other rod scintillators that partially face the source. The interpolated azimuthal angle $\varphi(source)$ is then given by Equation 1:

$$\varphi(source)=\varphi(m)+\Sigma[(\varphi(i)-\varphi(m))\times Di/(Dm+Di)] \quad (1)$$

As an example, with four rod scintillators (N=4), in general two of the differentials are positive. Equation 1 starts with the highest positive differential Dm, and then interpolates between the two positive differentials to obtain the azimuthal angle. If the source is directly facing one of the rod scintillators, the azimuthal angle is nearly equal to the positional angle $\varphi(m)$ of that maximal rod scintillator. If the source is about half-way between two of the rod scintillator positions, then the highest and second-highest differentials are nearly equal, and the interpolation arrives at an angle half-way between them.

The polar angle of the source, $\theta(source)$, may be found by calculating a value V, which is equal to the highest rod scintillator rate, plus the geometrical factor times the second-highest rod scintillator rate. That sum may then be divided by the panel scintillator rate F, thereby obtaining a ratio R. The ratio R, or its inverse, may then compared to the predetermined angular correlation function. The polar angle $\theta(source)$ can then be found as the value of the angular correlation function that corresponds to the observed value of R. Equations 2 and 3 show this explicitly.

$$R=V/F=(Dm+g*Ds)/F \quad (2)$$

Here R is the ratio of the rod and panel scintillator rates, Dm is the largest differential among the rod scintillators, Ds is the second-largest differential, F is the panel scintillator detection rate, and g is the geometrical factor.

$$\theta(source)=PACF(R) \quad (3)$$

In Equation 3, $\theta(source)$ is the polar angle of the source, and PACF(R) stands for the predetermined angular correlation function, which takes as input the value of R and provides as output the polar angle. If the angular correlation function comprises tabular values, interpolation or weighted fitting or other analysis may be applied to split the discrete values of the correlation function according to the actual value of R obtained from the scintillator data. When used in this way, the angular correlation function of Equation 3 is a deterministic, monotonic function that reads out the polar angle directly according to the R calculated from Equation 2. In embodiments, the predetermined angular correlation function may be any data set that correlates the source polar angle to the ratio R or its equivalent, such as a set of tabular data, an analytic function, a computer program that converts R (or the raw scintillator data) to the polar angle, a graphical data set where the polar angle can be read off the graph, or any other data set that yields the polar angle from the scintillator data or the ratio R. In preferable embodiments, the angular correlation function may be determined in advance by measuring the scintillator rates while a test source is moved around the detector at different polar angles, or by simulation using a program such as MCNP or GEANT or other particle trajectory simulation program, or other calibration means well known in the art.

In some embodiments, the detector can calculate the source angles from the scintillator counting rates or the number of counts in each scintillator during a particular time period. Alternatively, any data associated with particle detections can be used instead of the counting rates, such as anode currents or accumulated charge or any other signal related to the number of particles interacting with each scintillator in a time interval. The angle calculating method may include subtracting a predetermined normal background rate from each scintillator detection rate, and dividing by a predetermined detection efficiency of each scintillator. The method may also include rejecting any illegal combinations, such as two rod scintillators counting at the same time. In some embodiments, backgrounds such as cosmic rays can be rejected according to pulse height or pulse shape or other logic.

In some embodiments, the detector may include means for measuring the orientation of the detector axis relative to a fixed coordinate system, such as true north and horizontal. An example of means for determining the absolute orientation is an accelerometer and an electronic compass, which together measure the pitch and yaw of the detector relative to a ground-based coordinate system. The detector may also include a GPS (global positioning system) receiver for determining the detector position, which would also enable triangulation using multiple measurements at different positions to further localize the source in three dimensions.

In most applications, it is sufficient to simply report the azimuthal and polar angles of the source. In some applications, however, it may be necessary to rotate the detector until it points directly at the source. In these cases, the source angles may first be calculated from detection data acquired with the detector at an initial orientation, and then the detector may be rotated according to the calculated source azimuthal and polar angles. A second set of data can be acquired at the new orientation, and if necessary, the rotation can again be performed. In many cases, a single rotation may be sufficient to bring the detector axis into alignment with the source. In some embodiments, alignment can be verified by noting when all of the rod scintillators count at about the same rate, or that all of the rod scintillator differentials are approximately zero, or that the calculated polar angle is less than a predetermined limit, for example.

In some embodiments, the thickness of the panel scintillator is a critical design parameter because the panel scintillator thickness may directly affect the angular correlation function. In some embodiments, the panel scintillator may also partially block or shadow the rod scintillators for particles arriving from the frontward direction. The panel scintillator may be thick enough to detect most, or substantially all, of orthogonally incident particles, while the rod scintillators may detect particles that pass beside the panel scintillator or pass through the panel scintillator after being detected. Alternatively, the panel scintillator may be thin enough to avoid excessively shadowing the rod scintillators, but thick enough for sufficient detection efficiency and for rapid determination of the polar angle. In some embodiments, the thickness may be selected so that the panel scintillator detects at least 10%, and more preferably 20-50%, and in some cases 90%, of the particles orthogonally incident on it. Preferably, at least 50% of the orthogonally incident particles can travel through the panel scintillator, either with scattering or without interacting at all, so that the penetrating particle may be detected in one of the rod scintillators. For example, a gamma ray could Compton scatter in the panel scintillator, and then the scattered gamma ray can continue in about the same direction to be detected by one of the rod scintillators. Likewise, a neutron can be elastically scattered in the panel scintillator and then scatter again in the rod scintillators. Thus, according to some embodiments, there can be three classes of particle interactions: (1) the particle can be detected in the panel scintillator and stop there, (2) the particle can pass through the panel scintillator without interacting, and then be detected in the rod scintillator, and (3) the particle can interact and be detected in the panel scintillator, and subsequently can interact and be detected again in the rod scintillator. When the same initial particle triggers both the panel and rod scintillators, both counts are valid because they are both caused by the same initial particle. In most cases and at most energies, the scattering angle is sufficiently small that the scattered particle is unlikely to cross over and trigger the "wrong" rod scintillator.

The panel scintillator design was tested using MCNP6. Simulated 1 MeV gamma rays were incident orthogonally on a panel scintillator comprising BGO with a thickness of 10 mm. Any gamma rays that passed through the panel scintillator were then detected in a large downstream scintillator. There was no shield in this simple test because the purpose was to quantify the panel scintillator performance. The results were as follows: 25% of the particles were detected in the panel scintillator and were fully stopped there, 65% of the particles passed through without interacting and then were detected in the downstream scintillator, and 10% of the particles were detected in the panel scintillator and then were detected again in the downstream scintillator. Stated in terms of detection probability, the panel scintillator had an overall detection probability of 35% while the downstream scintillator had an overall detection probability of 75%. This adds up to more than 100% because the detection probability includes particles that were detected by both the front and downstream scintillators. The simulation also shows that the shadowing caused by the panel scintillator is relatively small, just 25% of the incident particles. The conclusion of the simulation is that the panel scintillator thickness can be adjusted to provide sufficient detection of incident gamma rays while still allowing over 50% of the particles to pass through to the rod scintillators.

In some embodiments, the panel scintillator may be oriented orthogonal to the detector axis and positioned frontward of the rod scintillators. In a first embodiment, the panel scintillator spans the full width of the detector, or the full width of the rod scintillator array. An advantage of making the panel scintillator the same size and shape as the rod scintillator array is that the resulting assembly may be compact while providing an adequate detection efficiency for the panel scintillator, and still allows a sufficient number of particles to reach to the rod scintillators. In a second embodiment, the panel scintillator may be smaller in lateral width than the rod scintillators. An advantage of making the panel scintillator smaller than the rod scintillator array is that part of the rod scintillator area can be exposed directly to the source, without attenuation by the panel scintillator. In a third embodiment, the panel scintillator extends laterally beyond the rod scintillators, thereby enhancing the panel scintillator detection rate and/or tailoring the shape of the angular correlation function.

In some embodiments, the panel scintillator may be a single monolithic slab-shaped scintillator body, which has the advantage of simplicity of fabrication. A monolithic panel scintillator can also provide economy since only one light sensor may be needed for the panel scintillator. Alternatively, the panel scintillator may be partitioned into N separate portions, one portion per rod scintillator, with each such portion being mounted frontward of one of the rod scintillators respectively. For example, if there are four rod scintillators, the panel scintillator can be split into four separate portions, one portion being mounted frontward and adjacent to each of the rod scintillators. Preferably, each panel scintillator portion may have a shape and size that substantially matches the frontal surface of the corresponding rod scintillator. An advantage of partitioning the panel scintillator in this way is to simplify construction, since each panel scintillator portion may be attached to one of the rod scintillators, and then each such assembly can be inserted into the shield structure. Partitioning the panel scintillators may also be convenient when the shield protrudes frontward beyond the rod scintillators, since the separate panel scintillator portions can be inserted in the space below the protrusion distance. Although it may seem that partitioning the panel scintillator would ruin its required symmetrical angular sensitivity, this is easily resolved in analysis. For example, the processor may simply add together the data from all of the panel scintillator portions, thereby effectively reassembling a net total panel scintillator signal, just as if the panel scintillator comprised a single monolithic slab. The total panel scintillator signal is highly symmetrical, thereby enabling the polar angle calculation described above.

The panel scintillator portions may be viewed by a light sensor in at least two ways. As a first option, each panel scintillator portion may be optically isolated from all the other scintillators, in which case each portion can be viewed by a separate light sensor. The light sensor for each single panel scintillator portion preferably can be a compact photodiode sensor so that it would intercept as little of the incoming radiation as possible. Such an optically isolated panel scintillator portion can have the advantage of simplicity since each portion produces a discrete signal according to some embodiments.

As a second option, each panel scintillator portion may be optically coupled to the adjacent rod scintillator, in which case a single light sensor can view both the rod scintillator and its attached panel scintillator portion simultaneously. For example, each rod scintillator may be connected to one of the panel scintillator portions on the front end, and to a light sensor on the back end of the rod scintillator. Coupling the panel and rod scintillators in this way is economical since, according to some embodiments, only a single light sensor is needed to detect light from both scintillators. Also, it allows placing the light sensor at the back of the detector, thereby ensuring that incoming particles from the front are not blocked by the light sensor. The panel scintillator, when optically coupled to the rod scintillator, can be configured to produce detectably different light pulses from the rod scintillator, such as different pulse shapes, so that the processor can determine whether the interaction was in the panel scintillator portion or the rod scintillator (or both), by analyzing the pulse shape.

In some embodiments, the detector shield comprises N shield plates abutted or joined at the detector axis. Alternatively, and equivalently, the shield may comprise N/2 shield plates that mutually intersect at the detector axis. The shield may be configured to isolate each rod scintillator from each other rod scintillator, or more specifically, to prevent a particle from passing out of one rod scintillator and into another rod scintillator. This function of the shield is in contrast to prior-art shields and collimators which are configured to prevent some subset of the incoming particles from reaching the detector at all, which necessarily reduces the detection efficiency due to the lost particles, and invariably increases the weight. The shield disclosed herein, on the other hand, can be light-weight, compact, and retain high efficiency since it can be surrounded by the scintillators according to various embodiments.

In some embodiments, each of the individual shield plates preferably can be thick enough to block or attenuate most (over 50%) of the particles incident orthogonally on the shield plate, but the effective isolation is much higher in practice because most of the particles incident on each shield plate are not orthogonal; they arrive at random angles. Therefore, each particle, on average, has a tangentially longer path length in the shield plate according to its particular angle. This effectively multiplies the amount of attenuation by a factor that ranges on average from 2 to 3, resulting in typically 80-90% isolation of the rod scintillators, which in various embodiments, is more than sufficient for the angular determination.

As used herein, a particle is blocked by a shield or shield plate if the amount of energy passing through the shield or shield plate is less than the amount of energy that a scintillator requires for detection. In some embodiments, the signal detection threshold is set at about 10% of the initial particle energy, so if less than 10% of the initial particle energy penetrates the shield or shield plate, the event will not be detectable in a downstream scintillator. For example, in an application to detect 1 MeV gamma rays, the threshold could be set at 100 keV, in which case the shield or shield plate would be sufficient to block or attenuate most of the orthogonally incident particles if, for over half the orthogonally incident particles, the amount of energy passing through the shield is less than 100 keV.

In some embodiments, the shield may protrude frontward beyond the rod scintillators by a protrusion distance. The protrusion distance is preferably sufficient to block particles arriving at oblique angles, such as 45 degrees, thereby preventing them from triggering the downstream rod scintillator. In some embodiments, the protrusion distance can be related to the lateral dimensions of the rod scintillators. For example, the shield protrusion distance may be about 0.25 times the sum of the largest and smallest lateral dimensions of the rod scintillator, or the protrusion distance may be proportional to a radial dimension of the rod scintillator relative to the detector axis. In addition, the protruding region of the shield may be shaped at the front end of each shield plate, so as to tailor the angular response of the rod scintillators. The front surface of each shield plate may be cut square, or peaked, or rounded on its frontward surface for example. The protrusion may comprise the same material as the rest of the shield, or a different material. For example, a lead shield may be topped by a tungsten protruding section to optimize the angular sensitivity of the rod scintillators.

The detector may include a shield slug, comprising shielding material disconnected from the shield, and positioned frontward of the panel scintillator. In some embodiments, the shield slug is similar in shape to the shield, but extends frontward of the panel scintillator. The shield slug may be rectangular in cross-section, or peaked, or rounded at its frontward surface according to the angular sensitivity desired. The shield slug may comprise a different material from the shield, such as a steel shield with an osmium slug. In some embodiments, the shield slug material may be selected to have a higher shielding property than the shield material, such as a material with higher Z and higher density than the main shield.

In some embodiments, each rod scintillator may be a simple prism shape such as a square shape which is extruded in the third dimension (parallel to the detector axis). Optionally, the rod scintillators may be reshaped or modified in various ways. For example, the rod scintillators may be beveled on their frontward surface to improve the polar angle determination. In some embodiments, the bevel can be cut so as to remove scintillator material from the region of the rod scintillator which is farthest from the detector axis, since this region is the least protected against incoming radiation by the shield. For example, if the rod scintillator is not beveled, any incoming particles at an angle of 45 degrees to the detector axis may pass in front of the shield and then strike the downstream rod scintillator, thereby diluting the angular data. If the rod scintillators are beveled, however, the oblique particle would miss the downstream scintillator entirely. Thus the beveling improves both the azimuthal and polar angle calculations by avoiding "contamination" of the detection data by particles that pass over the shield and interact with the downstream rod scintillator. Preferably the bevel angle is large enough to substantially avoid detecting particles that arrive from the opposite side of the detector, but not so large that the overall detection efficiency is substantially reduced. In some embodiments, the bevel angle may be 30 to 60 degrees relative to the detector axis.

In some embodiments, the processor may be configured to determine when the detector axis is aligned or nearly aligned with the source by determining when all of the rod scintillators have substantially equal counting rates. The detector may then activate an indicator, or otherwise report that the source is at the detector's aim point. Optionally, the indicator can be modulated according to the polar angle, for example by adjusting the indicator's intensity or flicker frequency or other parameter according to the polar angle being large or small, and thereby indicate how close the detector axis is to the source direction. If the shield protrudes somewhat beyond the scintillator array, angular precision of better than one degree can be obtained by this "equal-rates" criterion, whereas without such a shield protrusion the achievable angular resolution is generally poor, such as 5-10 degrees in the prior art. Preferably the detector axis can be aimed at the source with sufficiently low uncertainty that the source can be localized among obfuscating clutter, which in most inspection situations requires an accuracy of about 1 degree.

Optionally, the processor may be configured to store information about the detector orientation, the source location, the scintillator signals, the analysis results, and/or other information related to particle detection or source localization. Various embodiments may include wireless or wired or optical communication means for transmitting and/or receiving information with another system, optionally including information about the detector position and/or the detector orientation at the time when the angular results were obtained. Various embodiments may communicate with another similar detector in a local network, or with a central computer that analyzes and archives data from multiple detectors.

In some embodiments, the detector may include a light beam emitter that can emit a light beam. In a first embodiment of the emitter, the light beam is directed along the detector axis, thereby indicating to an operator where the detector is currently aimed. In addition, the beam shape may be configured as a wedge or arrow or other directional shape, and oriented so as to indicate the azimuthal angle of the source visually, thereby helping the inspector find the source. Even more preferably, the size or shape or other parameter of the beam spot may be changed in a distinctive way depending on whether the polar angle is large or small, so that the operator can tell visually how close the aim point is to the source location. When the detector axis has been brought into substantial alignment with the source, the processor may change the shape or other feature of the light beam to indicate that alignment. This can be accomplished, for example, by making the beam spot circular or as a cross-hairs when aligned with the source, by changing the color of the beam when the detector axis is aligned with the source, by modulating the beam intensity, or by some other variation of the beam spot so as to show the operator that the detector axis is substantially aligned with the source location. The beam spot may further indicate the uncertainty in the polar angle determination by, for example, being larger or smaller according to the uncertainty. The modulation can also provide visual directional hints to the operator when the detector axis is close but not exactly aligned with the source, such as a circular beam spot with an asymmetric intensity pattern, which may be modulated temporally to indicate "close but not yet right on." Thus, the beam spot flicker modulation greatly assists the operator in locating the source precisely.

In a second embodiment of the light beam emitter, the light beam is not directed along the detector axis, but rather, is directed toward the calculated source location. To redirect the light beam, the light beam emitter itself may be rotatable using a gimbal, or a movable mirror or some other optical element may be used for redirecting the light beam toward the source direction according to some embodiments. In such cases, the light beam can be illuminated as soon as a source is detected, and the beam could then be directed toward the source according to the calculated azimuthal and polar angles, thereby illuminating the source location with the light beam. Such a directed beam can thereby provide a visually unmistakable indicator of the source location. The operator can then easily see where the source is located, namely at the spot illuminated by the beam. The beam spot may also be shaped, as an ellipse or rectangle for example, according to the uncertainties in the azimuthal and polar angle determinations, in which case the size of the beam spot may become progressively smaller as the angle determinations are improved with further detections. Since the detector may be usable both indoors and outside, day and night, the beam intensity may be adjusted according to the ambient light to provide enough brightness for easy visibility. Also, the light beam may be flickered or otherwise modulated to further increase its visibility in sunlight or among clutter. As the detector is moved or rotated, the polar and azimuthal angles can be continuously recalculated, and the light beam direction can be updated accordingly. The beam spot in that case can then seem to be "locked on" to the source location, remaining on that one spot no matter how the instrument is moved or rotated. In some embodiments, a tone or other non-visual indicator may be activated to alert the operator that a source has been found.

In some embodiments, the detector may include a camera such as a still or video camera. For example, in a first embodiment, the camera may be aligned with the detector axis, thereby imaging the scene as viewed by the detector. Preferably the current aim point of the detector is at the center of the image, or is otherwise indicated on the recorded image such as with a cross-hairs superposed on the image. Optionally the calculated source location may be indicated by an icon superposed on the image. The size of the icon may be configured to indicate the uncertainty in the source location determination. The processor may activate the camera automatically when the processor calculates the source location or when the detector axis is substantially aligned with the source. According to various embodiments, the camera may be configured to collect images continuously, or only upon operator command, or when the inspection begins and periodically thereafter, or whenever the detector is rotated, or according to other criteria. Further data may be superposed on the image or otherwise saved along with the image data, such as the state of the scintillators, the calculated azimuthal and polar angles, and/or other information related to the inspection.

In a second embodiment of the camera, the camera may be configured to acquire images centered not on the detector axis, but rather, on the calculated source direction. Thus the image can be centered according to the calculated azimuthal and polar angles, thereby recording the source location in detail. In some embodiments, the camera itself may be rotatable, using a gimbal for example. Alternatively, the camera may have a movable mirror to redirect the view to the calculated source direction. Preferably the source location is directly in the center of the image, and may be indicated by a superposed icon that may also indicate the uncertainty in the azimuthal and polar angle determinations at the time the image was acquired. As a further advantage of centering the image on the source location, the camera could easily magnify or zoom in on the source location without having to adjust the aim point. For example, in some embodiments, the camera centered on the source location can automatically take a series of photos with different magnification, thereby automatically exposing successively greater details about the source and its nearby clutter.

In some embodiments, the detector may be part of a hand-held meter with one or more haptic indicators configured to convey detection information to an operator of the detector. The haptic indicators may comprise pulsed or vibrating pads attached to the detector handle. The haptic indicators may be activated to alert the operator that the radiation level has increased above a limit, optionally as determined from the scintillator rates or other data. In some embodiments, the haptic indicators may be pulsed when the detector axis is brought into alignment with the source location, thereby informing the operator of the alignment without the operator having to look away from the scene. In some embodiments, a haptic indicator may be modulated according the magnitude of the polar angle, for example pulsing slowly when the polar angle is large and more rapidly as the aim point is brought closer to the source location. In some embodiments, a plurality of haptic indicators may be mounted around the handle and activated individually to indicate the azimuthal angle. The operator would thereby know which way to rotate the detector to approach the source location.

Turning now to the figures, FIG. 1 is a perspective sketch showing the spherical angles measured by a directional detector 100 according to the present disclosure. The detector axis, shown as a dot-dash line, is the central symmetry axis of the detector 100. The midplane 110 is shown as a dotted plane. The panel scintillator 103 is shown in stipple. The source is indicated by a star, and the angles by arrowed arcs. The azimuthal angle is a rotational angle measured around the detector axis, going counter-clockwise, with zero degrees at the right-side horizontal plane (shown in dash) as viewed from behind the detector 100. The polar angle is the overall angle between the detector axis and the source. The polar and azimuthal angles thus localize the source in two dimensions.

Figure 2:
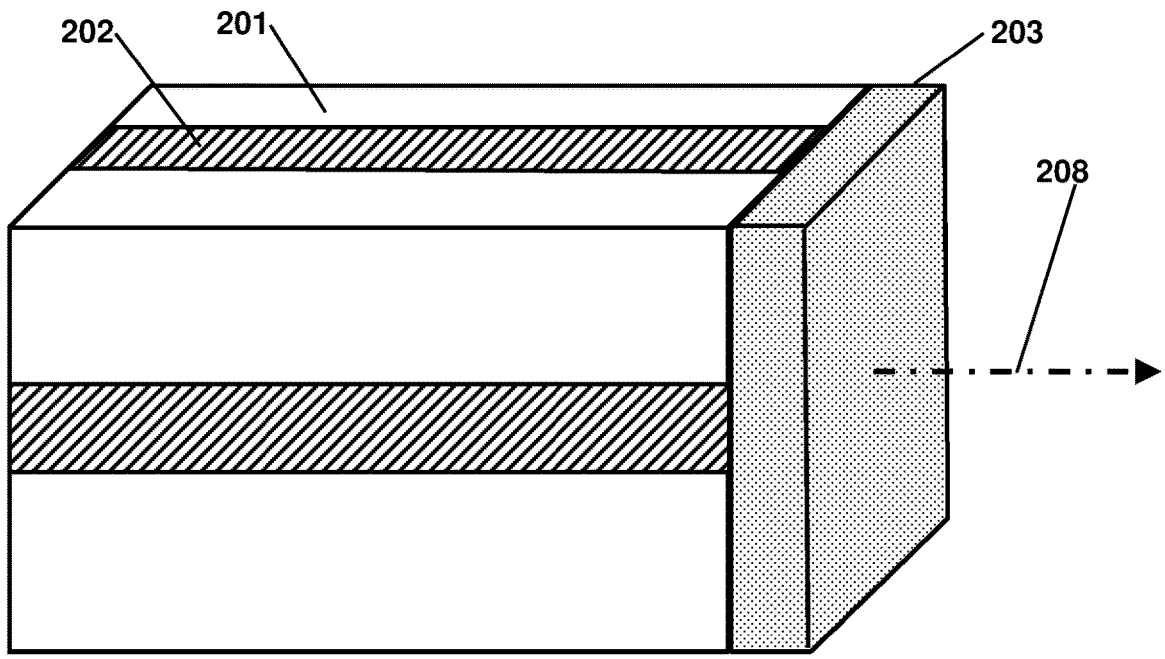
FIG. 2 is a perspective sketch of an exemplary directional detector according to the present disclosure with four rod scintillators.

FIG. 2 is a perspective sketch of an embodiment of the detector, comprising four rod scintillators 201, a shield 202 (edges shown in diagonal hatch), and a panel scintillator 203 (in light stipple). As shown by this figure, each rod scintillator 201 may have a right square prism shape, comprising scintillator material configured to produce a light pulse when traversed by an energetic charged particle such as an electron or an ion. The panel scintillator 203 may be a slab, configured to emit a light pulse when traversed by an energetic charged particle, and oriented perpendicular to the detector axis 208, and positioned frontward of the rod scintillators 201, and centered on the detector axis 208. The shield 202 comprises four shield plates, of which only two edges are visible in the sketch. The shield plates may be joined at the detector axis 208 so as to form a four-bladed fan, symmetrically arranged around the detector axis 208. Alternatively, and equivalently, the shield 202 may comprise two larger plates that intersect at the middle of each plate, thereby forming the same structure as that depicted. The shield 202 may substantially abut the panel scintillator 203 to maximize the detection efficiency in a compact assembly, or the panel scintillator 203 may be spaced apart from the shield 202 and the rod scintillators 201 for ease of assembly. The rod scintillators 201 may all be perpendicular to the panel scintillator 203 as shown in this figure.

In operation, the embodiment of FIG. 2 determines the polar and azimuthal angles of a source (not shown) of particles such as gamma rays or neutrons. The particles interact in one of the rod scintillators 201 or in the panel scintillator 203. The interaction produces secondaries comprising gamma-generated electrons or neutron-generated ions. The secondary particles then cause the scintillator 201 or 203 to emit a light pulse, which may be detected by a light sensor (not shown) and analyzed by a processor (not shown). The processor may calculate the azimuthal angle by comparing the counting rates (or other detection data) in the various rod scintillators 201. For example, the processor may determine the azimuthal angle of the source by interpolating between the angular positions of the two highest-counting rod scintillators 201. Or, more preferably, the processor can first calculate a differential associated with each rod scintillator 201, wherein the differential is equal to the counting rate of each rod scintillator 201 minus the counting rate of the diametrically opposite rod scintillator 201. The processor may then interpolate between the two highest differentials, to find the azimuthal angle of the source.

In some embodiments, the processor may calculate the polar angle by dividing a function of the rod scintillator 201 detection rates by the panel scintillator 203 detection rate, thereby obtaining a ratio. The processor may then compare that ratio to a predetermined angular correlation function, which directly reveals the polar angle of the source. In a preferred embodiment, the numerator equals the highest differential, plus a geometrical factor (usually 0.11) times the second-highest differential. With that formula, the same angular correlation function can be used for all azimuthal angles, which is a substantial simplification. The polar and azimuthal angles so calculated thereby locate the source direction relative to the detector axis 208 in two dimensions. In some embodiments, the source location may be determined using only the scintillator data acquired at a single position and a single orientation of the detector, and with no rotations, iterations, or complicated analysis required.

The embodiment of FIG. 2 is particularly efficient because the shield 202 is almost entirely surrounded by active scintillators 201 and 203, with only the edges of the shield 202 plates exposed to incoming particles. This is in contrast to prior-art systems in which many of the incident particles are lost by striking collimators or other external shields which block the particles before they reach any scintillator. In various embodiments of the detector disclosed herein, the incident particles encounter one of the active scintillators 201 or 203 first, and the particle reaches the shield 202 only after passing through one of the active scintillators 201 or 203. The shield 202 is not configured to block particles from reaching the detector; it prevents particles from passing between the rod scintillators 201. As a result, the detector avoids losing useful particles and provides a surprisingly high detection efficiency for a directional detector. In addition, the detector can determine the polar and azimuthal angles of sources anywhere in the front half-space with high precision.

In an embodiment for detecting gamma rays, the rod scintillators 201 and the panel scintillator 203 may be any organic or inorganic scintillator, but preferably not ZnS which is not sensitive to the lightly-ionizing electrons from gamma interactions. If the scintillators 201 and 203 are hygroscopic such as NaI, each scintillator 201 and 203 can be enclosed in a sealed enclosure, or else the entire detector could be hermetically sealed. In the embodiment of FIG. 2, as an example, the rod scintillators 201 may be PVT scintillators, with dimensions 35 mm square, and 150 mm long in the front-back direction. The panel scintillator 203 may be BGO with a thickness of 10 mm. The shield 202 preferably comprises any high-Z, high-density solid such as lead or tungsten, although other materials such as leaded glass or steel can work if sufficiently thick. The thickness of each plate of the shield 202 can be thick enough to block or attenuate over 50% of the orthogonally incident gammas, thereby providing sufficient isolation between the rod scintillators 201 to enable the azimuthal angle determination with just a few detected particles. Likewise, the polar angle can be determined from the panel scintillator 203 data with just a few detected particles according to the predetermined angular correlation function.

In some embodiments, the thickness of the panel scintillator 203 is thick enough to detect a sufficient number of the incident particles to provide a definite polar angle determination, but not so thick that it significantly shadows the rod scintillators 201. In some embodiments, the thickness of the panel scintillator 203 is sufficient to detect 10% to 50% of the orthogonally incident particles, with the rest traveling through the panel scintillator unscattered. In other embodiments, the panel scintillator 203 is thick enough to detect substantially all of the particles orthogonally incident on the panel scintillator 203, while the rod scintillators 201 primarily detect particles that pass beside the panel scintillator 203 as well as particles that scatter in the panel scintillator 203 and then pass through to the rod scintillators 201.

In some embodiments, the design can be adapted for detecting fast neutrons. For example, the rod scintillators 201 and the panel scintillator 203 may comprise stilbene or a plastic scintillator material that incorporates an ionization-density-dependent fluor that produces different pulse shapes when traversed by an electron versus a recoil proton. Alternatively, the scintillators 201 and 203 could comprise an inorganic scintillator that produces different pulses for different particles, such as CsI, embedded in a transparent hydrogenous matrix, such as acrylic. Such ionization-dependent scintillators enable discrimination between neutron and gamma events on the basis of the pulse shape. Alternatively, the scintillators 201 and 203 could be ZnS embedded in a hydrogenous matrix such as acrylic and optionally configured with a wavelength shifter for improved light collection. In some embodiments, a shield 202 suitable for fast neutron shielding comprises a hydrogenous polymer such as HDPE, preferably made thick enough to degrade most of the fast neutrons incident on the shield 202 by multiple elastic n-p scattering, so that the scattered neutrons have insufficient energy to be detected in the rod scintillators 201 after scattering in the shield 202.

For detecting slow neutrons, the rod scintillators 201 may be ZnS, embedded in a transparent matrix with wavelength shifters, and loaded with a neutron-capture nuclide such as $^{10}B$ or $^{6}Li$, and configured so that the emitted ions from neutron capture may readily pass into the scintillator. The shield 202 for slow neutrons may comprise HDPE loaded with a neutron-capture nuclide such as LiF. Lithium is a preferred neutron-capture nuclide for shielding because it efficiently absorbs low-energy neutrons while generating very few gamma rays. Alternatively, if the scintillators 201 and 203 are of the gamma-blind type, then the shield 202 may include a neutron capture nuclide that has a larger capture cross section but emits gamma rays, such as B or Gd.

Figure 3:
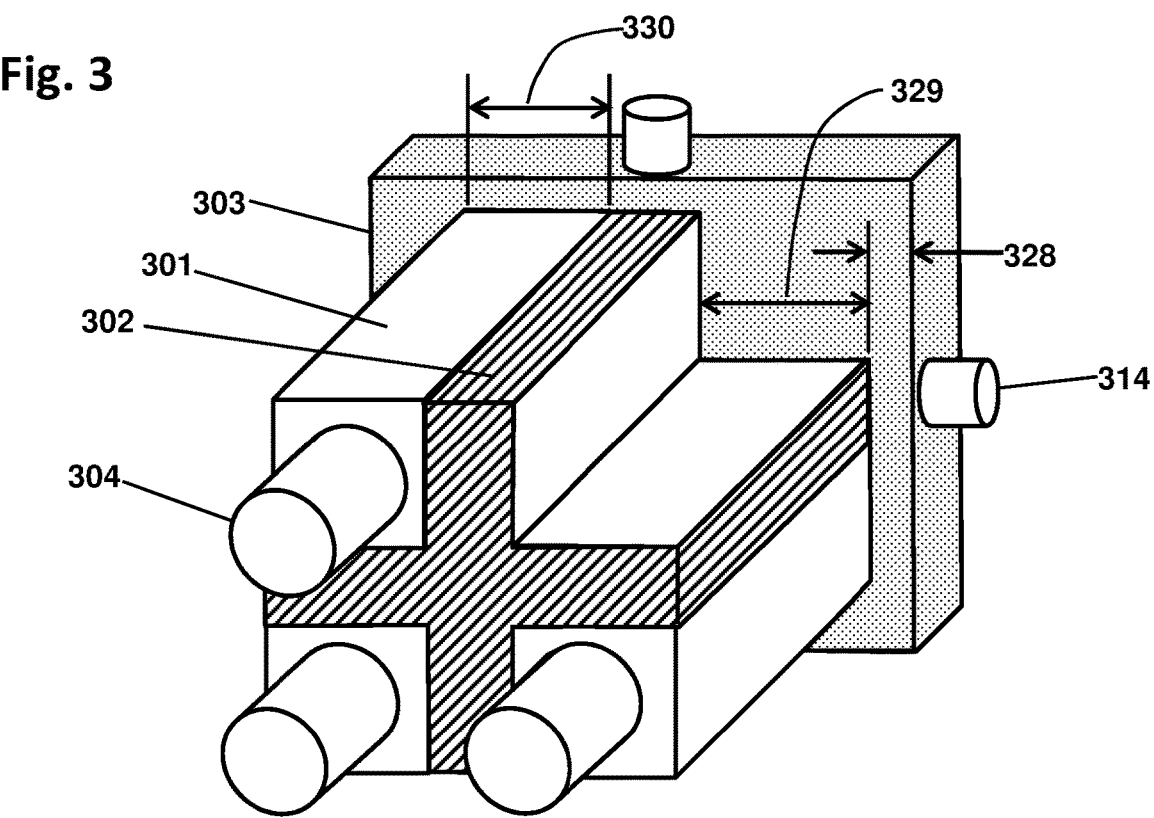
FIG. 3 is a rear-view perspective sketch of the exemplary directional detector of FIG. 2 but with light sensors and a larger panel scintillator.

FIG. 3 is a rear-view perspective sketch of a detector similar to FIG. 2 but with additional options. Four rod scintillators 301 may be positioned in, and mutually isolated by, a shield 302 shaped as a plus-symbol (edges are shown in diagonal hatch). A panel scintillator 303 may sit frontward of the rod scintillators 301 (only three are shown) and frontward of the shield 302. The detector as shown points away from the viewer. In addition, light sensors 304 such as phototubes view the rod scintillators 301, and small light sensors 314 such as photodiodes view the panel scintillator 303. The back light sensors 304 are preferably positioned on the rear surfaces of the rod scintillators 301 so as to avoid blocking particles arriving from the front half-space. The small front light sensors 314 may be aligned with the shield 302 to minimize obscuring the rod scintillators 301 for particles arriving from various angles.

Alternatively, instead of the small light sensors 314, a fifth phototube (not shown) can be mounted centrally on the panel scintillator 303. The fifth phototube may block some incoming particles, but such blocking effects can be fully accounted for in the angular correlation function Also, the fifth phototube, if centrally mounted, may be positioned mainly over the shield 302 area, thereby further minimizing any interference with the rod scintillators 301.

As a further alternative, instead of using separate phototube light sensors 304, the rod scintillators 301 can be viewed by a large planar photocathode, followed by a multichannel plate charge amplifier, all mounted across the back of the detector. The charge amplifier can be configured with four separate anodes to record light from each of the rod scintillators 301 separately. Likewise, the panel scintillator 303 can be viewed by a similar planar photocathode-multichannel amplifier, but with a single anode spanning the panel scintillator. Such planar light sensors can be made thin enough to avoid blocking a significant fraction of the incoming particles according to some embodiments.

The panel scintillator 303 is shown extending laterally beyond the rod scintillators 301 by a distance 328. The additional area of the panel scintillator 303 can provide additional detection efficiency, and can also tailor the angular correlation function in various ways depending on the other design parameters.

The figure also shows the radial width 329 of the shield, which is the distance from the outer edge of the shield 302 to the nearest surface of the adjacent shield plate. In some embodiments, the rod scintillators 301 can fit into that space. Accordingly, the lateral width 330 of a rod scintillator 301 can be equal to the radial width 329 of the shield 302.

Figure 4:
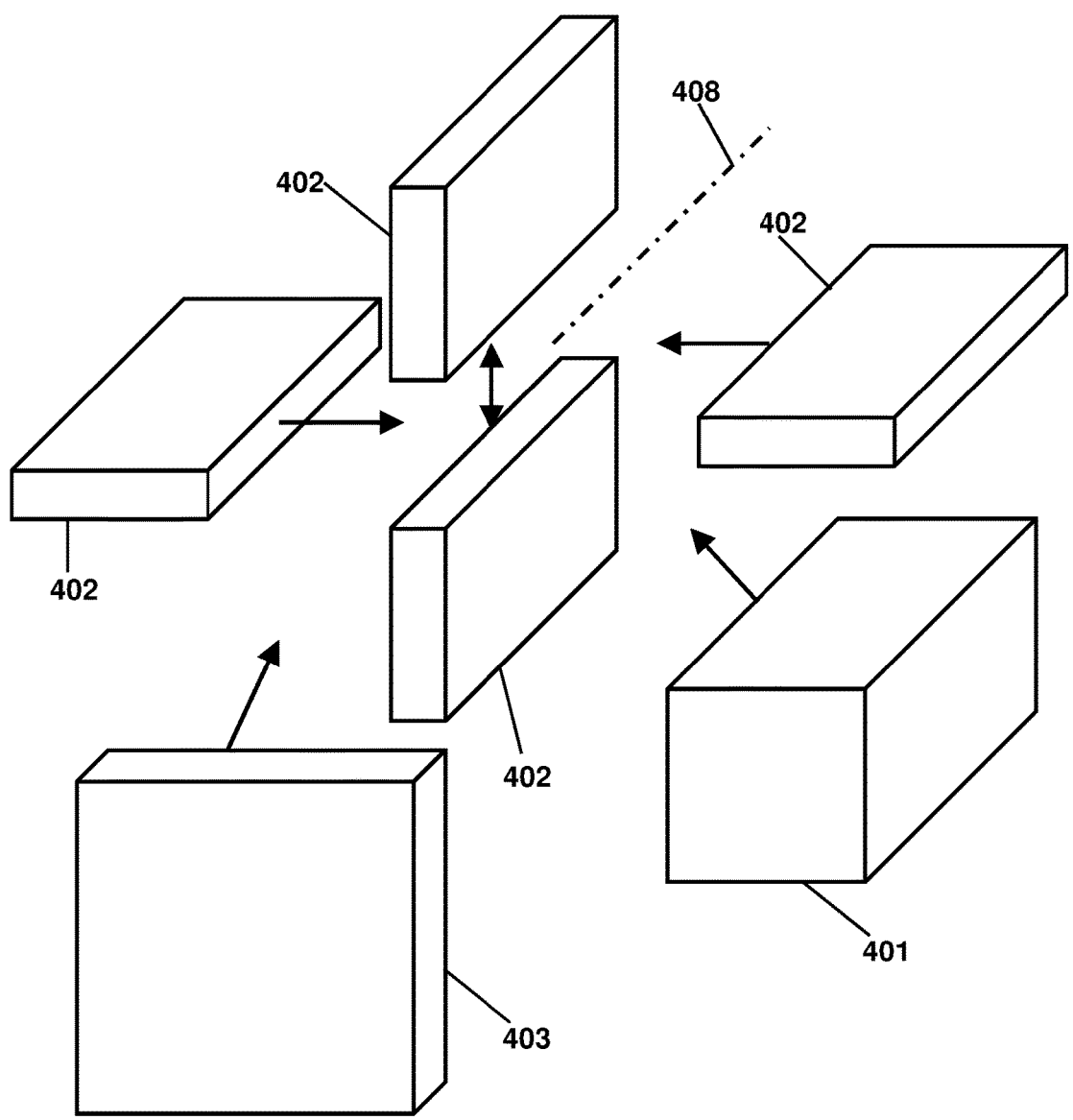
FIG. 4 is an exploded perspective sketch of the exemplary directional detector of FIG. 2 with shield plates, rod scintillators, and panel scintillator all separated.

FIG. 4 is an exploded view of the detector with N=4. Accordingly, four shield plates 402 can be assembled symmetrically abutting the detector axis 408. Or, equivalently, two larger plates (not shown) that span the rod scintillator array 401 may be configured to intersect at the midline of each of the larger plates, thereby comprising a structure equivalent to the four shield plates 402 shown. Four rod scintillators 401 (only one shown) may be inserted between and among the shield plates 402 so that each shield plate 402 is adjacent to exactly two of the rod scintillators 401 and each rod scintillator 401 is adjacent to exactly two of the shield plates 402. Each rod scintillator 401 may comprise a right square prism with an extrusion axis parallel to the detector axis 408 and perpendicular to the panel scintillator 403. The panel scintillator 403 may then be emplaced frontward of the rod scintillators 401 and orthogonal to the detector axis 408 and centered on the detector axis 408 as indicated by arrows. The assembled detector faces the viewer.

Figure 5:
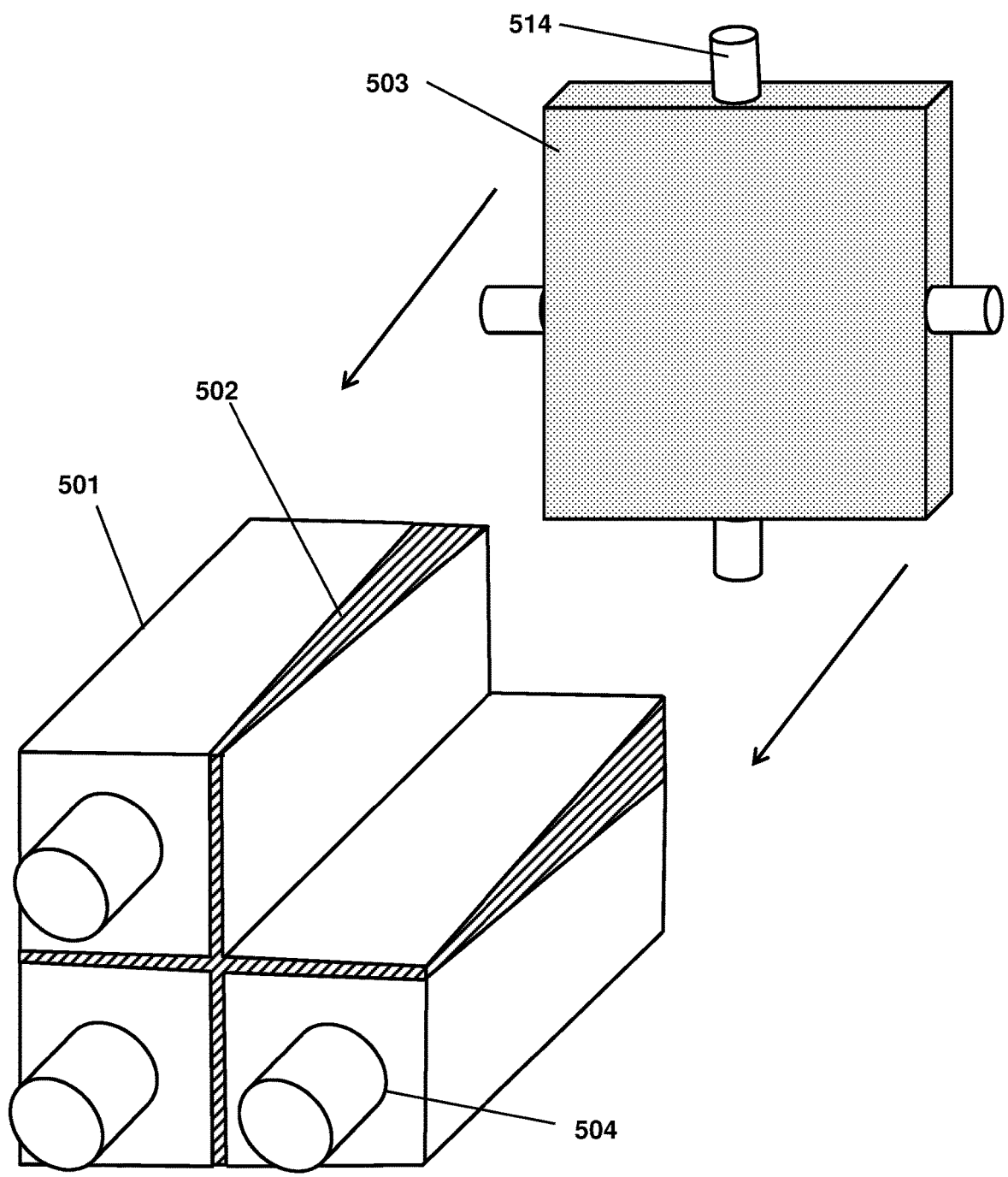
FIG. 5 is a perspective sketch, partially exploded, of the exemplary directional detector with tapered shield plates.

FIG. 5 is a perspective sketch, partially exploded, of a detector with a four-sided shield 502, four rod scintillators 501 (only three shown), a panel scintillator 503, light sensors 504 attached to the rod scintillators 501, and small light sensors 514 attached to the panel scintillator 503. The detector is facing away from the viewer. For graphical clarity, only the edges of the shield 502 are shown in diagonal hatch, with all other surfaces shown unadorned. When assembled, a fourth rod scintillator 501 can fit into the empty slot of the shield 502, and the panel scintillator 503 may then be mounted frontward of the rod scintillators 501 either abutting the front surface of the shield 502, or spaced apart from the front surface of the shield 502, for example to accommodate a hermetic enclosure (not shown) or reflective material (not shown) between the panel scintillator 503 and the rest of the detector.

The plates of the shield 502 are tapered in this embodiment, being thicker in the front and thinner in the back. Tapering can reduce the weight. In some embodiments, a tapered shield 502 can provide sufficient isolation between the rod scintillators 501 if the maximum thickness of each shield 502 plate is sufficient to block or attenuate over half of the orthogonally incident particles. The rod scintillators 501 may be regular square-cross-section prisms, or they may be tapered oppositely to the shield 502 so as to fit tightly into the shape of the opening between the tapered shield plates 502. As an added benefit, the partial tapering of the rod scintillators 501 can also enhance light collection by reflecting scintillation light preferentially toward the back of the detector.

Figure 6:
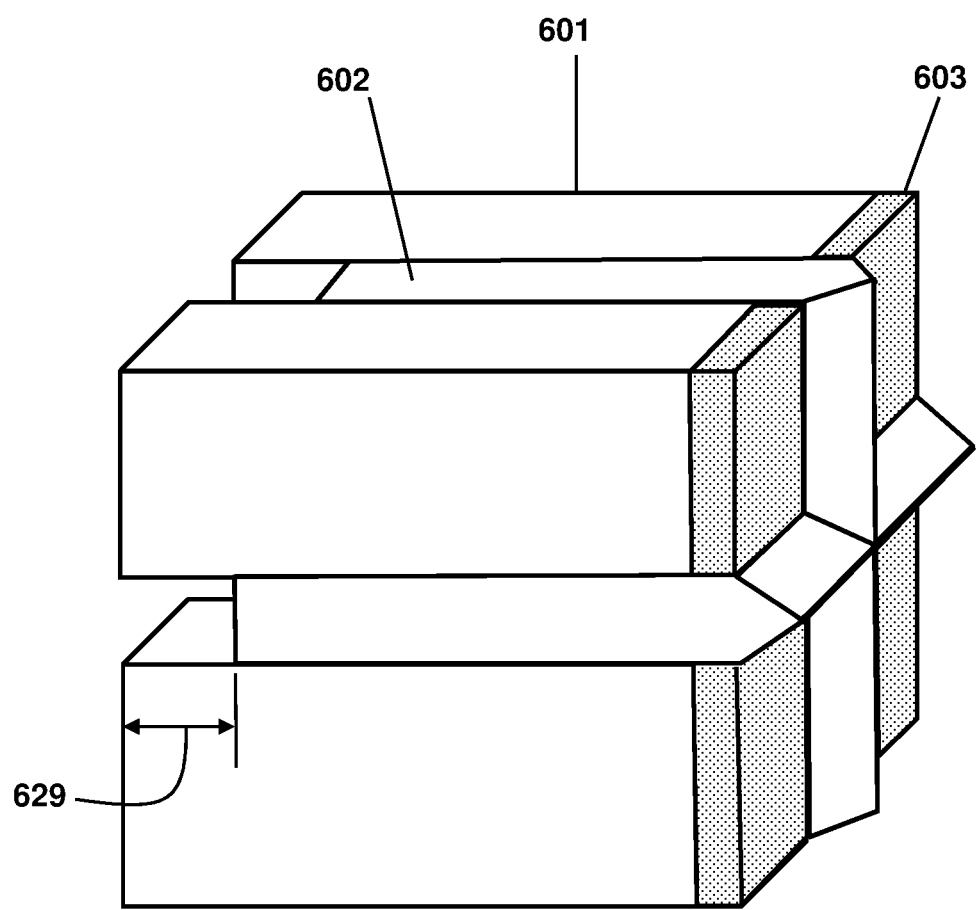
FIG. 6 is a perspective sketch of the exemplary directional detector including shield truncation, shield protrusion, and a panel scintillator separated into portions.

FIG. 6 is a perspective sketch of a directional detector with rod scintillators 601, a shield 602, and four separate panel scintillator portions 603. Each panel scintillator portion 603 can be mounted adjacent to the front surface of one of the rod scintillators 601, respectively. Also, the shield 602 may be truncated, or cut short at the back end, by a truncation distance 629 in order to save weight. Stated differently, the rod scintillators 601 can extend rearward beyond the back end of the shield 602 by the truncation distance 629. The shield 602 can also protrude frontward beyond the rod scintillators 601 and optionally beyond the panel scintillator portions 603, so as to provide improved angular resolution. Also the protrusion may be peaked in the frontward surface to further tailor the angular response. Each panel scintillator 603 can be optically coupled to its adjacent rod scintillator 601, and light sensors (not shown) can be mounted on the back surface of each rod scintillator 601. For example, the panel scintillator portions 603 can be made of BGO, while the rod scintillators 601 can be made of plastic PVT material, resulting in light pulses with sufficiently different decay times (5 ns versus 300 ns) so that they can be separated by pulse-shape analysis.

Figure 7:
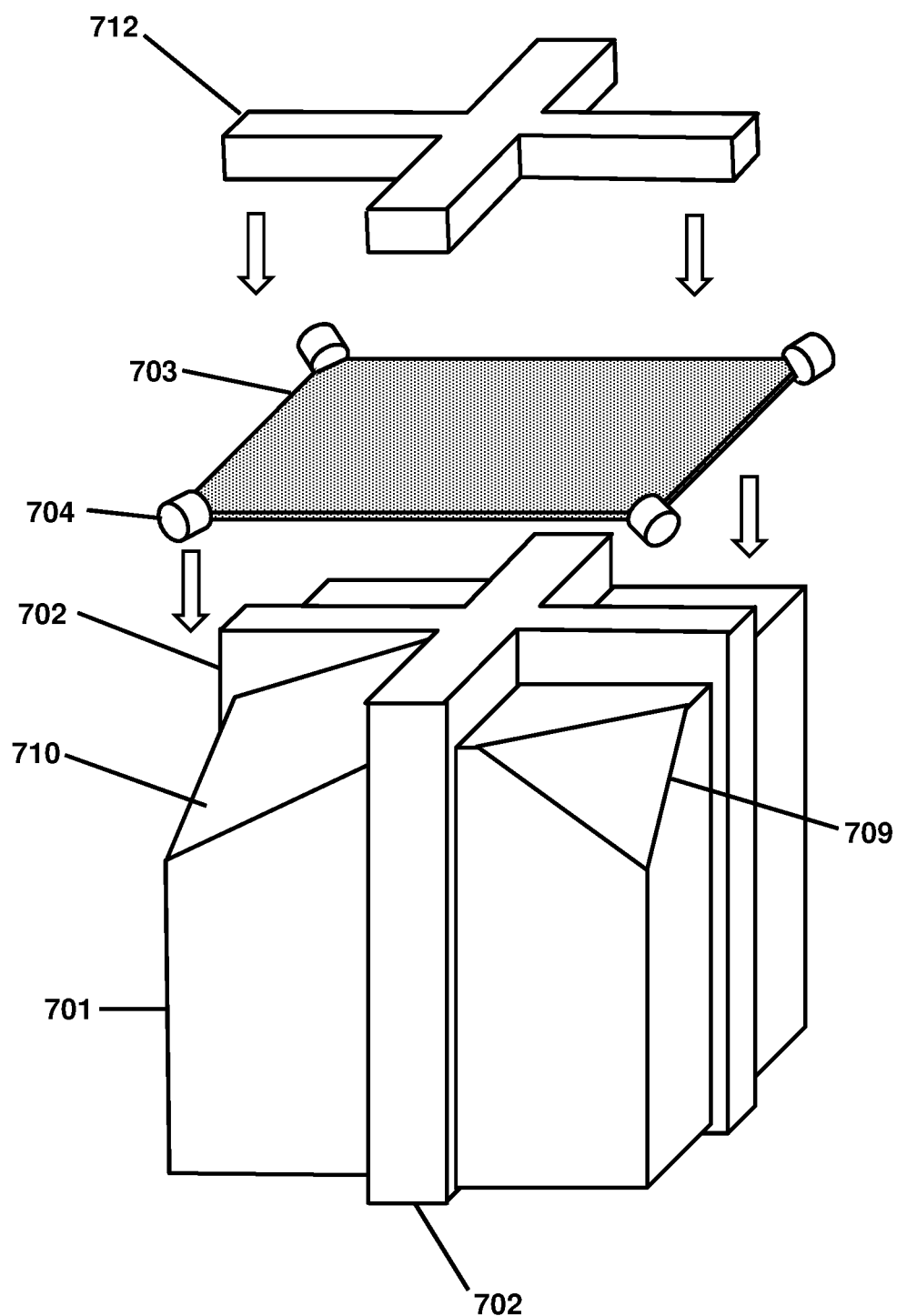
FIG. 7 is a perspective sketch, partially exploded, of the exemplary directional detector with beveled rod scintillators, a shield protrusion, a monolithic panel scintillator, and a shield slug.

FIG. 7 is a perspective sketch, partially exploded, of an embodiment comprising rod scintillators 701, a shield 702, a panel scintillator 703, and a shield slug 712. Small light sensors 704 can be attached to the corners of the panel scintillator 703. As an option, the rod scintillators 701 may be beveled 709 or 710, to tailor the angular response. The bevels 709 and 710 are shown cut at a bevel angle of about 45 degrees relative to the detector axis (not shown, but centered on the shield 702 as usual). A partial bevel 709 is partial in that it covers only a part of the frontward surface of a rod scintillator 701, while a full bevel 710 covers the entire frontward surface. In both cases, the bevel 709 or 710 can be configured to eliminate scintillator material that would be impacted by particles arriving at oblique angles, such as 45 degrees, that pass over the front of the shield 702. Such particles would otherwise be detected in the downstream rod scintillator 701, which would dilute the angular determination. The shield 702 is shown protruding in the frontward direction, so as to provide high angular precision in determining the polar angle of the source.

The shield 702 as depicted also slightly protrudes in the lateral directions as well, to further isolate the various rod scintillators 701 and enhance the determination of the azimuthal angle. The shield slug 712 can be shaped much like the shield 702 in cross-section, thereby further sharpening the angular resolution by preventing particles from passing over the shield 702 and striking one of the downstream rod scintillators 701.

Figure 8:
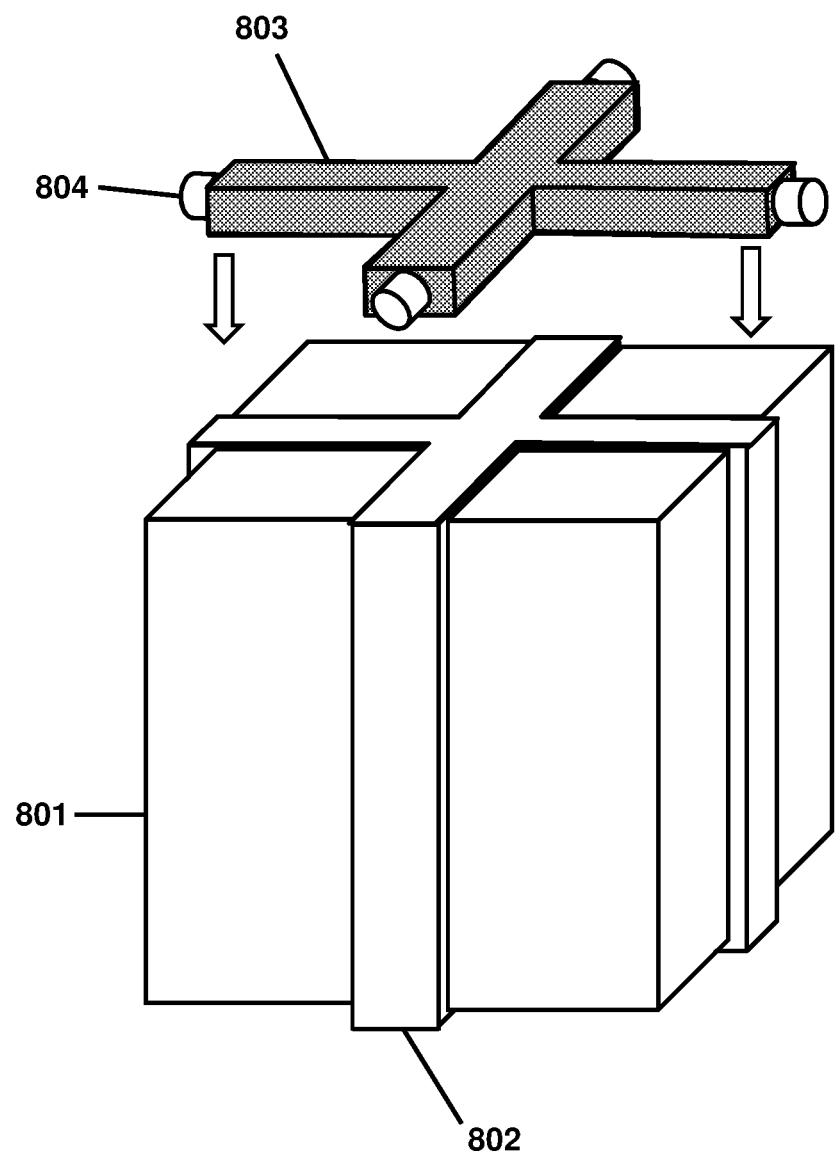
FIG. 8 is a perspective sketch, partially exploded, of an exemplary directional detector in which the panel scintillator is shaped like the shield so as to leave the rod scintillators unobstructed from the front.

FIG. 8 is a perspective sketch, partially exploded, of a detector with rod scintillators 801 in a 4-plate shield 802, and a novel panel scintillator 803 shaped to resemble the shape of the shield 802. Thus the panel scintillator 803 is equivalent to a slab with four corner pieces removed, so that the remaining volume has the same cross-sectional shape as the shield 802. Small light sensors 804 can be mounted on the ends of the "arms" of the shaped panel scintillator 803. An advantage of shaping the panel scintillator 803 in this way is that the rod scintillators 801 can be entirely unobstructed for source particles when the detector is aimed at the source. Thus in some embodiments, there is no shadowing by the panel scintillator 803 for particle from the front, since the panel scintillator 803 resides only over the shield 802. A second advantage is that the panel scintillator 803 can act as a partial shield slug, similar to the shield slug 712 of FIG. 7, thereby partially blocking oblique particles from reaching the downstream rod scintillators 801 and thereby sharpening the angular resolution.

Figure 9:
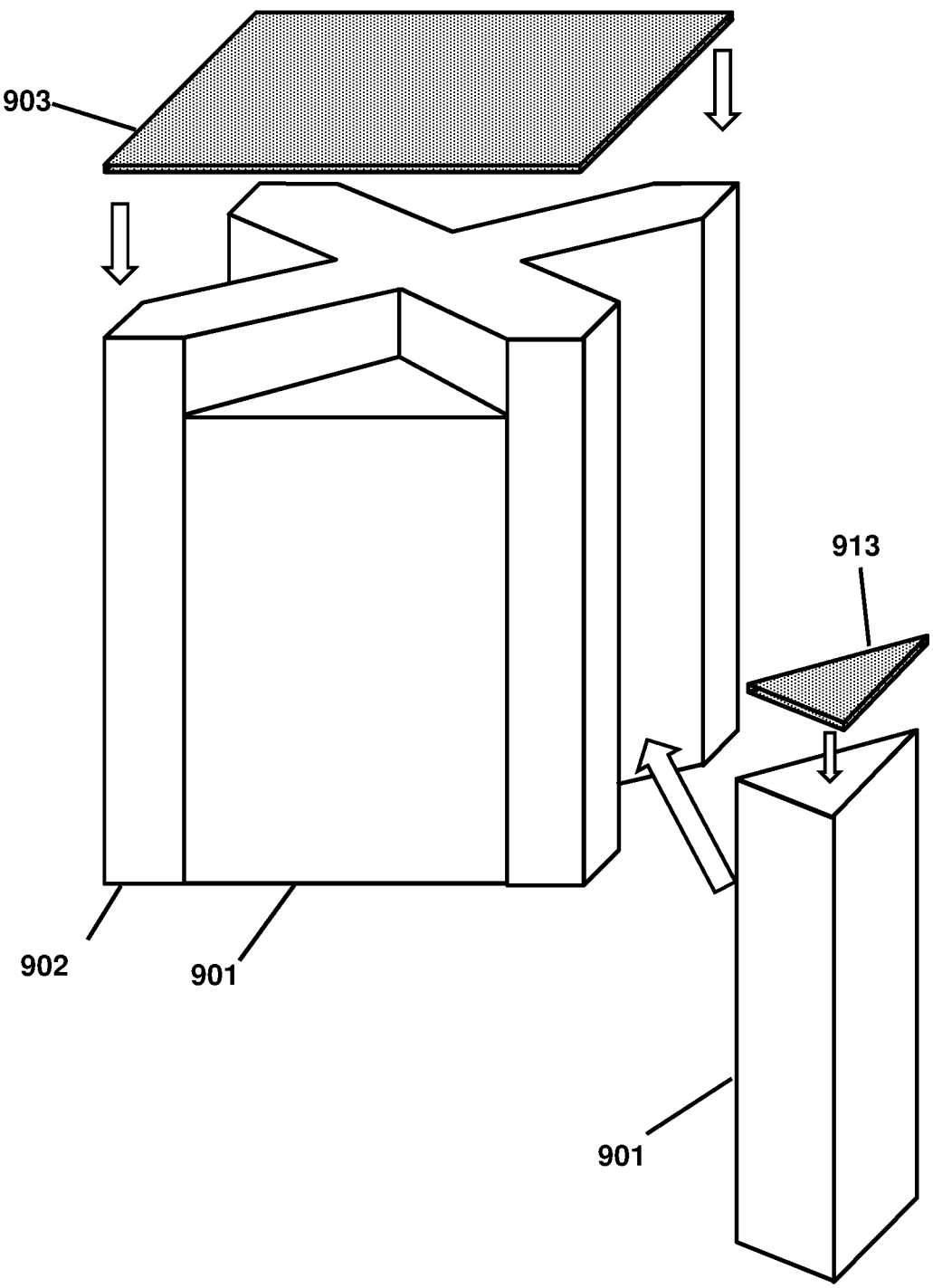
FIG. 9 is a perspective sketch, partially exploded, of an exemplary directional detector with triangular shaped rod scintillators, and two options for mounting the panel scintillator.

FIG. 9 is a partially exploded perspective sketch of a detector with four triangular-prism-shaped rod scintillators 901, an "X"-shaped shield 902, and a monolithic panel scintillator 903 that is intended to reside upon the front edge of the shield 902. In another embodiment, the monolithic panel scintillator 903 is mounted spaced above the front edge of the shield 902, for example to leave room for light sensors (not shown). As an alternative, instead of the monolithic panel scintillator 903, the detector may include four separate panel scintillators 913 as shown attached to one of the rod scintillators 901. In comparison to the other designs, the triangular rod scintillators 901 can have better isolation and better angular resolution than a square cross-section rod scintillator, but lower detection efficiency due to the reduced volume of scintillator. Also, the X-shaped shield 902 is 40% heavier than a plus-symbol-shaped shield of the same size and performance, such as 802 in FIG. 8.

Figure 10:
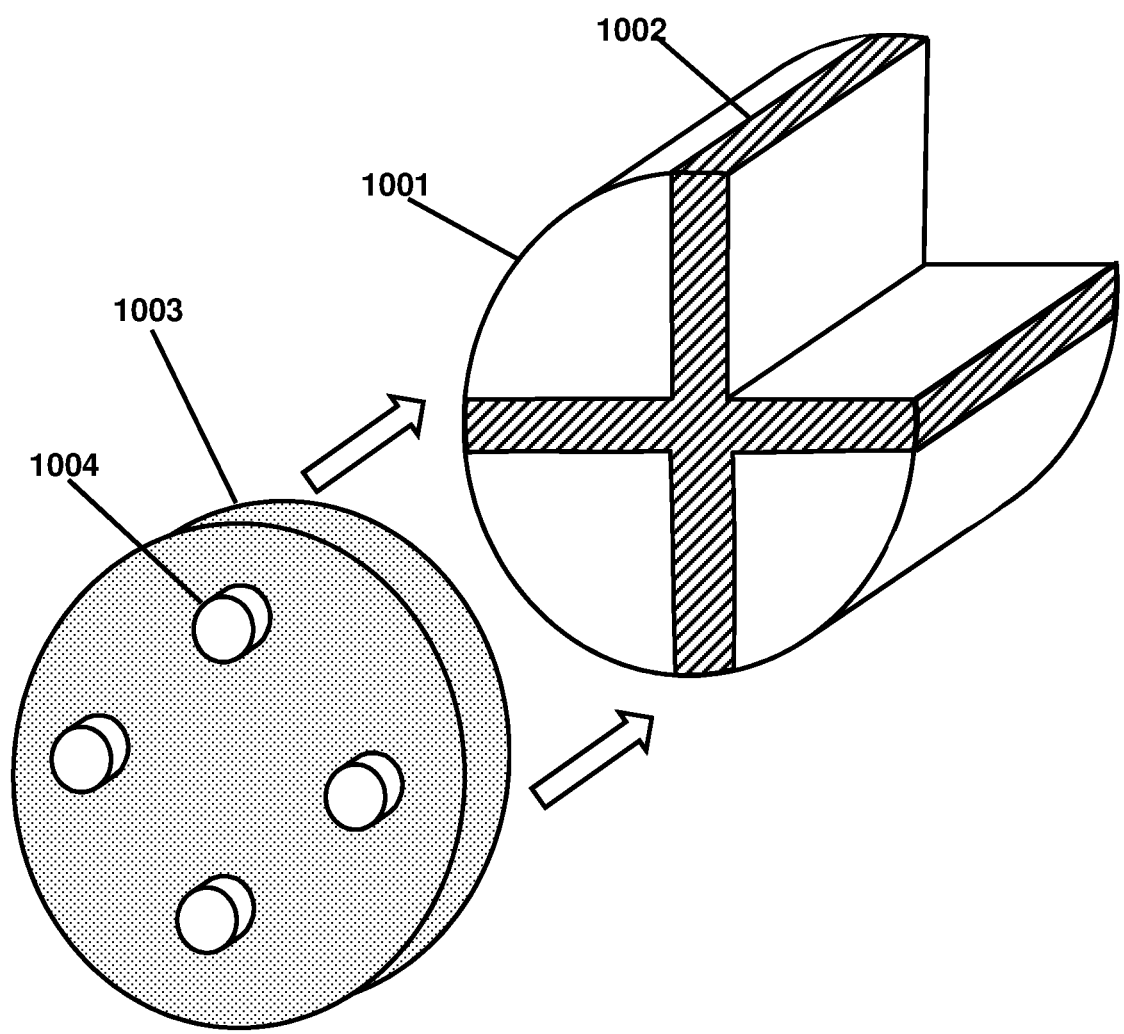
FIG. 10 is a perspective sketch, partially exploded, of an exemplary cylindrical version of a directional detector.

FIG. 10 is an exploded perspective sketch of a detector as a cylindrical, four-sided detector. It is facing the viewer. The configuration includes four rod scintillators 1001 (only three shown), each shaped as a 90-degree pie-section prism, and mounted into a four-plate shield 1002. A disk-shaped panel scintillator 1003 includes four solid-state light sensors 1004. The light sensors 1004 may be positioned in alignment with the shield 1002 plates, so as to minimize shadowing of the rod scintillators 1001.

The pie-section-shaped rod scintillators 1001 have efficiencies and angular resolutions which are intermediate between those of the square rod scintillators 801 of FIG. 8, and the triangular rod scintillators 901 of FIG. 9. In some applications, the cylindrical shape of the embodiment of FIG. 10 can fit geometrical constraints better than the other shapes.

Figure 11A:
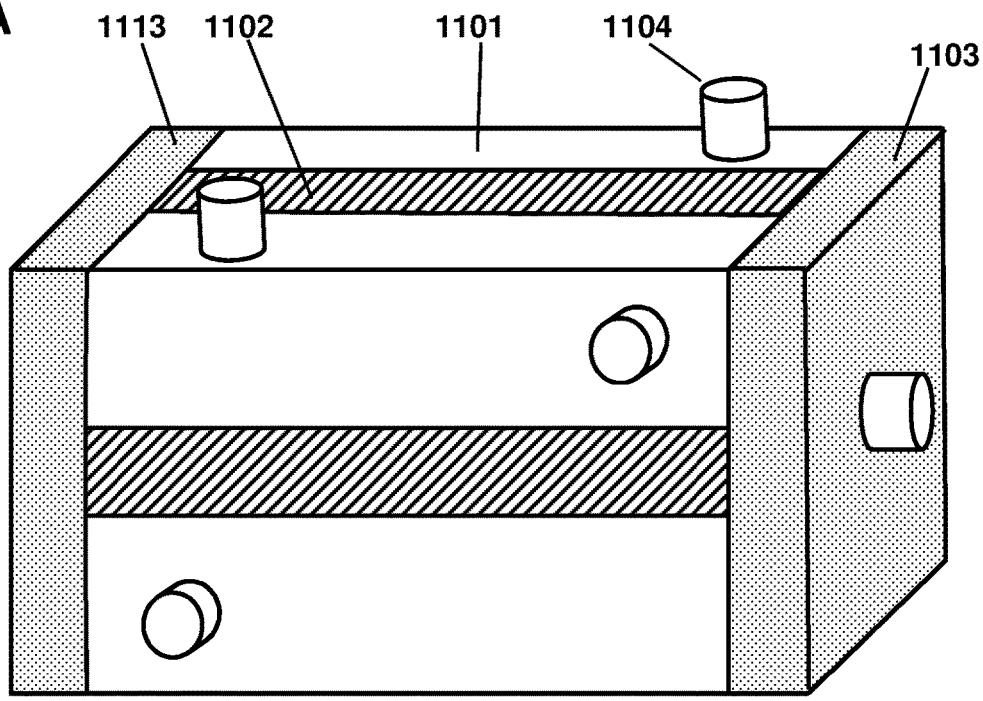
FIG. 11A is a perspective sketch of an exemplary double-ended version of a directional detector

FIG. 11A is a perspective sketch of a bi-directional or double-ended detector, with rod scintillators 1101, a shield 1102, a first panel scintillator 1103 and a second panel scintillator 1113. Light sensors 1104 are also shown. The first and second panel scintillators 1103 and 1113 can receive particles from the front and back half-space regions respectively, thereby covering a full 4π solid angle of view. The processor (not shown) can determine whether the source is in front or behind the detector by comparing the detection rates of the first and second panel scintillators 1103 and 1113. Then the processor can analyze the rod scintillator 1101 detection rates to determine the azimuthal angle of the source. The processor may then calculate a ratio according to the rod scintillator 1101 data, divided by the counting rate of whichever panel scintillator 1103 or 1113 has the higher detection rate. The processor may then compare that ratio to a predetermined angular correlation function that directly indicates the polar angle of the source.

The bi-directional or double-ended version of FIG. 11A is particularly useful in a mobile area scanner that searches for hidden weapon material throughout a wide area on both sides of the mobile scanner. The bi-directional detector is also useful in a vehicle inspection station in which multiple parallel lanes are active at the same time, so that two vehicles in adjacent lanes could be scanned simultaneously by a double-ended detector stationed between the vehicles.

Figure 11B:
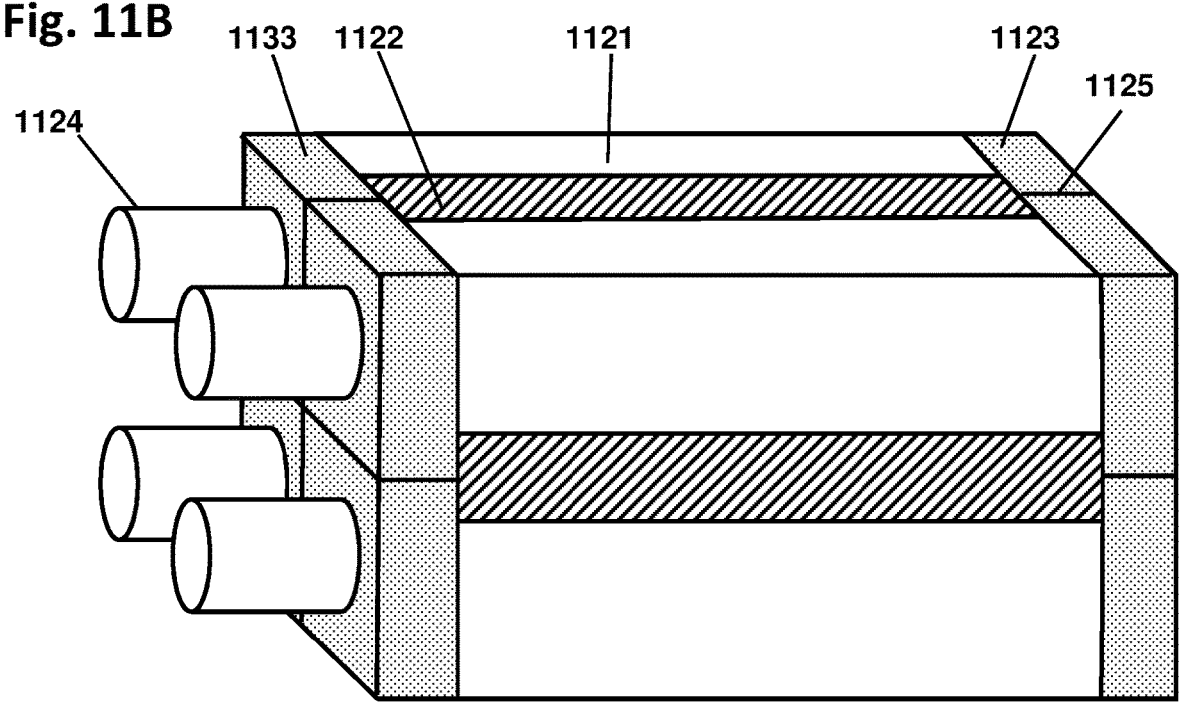
FIG. 11B is a perspective sketch of the exemplary version of FIG. 11A with different light sensors.

FIG. 11B is a perspective sketch of a bi-directional detector such as that of FIG. 11A, but here the first and second panel scintillators 1123 and 1133 are divided into portions, and each such portion 1123 or 1133 is optically coupled to the intervening rod scintillator 1121, and all three are viewed by a shared light sensor 1124. The shield 1122 is shown. Foil or other light reflective separators 1125 are disposed between the various first panel scintillator portions 1123 where they touch, and likewise between the second panel scintillator portions 1133 where they touch. The first and second panel scintillator portions 1123 and 1133, and the rod scintillators 1121, are made from three different types of scintillator material with distinct pulse shapes so that they can be distinguished in analysis. For example, the rod scintillators 1121 may be PVT with a 5 ns pulse width, the first panel scintillator portions 1123 may be BGO with a 300 ns pulse width or NaI with a 230 ns pulse width, and the second panel scintillator portions 1133 may be $CaF_2$ with a 900 ns pulse width or $CdWO_4$ with a 1100 ns pulse width. An advantage of optically coupling the scintillators is economy, since only four light sensors 1124 are needed in the embodiment shown. It may be noted that some particles are blocked by the light sensors 1124, resulting in an asymmetry, but this is easily resolved by calibration.

Figure 12A:
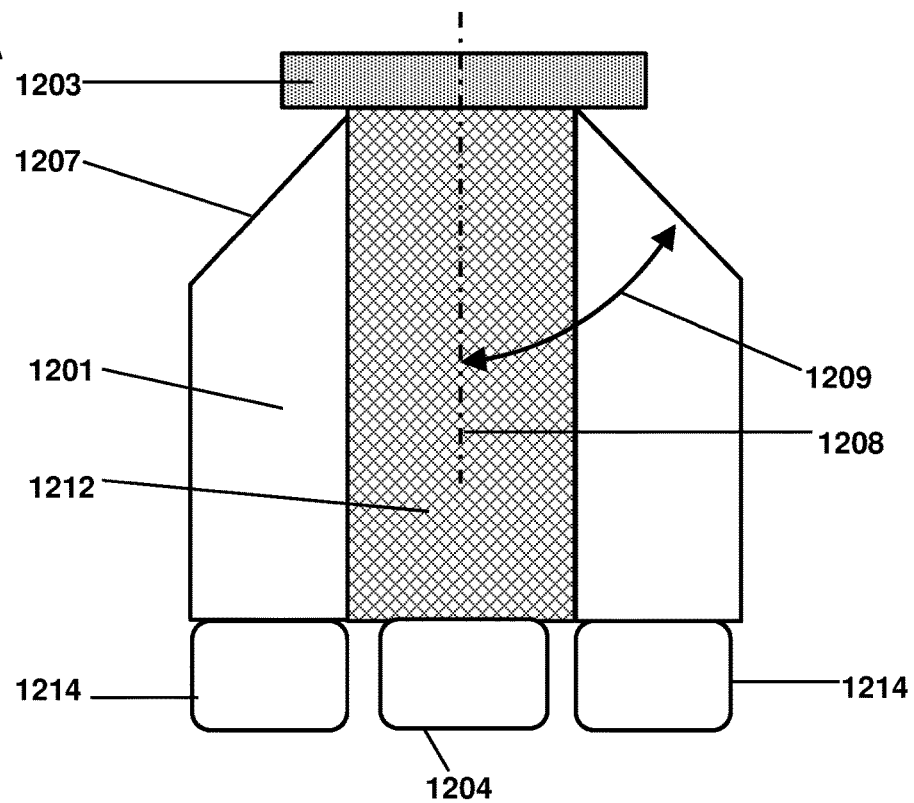
FIG. 12A is a longitudinal cross-section sketch of an exemplary directional detector with a transparent shield optically coupled to the panel scintillator, and beveled rod scintillators.

FIG. 12A is a longitudinal cross-section (that is, cut parallel to the detector axis) sketch of an embodiment of the invention in which a transparent shield portion 1212 (shown in cross-hatch) can be optically coupled to a panel scintillator 1203 and to a light sensor 1204. Four rod scintillators 1201 (two are shown) are viewed by other light sensors 1214. The transparent shield portion 1212 serves as a light guide for light pulses from the panel scintillator 1203. One advantage of this configuration is that all of the light sensors 1204 and 1214 can be mounted on the back of the detector, away from incoming particles. As an example, a detector configured for detecting fast neutrons could use transparent acrylic or other transparent hydrogenous polymer for the transparent shield portion 1212, which can thereby serve as both a shield and a light guide. For gamma ray applications, the transparent shield portion 1212 can be leaded glass with sufficient loading and thickness to block over 50% of gammas. For slow neutrons, the transparent shield portion 1212 may be acrylic with LiF or other neutron capture nuclide embedded in or coated on the acrylic.

The panel scintillator 1203 is shown smaller than the array of rod scintillators 1201. In these embodiments, the reduced-size panel scintillator 1203 improves the ability of the rod scintillators 1201 to detect particles when the detector axis 1208 is aligned with a source by leaving part of each rod scintillator 1201 unobscured from the front. Hence the panel scintillator 1203 can be made thick enough to detect substantially all of the particles orthogonally incident on the panel scintillator 1203 without substantially obscuring the rod scintillators 1201. The rod scintillators 1201 are also shown with a front-end bevel 1207 cut at an angle 1209 of about 45 degrees relative to the detector axis 1208. The bevel 1207 can improve the angular contrast by preventing particles that pass over the shield portion 1212 from being detected in the downstream rod scintillator 1201.

Figure 12B:
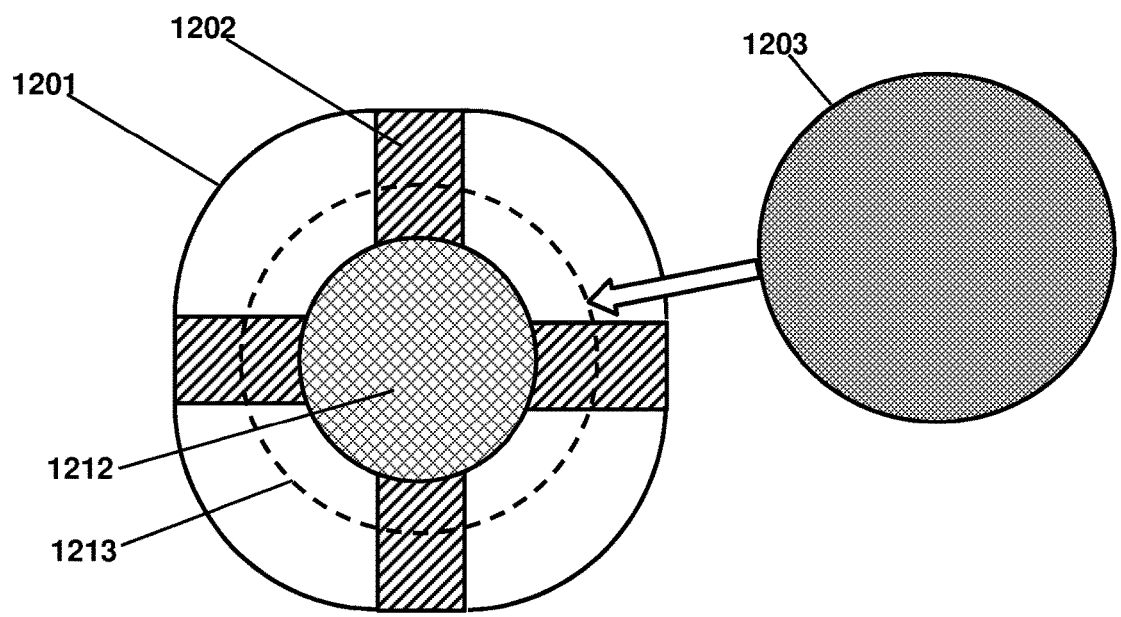
FIG. 12B is a transverse cross-section sketch of an exemplary directional detector showing the transparent shield portion in relation to the shield plates.

FIG. 12B is a transverse cross-section (perpendicular to the detector axis) sketch of the configuration of FIG. 12A with corresponding items being labeled the same. The four rod scintillators 1201 may be arcuate cross-section prisms separated by shield plates 1202 abutted to a central transparent shield portion 1212 which may be cylindrical. The shield plates 1202 are considered to substantially abut each other since they abut the transparent shield portion 1212, thereby forming a substantially continuous shield structure that isolates the rod scintillators 1201 from each other. The panel scintillator 1203, shown displaced in this view, can be installed at the dashed circle 1213 and optically coupled to the transparent shield portion 1212 which is coupled to a rear-mounted light sensor 1204 (not shown in this view). When the detector axis 1208 is aligned with the source, the rod scintillators 1201 are almost entirely exposed to the source particles, due to the smaller size of the panel scintillator 1203. Also, most of the area covered by the panel scintillator 1203 can be occupied by the shield plates 1202 or the central transparent shield portion 1212. Therefore, the amount of shadowing over the rod scintillators 1201 is negligible according to various embodiments.

Figure 13:
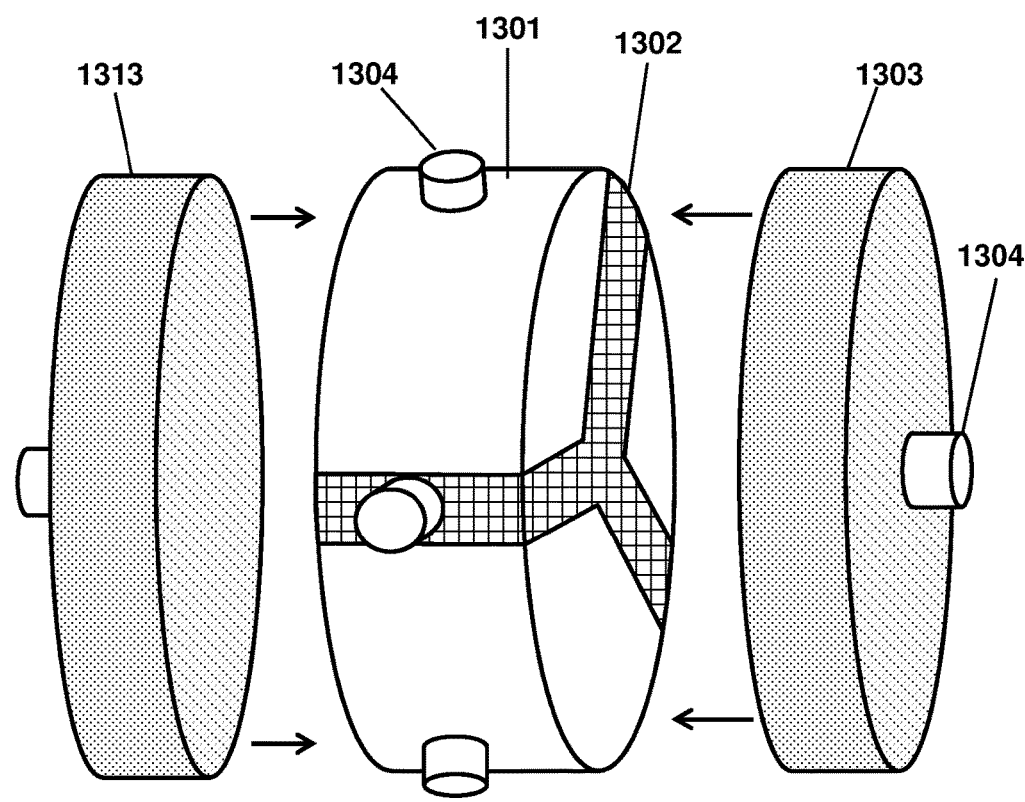
FIG. 13 is a perspective sketch, partially exploded, of an exemplary directional detector with three rod scintillators and two panel scintillators front and back.

FIG. 13 is an exploded perspective sketch of a directional detector with three-fold symmetry, having three pie-sector-shaped rod scintillators 1301, a first panel scintillator 1303 and a second panel scintillator 1313 covering the front and back of the detector respectively, and light sensors 1304. The panel scintillators 1303 and 1313 are thick enough in this embodiment to detect substantially all of the orthogonally incident particles. The extrusion dimension of the rod scintillators 1301 is the shortest dimension of the rod scintillators 1301 in the depicted embodiment. The rod scintillators 1301 are mainly sensitive to particles from the side, while the panel scintillators 1303 and 1313 are mainly sensitive to particles from the front or back. The contrasting sensitivity distributions of the rod scintillators 1301 and the panel scintillators 1303 and 1313 enable the polar angle to be determined by comparing detection rates in the rod scintillators 1301 with the panel scintillators 1303 or 1313. In this embodiment, the shield 1302 comprises a scintillator (shown in grid-hatch) configured to detect particles as well as blocking the particles. For gamma rays, the scintillating shield 1302 may be NaI(Tl) or a higher density scintillator such as LuAP. Light sensors 1304 can be connected to the rod scintillators 1301, the scintillating shield 1302, and to the first and second panel scintillators 1303 and 1313. The configuration enables simultaneous determination of the source location in all directions and, based on the gamma energies measured in the scintillating shield 1302, the isotopic content of the source.

Figure 14:
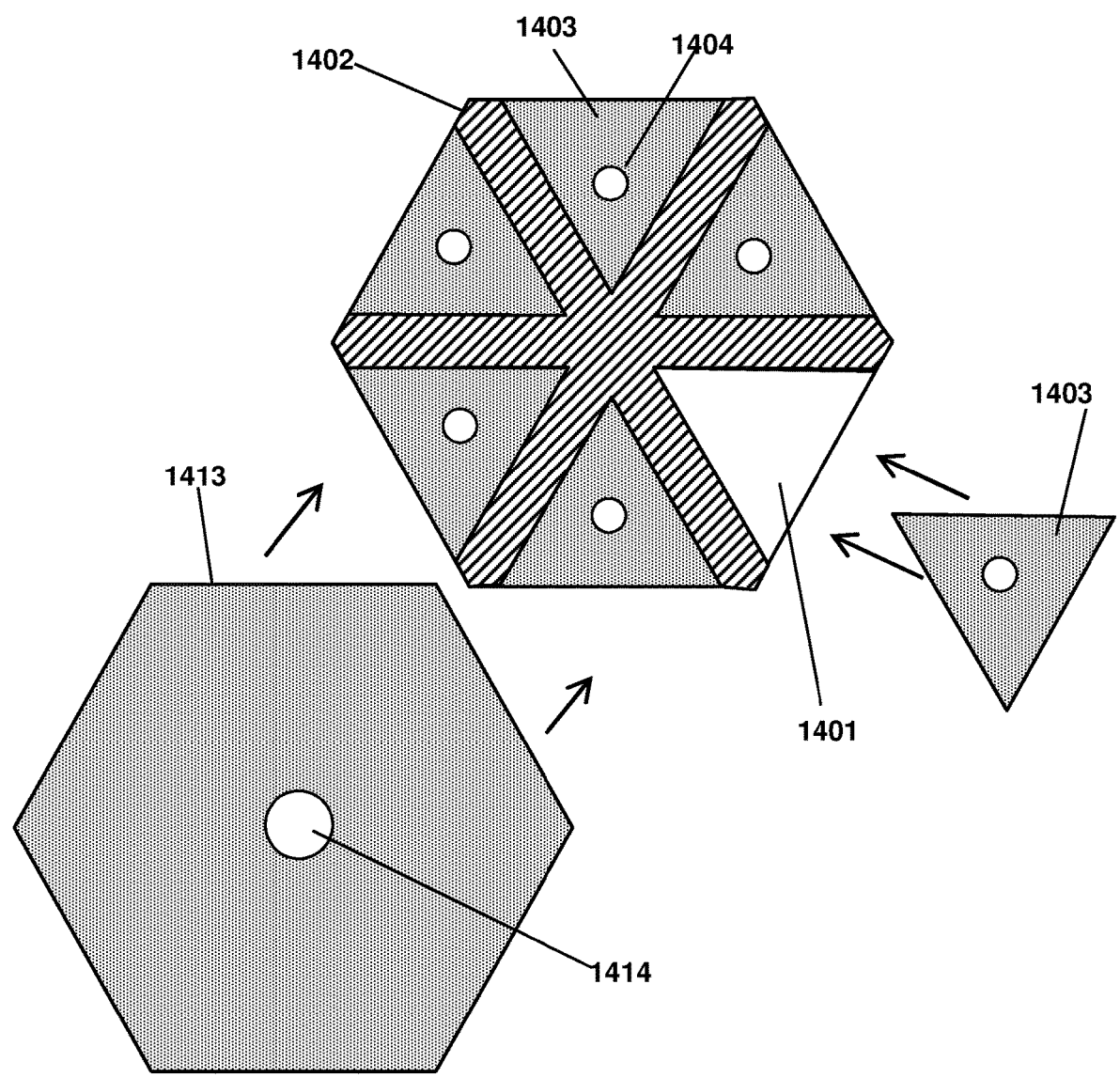
FIG. 14 is a cross-section sketch, partially exploded, of an exemplary directional detector with hexagonal symmetry and six rod scintillators.

FIG. 14 is a transverse cross-section view of a hexagonal embodiment of the detector with N=6. It can have six triangular rod scintillators 1401 (only one showing) with a star-shaped shield 1402 and separate panel scintillator portions 1403. A small photodiode light sensor 1404 may view each panel scintillator portion 1403. Other light sensors (not shown) may view the rod scintillators 1401 from the back. As an alternative, instead of the separate panel scintillators 1403, the detector can have a monolithic panel scintillator 1413 with a centrally placed light sensor 1414 that would block very little of the incident radiation due to its position over the central part of the shield 1402. The shield 1402 may comprise six shield plates abutted at the detector axis, or equivalently, three larger shield plates that span the width of the detector and intersect each other at the midline of each of the larger shield plates.

Figure 15:
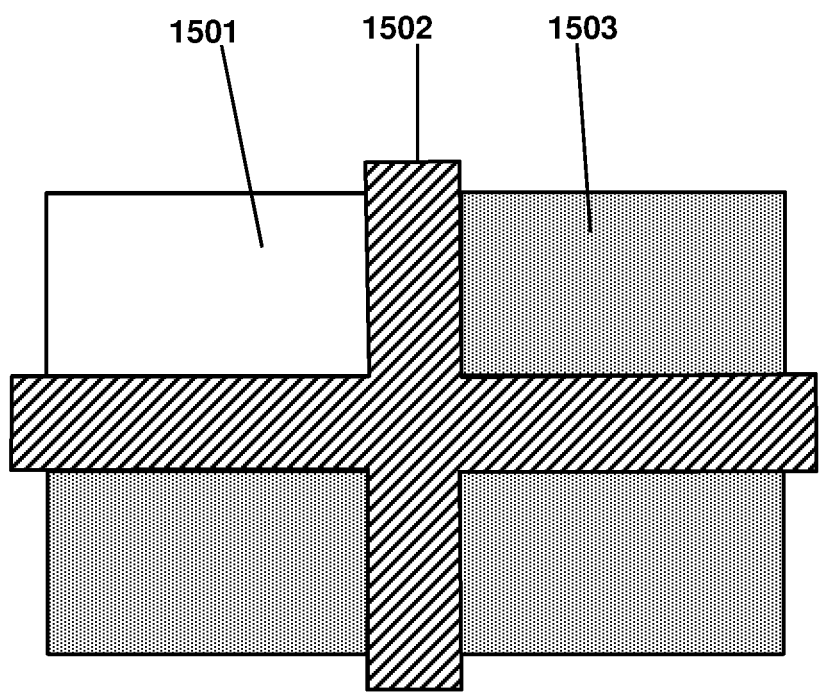
FIG. 15 is a cross-section sketch of an exemplary directional detector configured with rectangular rod scintillators to provide high angular resolution in one direction, and high detection efficiency in an orthogonal direction.
Figure 15:
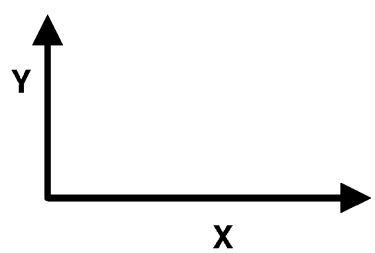

FIG. 15 is a transverse cross-section sketch of a detector with rectangular symmetry. Rectangular rod scintillators 1501 may be mounted in a rectangular shield 1502. Each rod scintillator 1501 (only one visible) may be adjacent to a separate rectangular panel scintillator 1503 (three shown). The rod scintillators 1501 may be longer in the X direction than the Y direction, and this shape can affect the angular resolution of the azimuthal and polar angle determinations. The angular resolution depends on the lateral dimensions of the rod scintillators 1501, such that a smaller rod scintillator dimension results in better angular resolution, all else being equal. The detection efficiency, on the other hand, is generally larger when the lateral dimensions are larger. Consequently, the configuration of FIG. 15 can have better angular resolution for measuring the vertical source angle than for measuring the horizontal angle, but higher detection efficiency for particles arriving from the top or bottom than from the sides. If the detector were rotated 90 degrees around a horizontal axis such as the detector axis (not shown), the detector can then obtain better resolution horizontally and better detection efficiency for particles arriving from the left and right sides.

Since the angular correlation function generally depends at least in part upon the shape of the rod scintillator 1501, it may be necessary to prepare two separate angular correlation functions for the configuration of FIG. 15, with one correlation function for determining the horizontal component of the polar angle, and a second function for the vertical component. The geometrical correction factor g, introduced in Eq. 2, would likely not be sufficient to account for the substantial differences in horizontal and vertical properties of the configuration shown; hence the need for two separate angular correlation function determinations. Or, in a worst-case situation, the angular correlation function could vary so much with the azimuthal angle, that a large number of correlation functions would be needed. In that case, the angular correlation may be rendered as a matrix of values which can then be interpolated in both azimuthal and polar angles to evaluate each particular source location. Alternatively, a global functional form may be developed that takes as input the azimuthal angle calculated earlier, plus the panel scintillator rates and some function of the rod scintillator rates or differentials, and then produces as output the best-fit polar angle determination. Such a function may be implemented as a computer program that automatically exploits the various two-fold symmetries of the design and interpolates values when a functional fit cannot be derived.

Figure 16:
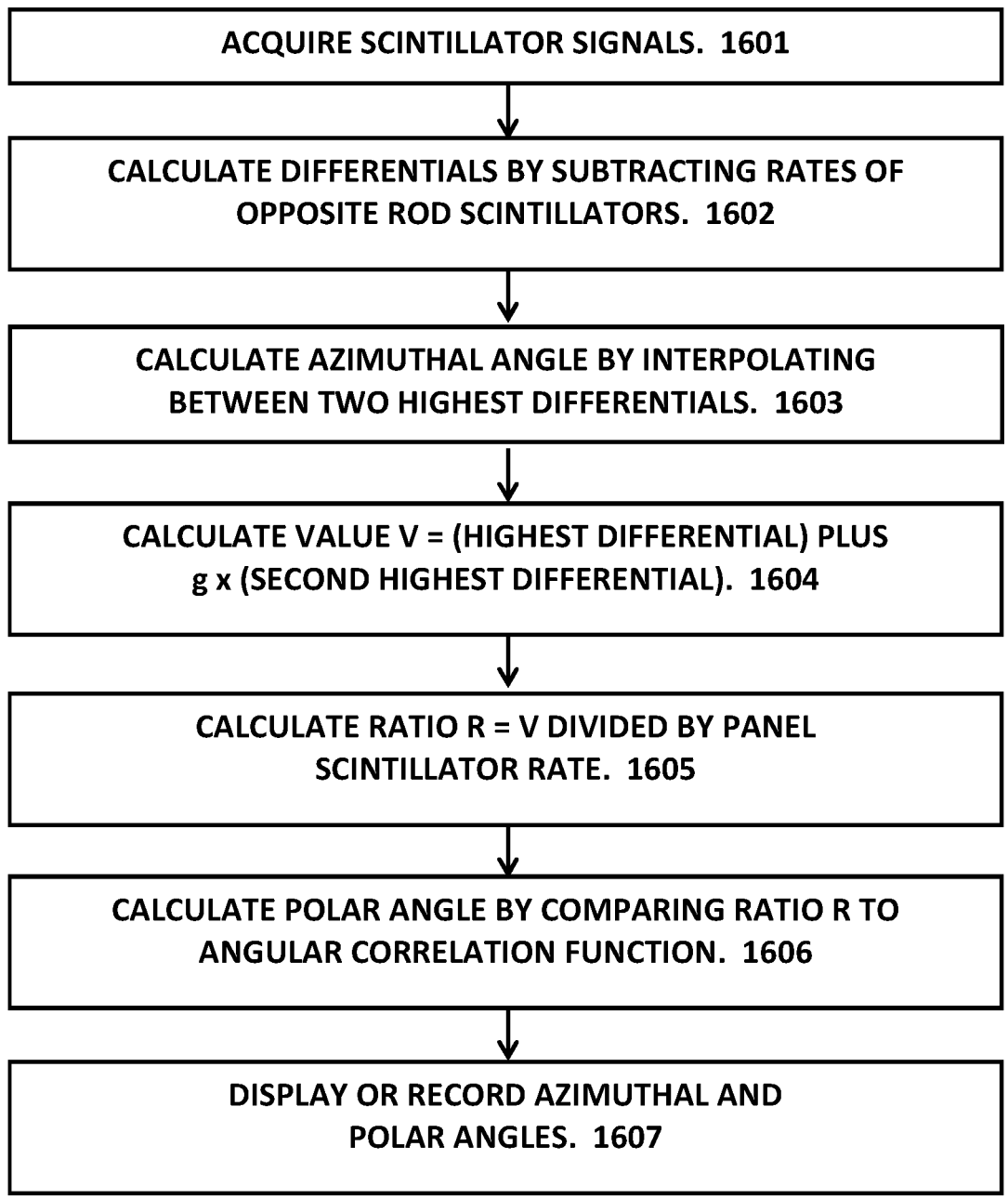
FIG. 16 is a flowchart showing steps of an exemplary method for calculating the polar and azimuthal angles from the scintillator data without rotations.

FIG. 16 is a flowchart showing steps of a method for calculating the azimuthal and polar angles from the scintillator data. This method assumes a symmetrical configuration such as that of FIG. 2, but other configurations may be used according to various embodiments. First, at 1601, scintillator signals can be acquired at a particular orientation of the detector, including rod scintillator and panel scintillator detection data. After accumulating detection data for a predetermined integration time, or at any time, analysis proceeds by calculating 1602 a differential for each rod scintillator, equal to the difference in detection rate of each rod scintillator minus the detection rate of the diametrically opposite rod scintillator. If N is odd, then each rod scintillator can have two nearly-opposing rod scintillators, and the differential is equal to each rod scintillator detection rate minus the average of the two nearly-opposing rod scintillators. Then the azimuthal angle can be calculated 1603 by interpolating between the two rod scintillators with the highest differentials. The azimuthal angle of the source may thus be a weighted average of the position angles of the rod scintillators according to their associated differentials. If there are more than two positive differentials (such as for N=6 which has three positive differentials), then all of the positive differentials may be included proportionally in the azimuthal angle determination. As a further alternative, instead of interpolating between differentials, the azimuthal angle may be calculated directly from the rod scintillator rates, for example, by fitting them to a source location model or other formula that relates the source angle to the rod scintillator rates. The source model can predict the scintillator detection rates as a function of the azimuthal angle of the source. As an option for obtaining the angular results rapidly, the source model may be used to calculate various values of the azimuthal angle versus detection ratios in advance and store them in computer-readable non-transient media. Then when the actual detection data is acquired, the previously-calculated values can be used directly or interpolated for best resolution, thereby determining the azimuthal angle.

The polar angle may then be determined 1604 by calculating a rod scintillator value V, which in this embodiment is equal to the highest differential plus a geometrical factor g times the second-highest differential. Typically, the geometrical factor g is about 0.11, but artisans can adjust g according to their specific designs, using a simulation program or with a test source. For example, g may be adjusted so that the ratio R is the same for a source azimuthal angle of zero degrees and 45 degrees.

A ratio R may then be calculated 1605 by dividing V by the panel scintillator counting rate. The inverse ratio, 1/R, could be used instead of R, but the inverse can become mathematically problematic when the detector axis is brought into near-alignment with the source, because then the rod scintillators have nearly zero differential which makes 1/R become infinite. Likewise, if the panel scintillator shows zero counts when the integration time expires, then additional data should be taken before the polar angle can be calculated. Insufficient data after a particular integration time may be an indication that the source is weak or far away, or that there is no source at all.

Then, at 1606, the polar angle may be determined by comparing the ratio R to the predetermined angular correlation function, which can indicate the polar angle directly. If the detector is symmetrical around the detector axis, and the geometrical factor has been applied as specified above, then a single angular correlation function is applicable for all azimuthal angles. Then 1607 the final polar and azimuthal angles can be recorded, displayed, transmitted to another system, or otherwise reported as needed for each application.

Figure 17:
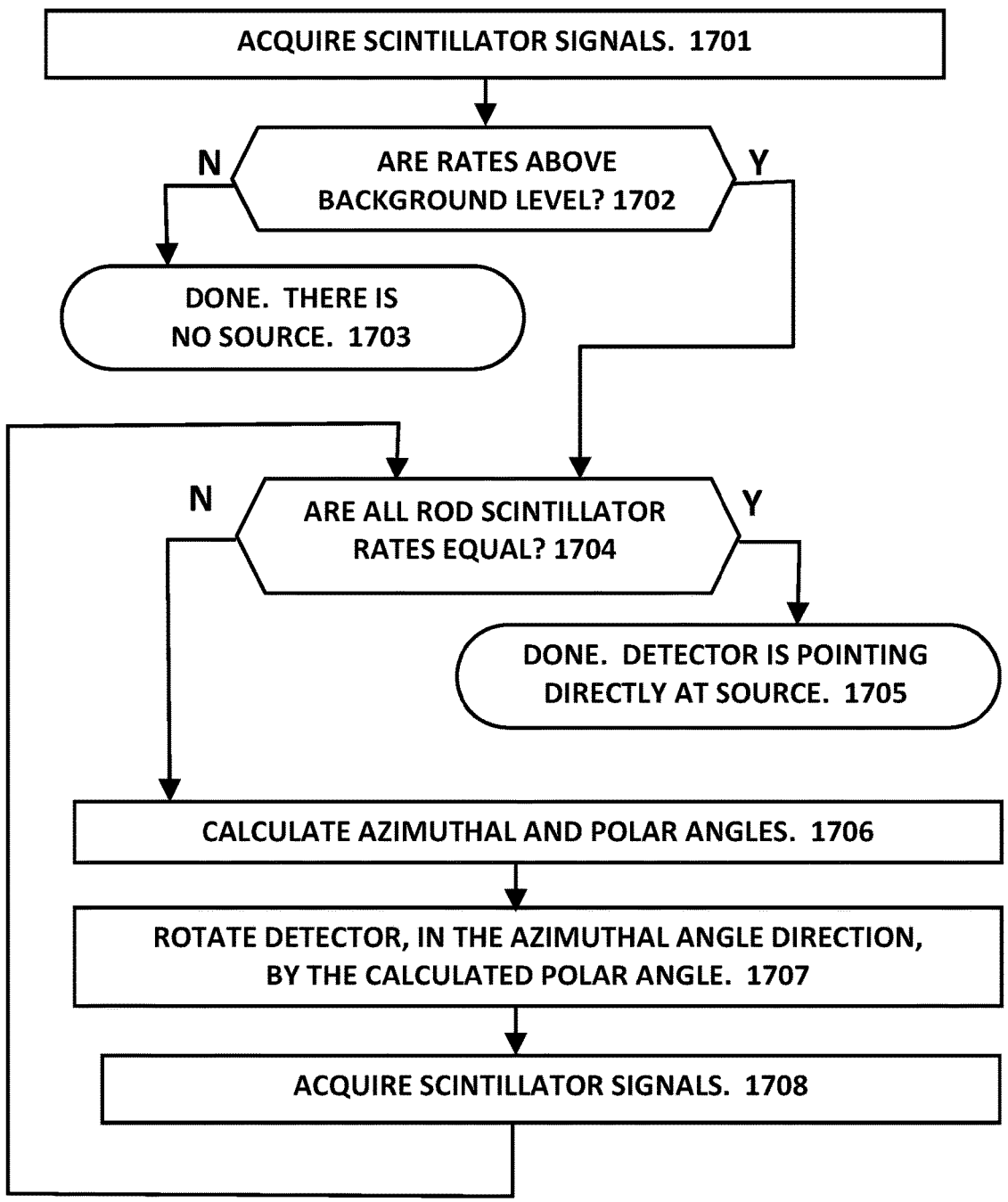
FIG. 17 is a flowchart showing steps of an exemplary method for rotating the detector into alignment with the source.

FIG. 17 is a flowchart showing steps of a method for rotating the detector until the detector axis is aligned with the source. First, detection data can be acquired 1701 from the panel and rod scintillators for a predetermined integration time, or for an adaptive interval, or some other time interval. The rod scintillator rates may then be compared 1702 to normal background rates to determine if a source is present. Preferably, the scintillator detection rates may first be corrected for normal backgrounds and for the pre-calibrated detection efficiency of each scintillator. A source is then likely present if either: (1) any of the scintillators exhibits a positive residual counting rate significantly above the expected background rate, or (2) the sum of all the scintillators exhibits a statistically significant detection excess. If the rates are not above backgrounds, the detector then can indicate 1703 that no source is detected. But if the rates are above background, then the rod scintillators can be compared 1704 with each other to determine if they are all substantially equal. Such equality need not be exact; preferably the detector checks whether the rod scintillator rates are equal to within the statistical uncertainty of each rod scintillator data. Alternatively, the degree of alignment with the source may be evaluated by comparing the observed inequalities among the various rod scintillators with a predetermined function that corresponds to a small polar angle, such as 1 degree. In either case, if the rod scintillator rates are equal according to the selected criterion, then the task is done 1705 and the detector axis is aligned with the source.

If, however, the rod scintillator rates are above background and are not all equal, then the detector can calculate 1706 the azimuthal and polar angles of the source, using for example the method of FIG. 16. The detector may then be rotated 1707 according to the calculated azimuthal and polar angles, thereby bringing the detector axis into alignment with the calculated source location. Additional scintillator data are then acquired 1708 at the new orientation, and after the integration time or after some amount of data is accumulated, the method can then loop back to step 1704, determining if all the rod scintillators have substantially equal rates. The iteration proceeds until the rod scintillators rates are all equal according to the selected criterion. Usually one rotation, or at most two rotations, is sufficient to align the detector axis with the source in two dimensions. In contrast, prior-art detectors require extensive iterative searching and multiple rotations to locate the source in one dimension. The method exploits the additional information of the polar angle and thereby rapidly closes upon the source direction.

Figure 18:
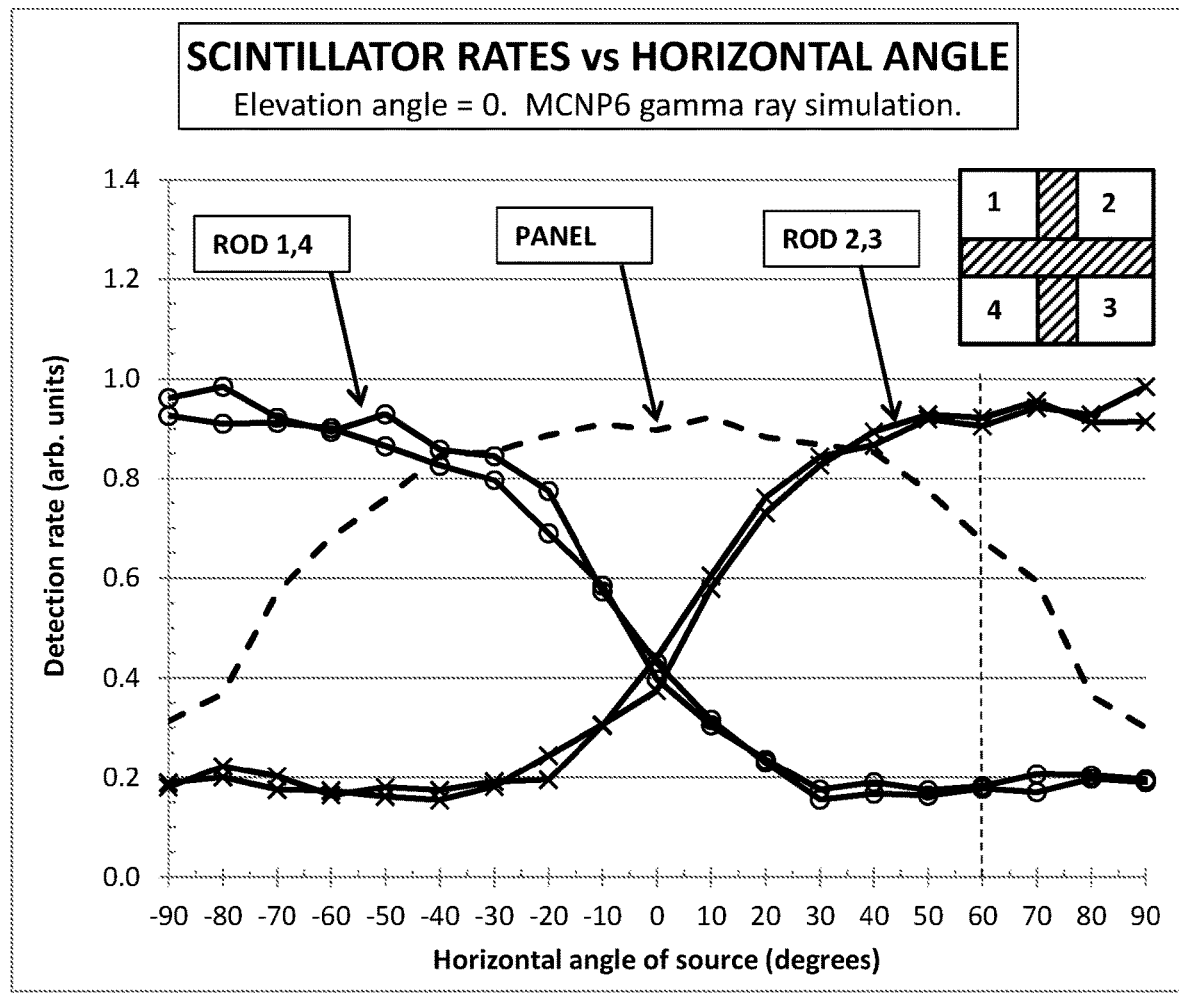
FIG. 18 is a graph showing the scintillator counting rates for an MCNP6 simulation of a gamma ray detector.

FIG. 18 is a graph showing the results of an MCNP6 simulation of a directional detector configured in this case to detect gamma rays. In the simulation, the source was moved in the horizontal plane around the simulated detector, with horizontal angles ranging from −90 degrees to +90 degrees relative to the detector axis, and with an elevation angle of zero. In spherical coordinates, this corresponds to a polar angle ranging from zero to 90 degrees, and the azimuthal angle being either zero or 180 degrees depending on which side of the detector the source is on. The graph shows the counting rates, in arbitrary units, of the four rod scintillators according to the numbering shown in the inset drawing. The counting rates in rod scintillators 1 and 4 are shown as the lines with "o" markings, having high counting rates when the source is on the left side (as expected). Rod scintillators 2 and 3, shown as the lines with "x" markings, have high rates when the source is on the right. The dashed curve shows the panel scintillator counting rate, which is maximum when the source is in front of the detector.

The two rod scintillators numbered 2 and 3 have nearly the same counting rate since they are equally exposed to the source when the azimuthal angle is zero or 180 degrees. Likewise, the two rod scintillators 1 and 4 show statistically the same response for the same reason. It is apparent from the graph that the rod scintillators exhibit an antisymmetric angular sensitivity relative to the detector axis, while the panel scintillator has a symmetric angular sensitivity. The difference in rates among the rod scintillators indicates that the azimuthal angle can be found from the rod scintillator data. In addition, the difference in symmetry between the panel and rod scintillators implies that a correlation function can be found that relates the polar angle to the panel scintillator rates. Both the azimuthal and polar angular results draw on the same set of detection data, obtained at a single detector orientation. Rotations and iteration are not necessary unless the application calls for the detector to be finally rotated into the source direction, in which case a single rotation is usually sufficient.

Figure 19:
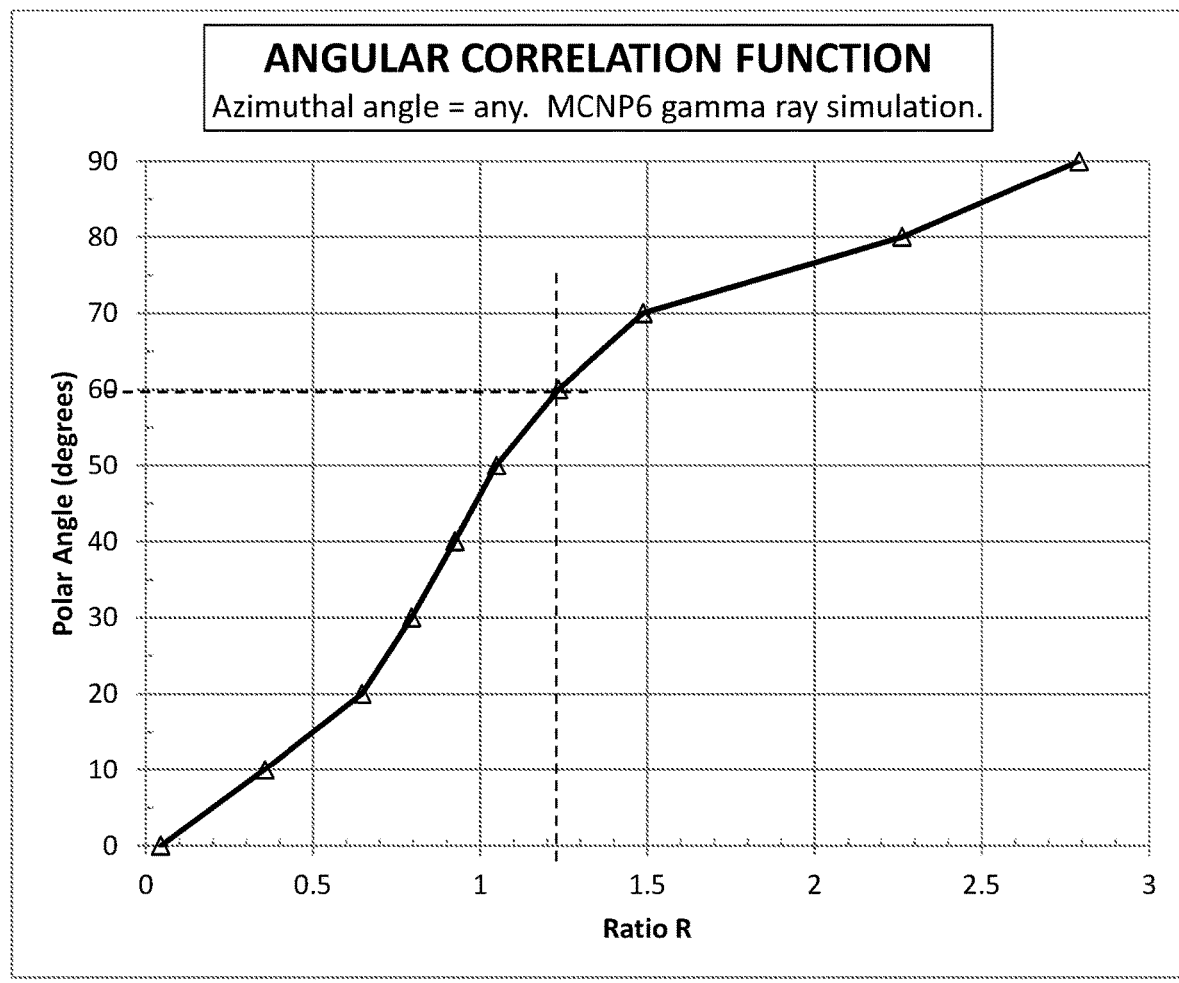
FIG. 19 is a graph showing the angular correlation function that relates the polar angle to the scintillator counting rates for the simulation of FIG. 18.

FIG. 19 is a graph showing the angular correlation function derived from the data of FIG. 18. The graph shows how the polar angle is related to the ratio R, which equals the highest rod scintillator differential plus g times the second-highest differential, all divided by the panel scintillator detection rate. The correlation is smooth, monotonic, and approximately linear, with small non-linearities due to the edges of the rod scintillators and to shadowing by the panel scintillator. The correlation function can be modified by adjusting the size and thickness of the panel scintillator, the length of the rod scintillators, and the shield properties such as truncation and protrusion. For example, extending the panel scintillator laterally beyond the rod scintillators can increase the panel scintillator counting rate while slightly reducing the rod scintillator counting rates over a range of angles, which would tend to raise the correlation function value over that range, which could partially cancel the nonlinearities. However, such fine-tuning is usually unnecessary since the correlation yields a unique polar angle for each value of R, and since the method provides a high-resolution determination of the polar angle throughout the front half-space, from zero to 90 degrees polar angles, which particularly covers the midplane region that is problematic for prior-art directional detectors that lack a panel scintillator. And, with the addition of a second panel scintillator as discussed with FIG. 11, the polar angle determination can be extended to a full 180 degrees, thereby covering all directions of space (an entire $4\pi$ solid angle), and thereby enabling precise determination of the source location everywhere around the detector using a single set of scintillator data.

A second simulation was performed to test whether the correlation of FIG. 19 is indeed applicable for all azimuthal angles as required. To do so, the simulation of FIG. 18 was repeated but with a source azimuthal angle of 45 degrees rather than zero degrees, so that the source location scanned from the upper right quadrant to the lower left quadrant of the inset in FIG. 18. The results of the second run, tilted at 45 degrees, were statistically identical to the first run, at zero degrees, when analyzed as specified above. This agreement demonstrates that a single universal angular correlation function can be used to find the polar angle, regardless of the azimuthal angle of the source, from the axis to the midplane.

The correlation function depends on the size and shape and composition of the rod scintillators, the panel scintillator thickness, and other geometrical features of the detector. Therefore, it is recommended that artisans recalibrate the angular correlation function for their particular detector parameters using a simulation program or by a determination of R versus polar angle, methods of which are well known in the art.

To demonstrate how the detector can find the azimuthal and polar angles of the source with a single set of detector data, a worked example is now provided. First the analysis will be performed graphically for visualization, and then repeated numerically for optimal precision. In the simulation of FIG. 18, a gamma ray source was positioned at 60.0 degrees horizontal angle and zero degrees vertical angle (corresponding to azimuthal=0, polar=60). Based on the detection data, the ratio R was calculated according to Equations 2 and 3. As shown by a vertical dashed line at about R=1.22 on the chart, the correlation implies that the polar angle is given by the horizontal dashed line which corresponds to about 59 degrees, which is only 1 degree from the correct value.

An improved way of calculating the angles is by interpolation. Table 1 shows how the source location can be derived from the data directly. The positional angles of the rod scintillators are listed, along with the simulated detection rates of the scintillators:

TABLE 1

| (Source at azimuthal = 0, polar = 60 degrees) | | |
|---|---|---|
| Scintillator | detection rate (arb. units) | position angle |
| Rod scintillator 1: | 0.182 | +135 degrees |
| Rod scintillator 2: | 0.922 | +45 degrees |
| Rod scintillator 3: | 0.905 | −45 degrees |
| Rod scintillator 4: | 0.177 | −135 degrees |
| Panel scintillator: | 0.674 | — |

First the azimuthal angle may be calculated from the rod scintillator positive differentials and the positional angles of the rod scintillators, as shown in Table 2:

TABLE 2

| (positive differentials only) | | |
|---|---|---|
| Rod scintillators | positional angle | differential |
| side 2 minus side 4 | +45 degrees | 0.745 |
| side 3 minus side 1 | −45 degrees | 0.723 |

The other differentials are negative and are ignored. The azimuthal angle can then be calculated by linear interpolation between the positional angles using the differentials, this time using the formula of Equation 4:

$$\varphi(source)=(\varphi(2)*D2+\varphi(3)*D3)/(D2+D3) \quad (4)$$

Here $\varphi(2)$ is the positional angle of rod scintillator number 2 (top-right scintillator) and D2 is its differential, equal to the detection rate of rod scintillator 2 minus that of rod scintillator 4. Similarly $\varphi(3)$ and D3 represent the corresponding values for rod scintillator 3 (bottom-right). Applying the numbers of Table 2 to Equation 4, the resulting calculated azimuthal angle is $\varphi(calc)=0.7$ degrees, which is close to the actual azimuthal angle of $\varphi(source)=0.0$ degrees.

The polar angle can then be found by calculating the ratio R according to Equation 2. The value V equals the largest differential, plus 0.11 times the second-largest differential, which for this case is V=0.825. The ratio R is then found, from Table 1, as R=V/F=1.223. The polar angle may then be determined by interpolating between the two values of the correlation of FIG. 19 that span the value of R(θ). From the MCNP6 simulation, those values are: R(50)=1.048 at 50 degrees polar angle, and R(60)=1.234 at 60 degrees polar angle. Using these values for a linear interpolation on the observed ratio of R=1.223, the calculated polar angle for the panel scintillator data is calculated to be θ(calc)=59.4 degrees, which is again close to the actual polar angle of θ(source)=60.0 degrees.

This example shows that the system as disclosed and the corresponding method can determine the azimuthal and polar angles from scintillator counting rates with sub-one-degree resolution, using just a single acquisition and with no rotations or iteration.

Figure 20:
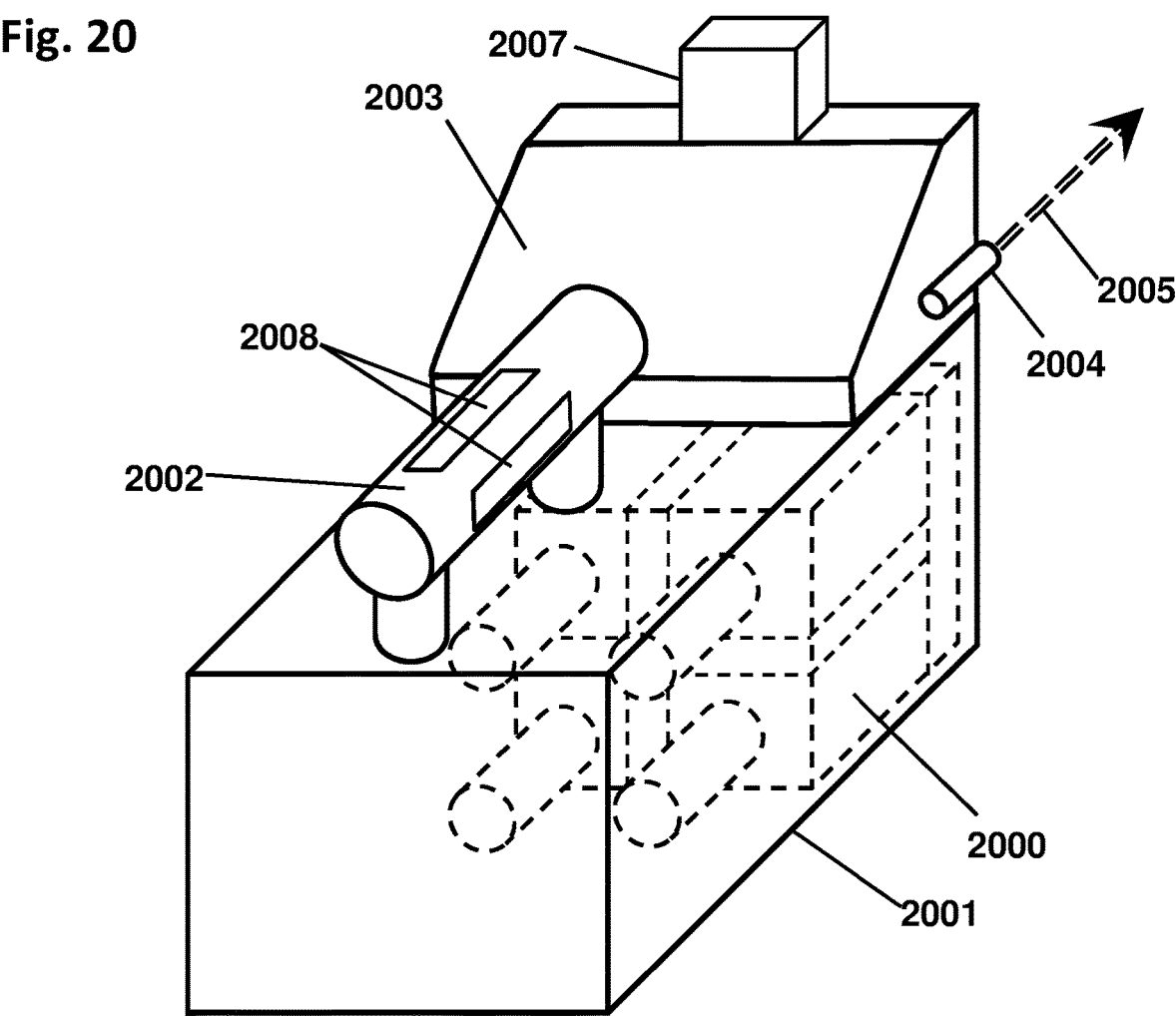
FIG. 20 is a perspective sketch of an exemplary hand-held survey meter incorporating a directional detector.

Various embodiments of the directional detector disclosed herein enable advanced radiation-detection applications, some of which are now described. FIG. 20 is a perspective sketch, partly hidden, of a hand-held survey meter that can determine the direction of the source in two dimensions, and then display the azimuthal and polar angles of the source in near real-time. In some embodiments, an operator can move the meter at will, while watching the source direction indicator, and thereby locate the source. The system can continuously recalculate the azimuthal and polar angles of the source and continuously update the directional information. In some embodiments, the meter shows the lateral direction toward the source (azimuthal angle), and how far the source is laterally from the current orientation (polar angle). The meter can also indicate when the detector axis is aligned with the source, as determined by the rod scintillator rates being equal. Thus, the azimuthal indicator can tell the operator what direction to rotate the detector, the polar indicator can tell the operator how far to rotate it, and the alignment indicator can tell the operator when to stop.

The system of FIG. 20 may include a directional particle detector 2000 (hidden lines in dash), which is contained in a case 2001 with a handle 2002 and a display 2003. Typically, the operator holds the meter at some orientation, waits for a brief integration time, and then reads the display 2003 which shows the calculated azimuthal and polar angles of the source. The operator can then rotate the meter in the azimuthal direction as indicated in the display 2003, rotating more quickly if the polar angle is large and more slowly if the polar angle is small, and stopping when the display indicates that the system is aimed directly at the source. Thus the meter enables rapid convergence to a source location by determining both the azimuthal and polar angles of the source in real time, and displaying those results visually.

The meter may also have a light emitter 2004 that can emit a light beam 2005 configured to indicate the azimuthal and polar angles visually as well. In a first version, the light beam 2005 is aligned with the detector axis, and the beam spot (that is, the light beam intensity distribution) is shaped to indicate both the azimuthal and polar angles of the source. For example, the beam spot can appear as an arrow or wedge shape, configured to point in the azimuthal direction, and may have a length proportional to the polar angle. Such a visual indicator of the source direction can greatly assist the operator in locating the source quickly.

In a second version of the system of FIG. 20, the light beam 2005 can be redirected toward the calculated source position. For example, a rotatable mirror (not shown) may reflect the light beam 2005 to point directly at the source based on the azimuthal and polar angles as calculated. Alternatively, the beam emitter 2004 itself can be rotatable and aimed according to the calculated azimuthal and polar source angles. The beam spot can be shined right on the source location. The light beam 2005 may also be flickered or otherwise modulated to further enhance visibility. The beam spot location can be updated continuously as the meter is moved around so that the beam spot appears to be "locked on" to the source location as long as the operator does not move the meter too fast. And if the operator does rotate the meter too fast for the system to follow, the directional detector 2000 can soon recalculate the correct angles based on further scintillator data and then redirect the beam 2005 back to the source, further assisting the operator in locating the source. Also, the beam 2005 may be configured to indicate the uncertainties in the angular determination. For example, the shape of the beam spot may be configured as an ellipse with axes sized according to the uncertainties in the polar and azimuthal angle determinations. Then as additional data is acquired, and the angular uncertainties are reduced, the beam 2005 shape accordingly shrinks to a focused spot.

As a further option, the system of FIG. 20 may include a camera 2007 which again has at least two versions. In a first camera version, the camera 2007 can be aimed frontward in alignment with the detector axis, thereby recording the inspection scene frontward of the detector. In a second version, the camera 2007 can be redirected (using a movable mirror, for example) so as to record a scene with the source centered in the image. An advantage of the latter version, with the image centered on the source location, is that the camera 2007 can then easily magnify or "zoom in" to the source location, without having to adjust the aim point as the magnification changes. For example, the camera 2007 can be activated or triggered as soon as the azimuthal and polar angles are initially determined, and the camera 2007 or its viewpoint can be redirected so as to view the calculated source location centrally in the image. The camera 2007 can then acquire a wide-angle image, a narrow-angle image, and a telescopic magnification image centered on the source location, all in rapid succession. The sequence of images at different magnifications can thereby fully record the source location despite clutter and shielding. In addition, a rectangle or ellipse or other icon can be superposed on the image indicating the calculated source location. The icon dimensions may be configured to correspond to the horizontal and vertical angle uncertainties in the source location as calculated at the time the image was acquired. Then, as the source location determination is improved with further data, the size of the indicator icon is correspondingly reduced in subsequent images.

As a further option, the meter of FIG. 20 may have four haptic indicators 2008 (two showing) mounted on the handle 2002. The haptic indicators 2008 may be activated according to the calculated azimuthal angle, thereby indicating to the operator in what direction the source is located (for example, the right-side haptic indicator 2008 may be activated if the source is to the right). The haptic indicators 2008 may also be modulated so as to indicate the magnitude of the polar angle (for example, being modulated faster if the polar angle is large, and more slowly if the polar angle is small, or vice-versa). Also, when the detector axis is brought into alignment with the source, the haptic indicators 2008 may be activated in a characteristic way, such as all four haptic indicators 2008 being pulsed at once, or in a circular sequence, or otherwise indicate that the detector axis is aligned with the source. This would inform the operator of the source direction and the source alignment without the operator having to look away from the scene, or in limited light, or in other inspection situations where tactile feedback is needed.

Figure 21:
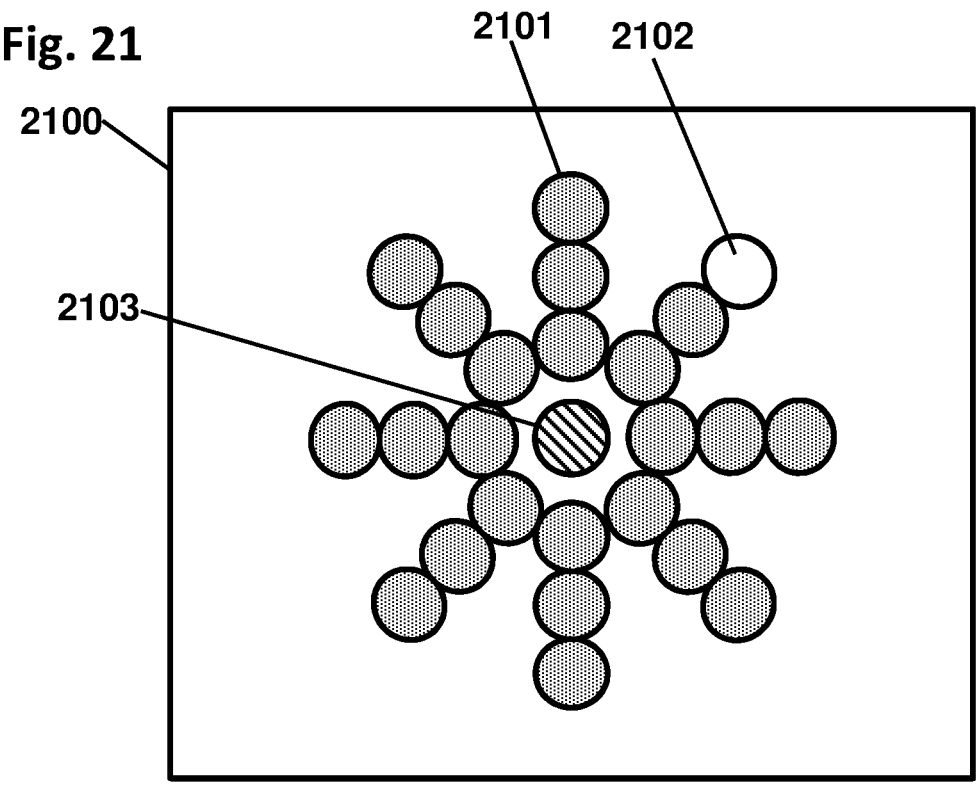
FIG. 21 shows an exemplary display using LEDs to indicate the azimuthal and polar angles to the source.

FIG. 21 shows notionally a low-cost display 2100 using LEDs (light-emitting diodes) or other luminous components 2101 arranged to indicate both the azimuthal and polar angles of the source. The display 2100 comprises multiple LEDs 2101 in circular arrays with the non-illuminated LEDs 2101 shown in stipple, and a single illuminated LED 2102 is shown clear. The display thereby indicates the azimuthal angle according to the angular position of the illuminated LED 2102, and also indicates the magnitude of the polar angle according to which circle the illuminated LED 2102 is in. For example, the successive circles of LEDs may correspond to a polar angle being small (such as 3 to 20 degrees in some embodiments), medium (21 to 50 degrees in some embodiments), or large (51 to 90 degrees in some embodiments). Also, a central LED 2103, shown in diagonal hatch, can be illuminated when the detector axis is aligned to the source within a predetermined limit (for example, 2 degrees or less according to some embodiments).

In order to provide a more precise indication of the angles, multiple LEDs 2101 may be illuminated at once. For example, if the azimuthal angle is 22.5 degrees, two LEDs 2101 corresponding to azimuthal angles of zero and 45 degrees may be illuminated at the same time, and the operator would understand that this indicates 22.5 degrees. Likewise two of the LEDs 2101 in different circles may be illuminated in a radial fashion to further refine the polar angle indication. Also, when the detector axis is aligned with the source location, all of the LEDs 2101 may be flashed together to further indicate the alignment.

Figure 22:
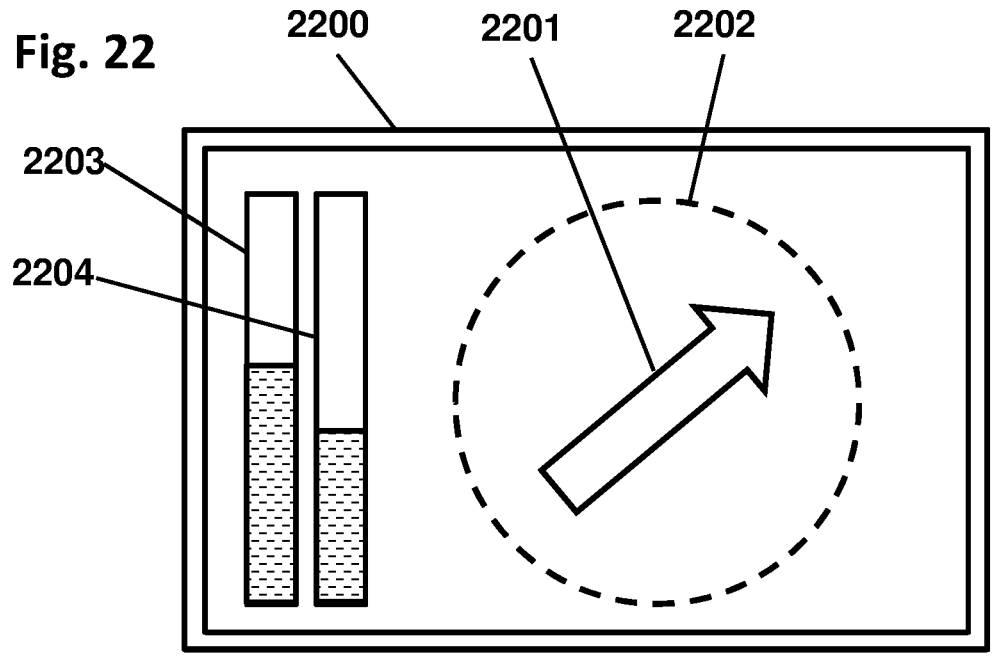
FIG. 22 depicts an exemplary flat-screen display showing the direction of the source and the magnitude of the polar angle.

FIG. 22 schematically shows a flat-screen display 2200 that indicates both the azimuthal and polar angles of the source. The display 2200 can include a rotatable asymmetric icon 2201 (such as an arrow or wedge icon) which points in the azimuthal direction of the source relative to the detector axis, and may also have a length or other feature that indicates the size of the polar angle. The operator can then see from the shape and orientation of the icon 2201 how to move the detector to locate the source. In addition, when the detector axis is aligned with the source, a non-directional icon 2202 (such as a circle) can be displayed or prominently modulated instead of the directional icon 2201. Two other widgets 2203 and 2204, such as bar displays, can indicate other information such as the current radiation level or the integrated dose received or the presence of neutrons in the detected radiation.

Figure 23:
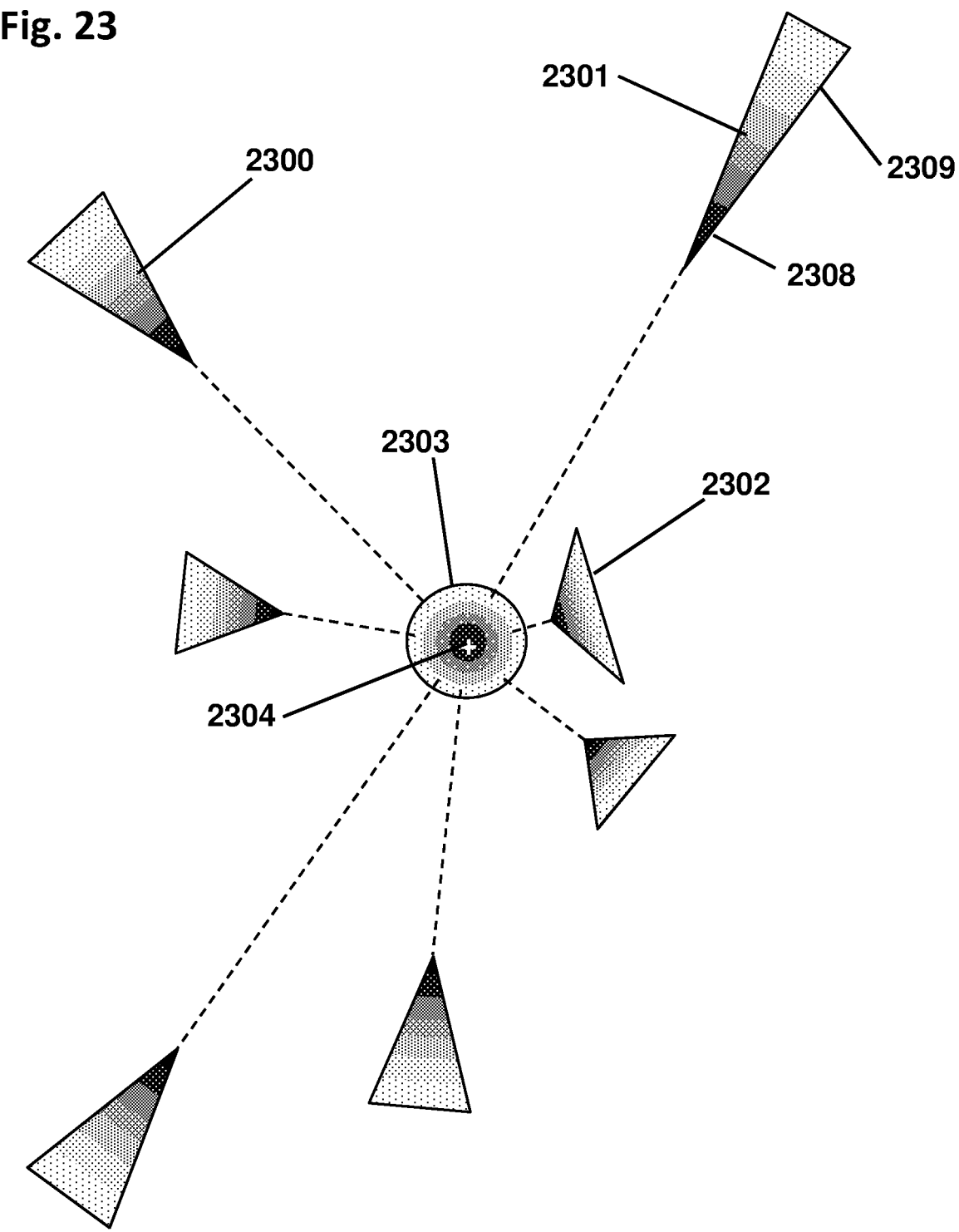
FIG. 23 shows multiple renditions of a light beam spot configured to point toward the source and also to indicate the polar angle of the source.

FIG. 23 schematically shows the appearance of the light beam 2005 of FIG. 20, for a version in which the light beam 2005 can be aligned with the detector axis and point toward the source. The light beam 2005 can be shaped as a wedge and oriented to indicate the azimuthal angle of the source relative to the detector axis. The wedge shape may also be varied in length to indicate the size of the polar angle of the source. Several beam-spot FIGS. 2300-2303 are shown as they would appear at various locations around a source. The source location is shown as a plus-sign 2304. Optionally, each beam spot 2300-2303 can have a graded intensity to more clearly indicate the direction. In the sketch, the different beam intensities are indicated by different stipple densities, with heavy stipple indicating the brightest beam. Thus the bright point 2308 contrasts with the lower light intensity at the wide end 2309 of the beam spot 2301. Alternatively, the gradation can comprise a color variation, with for example, blue at the tip 2308 and fading to red at the wide end 2309. The operator can easily perceive a direction indicated by each beam spot 2300-2303 from the width and orientation of the beam spot 2300-2303 as well as the bright-to-dim intensity variation (or color variation) 2308-2309.

As the detector is moved around and the source angles are recalculated, the beam spot 2300 can be responsively adjusted to indicate the current azimuthal angle of the source (according to the direction of the wedge) and the polar angle of the source (according to the width of the beam spot). For example, a shorter beam spot shape such as 2302 can indicate that the polar angle is small, while a longer shape such as 2301 can indicate that the detector axis is still far from the source. When the detector axis is brought into alignment with the source 2304, the beam can become a circular spot 2303, thereby clearly showing the operator where the source is located. Using the modulated beam spot 2300, the operator can quickly scan for a radioactive source without looking away from the scene. The modulated beam spot 2300 may be most easily visible indoors, or inside a truck or shipping container, or under an awning, or elsewhere away from direct sunshine; however, by increasing the intensity of the beam spot 2000, and optionally flickering or otherwise modulating it, the beam spot 2000 can be made quite visible even in direct sunshine.

Figure 24:
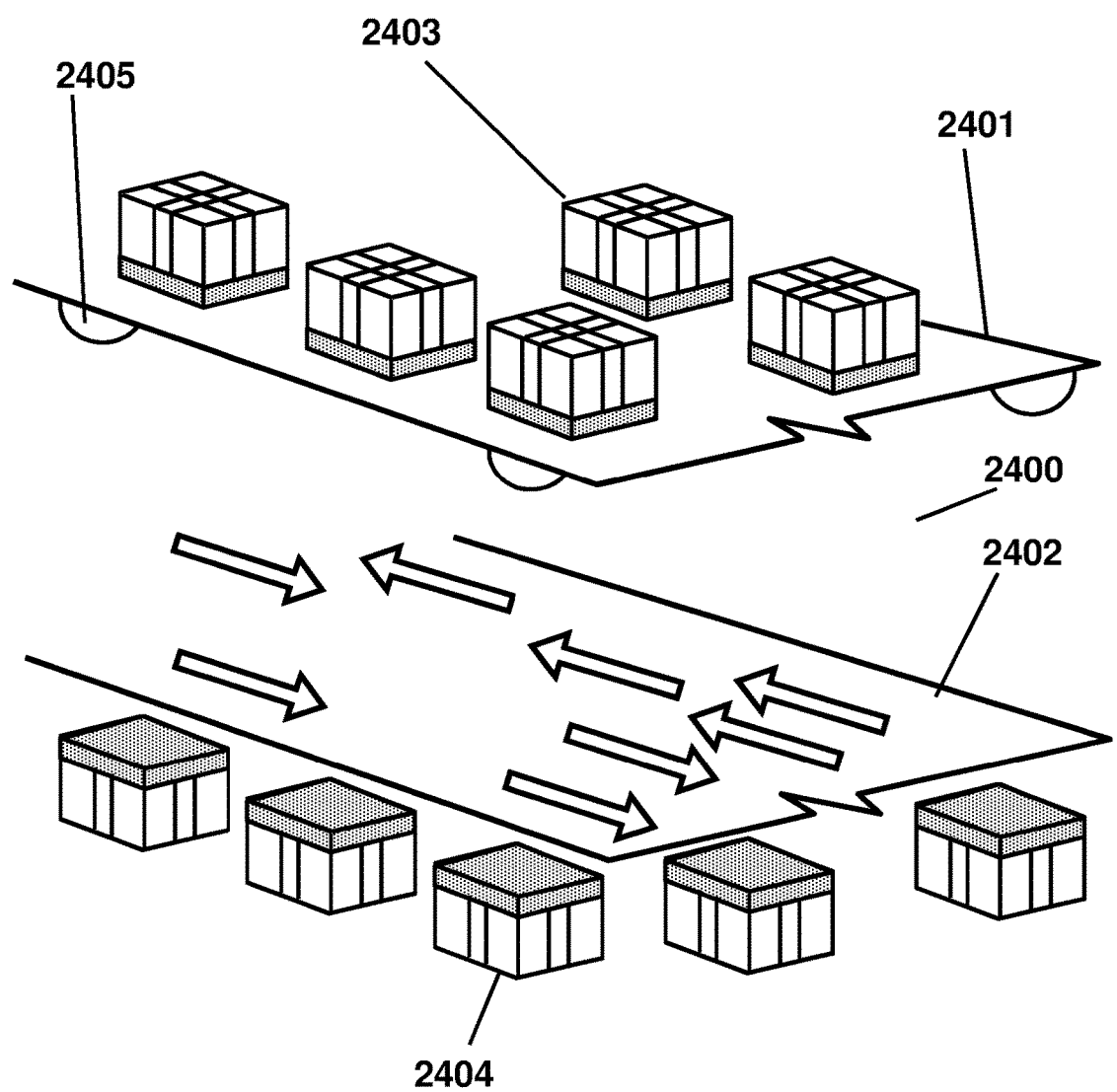
FIG. 24 is a notional perspective sketch of an exemplary array of directional detectors arranged to scan passing pedestrians for radioactive material.

FIG. 24 is a notional sketch in perspective and partially cut-away, of a system to continuously scan pedestrians passing through a walkway or hallway according to some embodiments. The system is useful at an airport or border crossing or other passageway where large numbers of people are to be scanned continuously for radiation sources. The walkway 2400 is demarked by a floor 2402 and a ceiling 2401. People passing in both directions are indicated by arrows. Above the ceiling 2401, numerous copies of the directional detector 2403 may point downward, while another set of directional detectors 2404 can be arrayed below the floor 2402 and pointing upward. Together, the directional detectors 2403 and 2404 can detect and localize a source on a particular pedestrian. Preferably, the arrays of detectors 2403 and 2404 continuously feed data to a facility computer (not shown) that analyzes the data against a moving-source model. While each detector 2403 or 2404 may detect just one or two extra gamma rays, the combined data from all the detectors 2403 and 2404 clearly shows a source location as well as the direction of travel. Security cameras 2405 can continuously record the scene so that the person carrying radioactive material can be uniquely identified by correlating the images with the directional data from the detectors 2403 and 2404.

Figure 25:
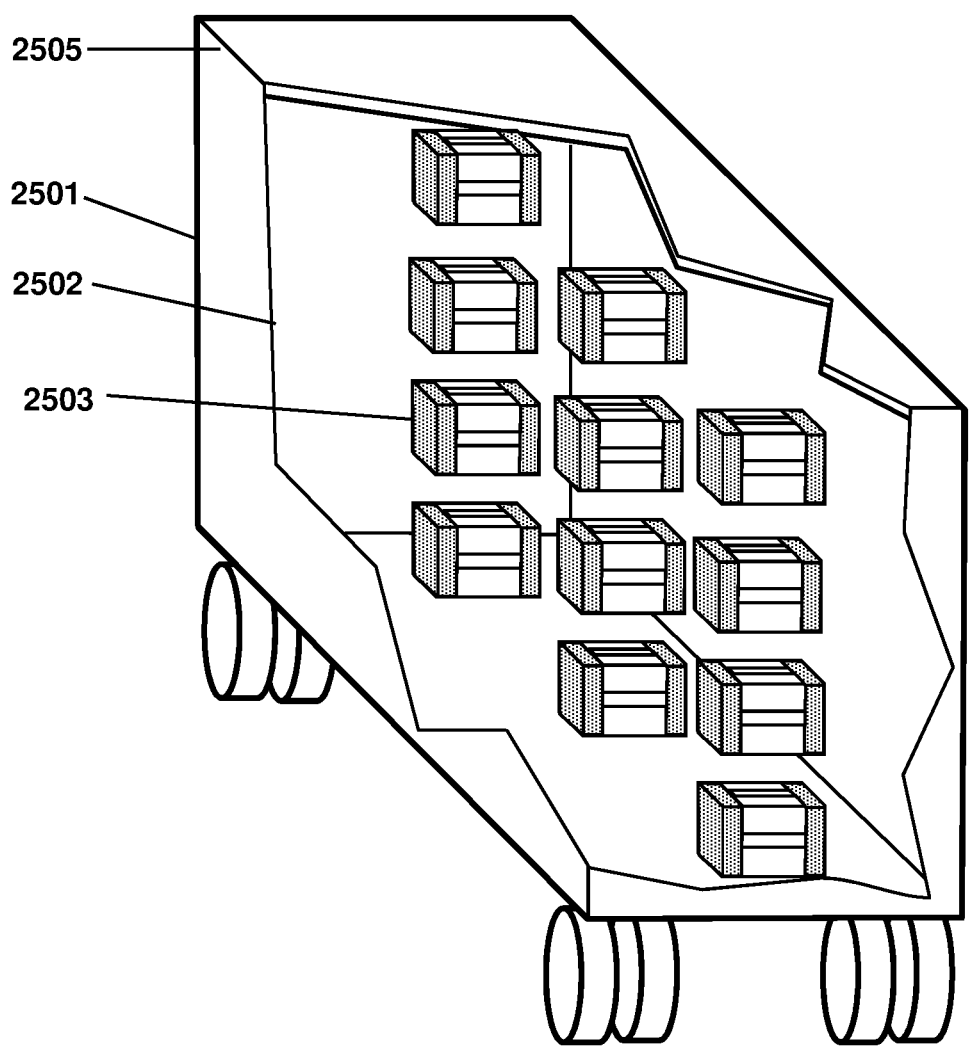
FIG. 25 shows in perspective an exemplary mobile area scanner incorporating double-ended directional detectors.

FIG. 25 is a notional sketch in perspective, partly cut-away 2502, of a mobile area radiation scanner 2501 incorporating the directional detector 2503 according to some embodiments. The area scanner 2501 can be a vehicle such as a trailer or a large van, enclosing an array comprising a large number of the directional detectors 2503. Preferably the detectors 2503 are of the double-ended type as shown in FIG. 11, which simultaneously scan for hidden sources on both the left and right side while the area scanner 2501 is in motion. The directional detectors 2503 may be spaced apart to minimize mutual shadowing, although this may not be a major concern because a hidden source is unlikely to be buried in the road in front or behind the area scanner 2501. However, if the weapon really is hidden in the roadway, the lowest rank of detectors 2503 can clearly reveal the threat when the area scanner 2501 passes over it.

The directional detectors 2503 may be configured for gamma ray detection or neutron detection according to some embodiments. Alternatively, some of the detectors 2503 can be of each type for simultaneous scanning of both gammas and neutrons. The directional detectors 2503 can detect and determine the location of a clandestine source of radiation, which can then be investigated in a secondary inspection. Very high sensitivity can be obtained by analyzing all of the detectors 2503 in parallel, so that a weak or well-shielded source can be detected even when each detector 2503 detects only a single particle above background. The array as a whole can yield a statistically significant increase, consistent with a particular source direction. It is not necessary to make the detectors 2503 rotatable, because each detector 2503 can determine the direction to the source from a single orientation. Also, the motion of the area scanner 2501 itself can provide a range of viewpoints as it travels through the area, so that the source can be localized in three dimensions by triangulation or by fitting to a source model for example. Optionally, a sheet of scintillator 2505 (such as plastic scintillator) may be mounted on the ceiling to reject cosmic rays according to some embodiments.

Figure 26:
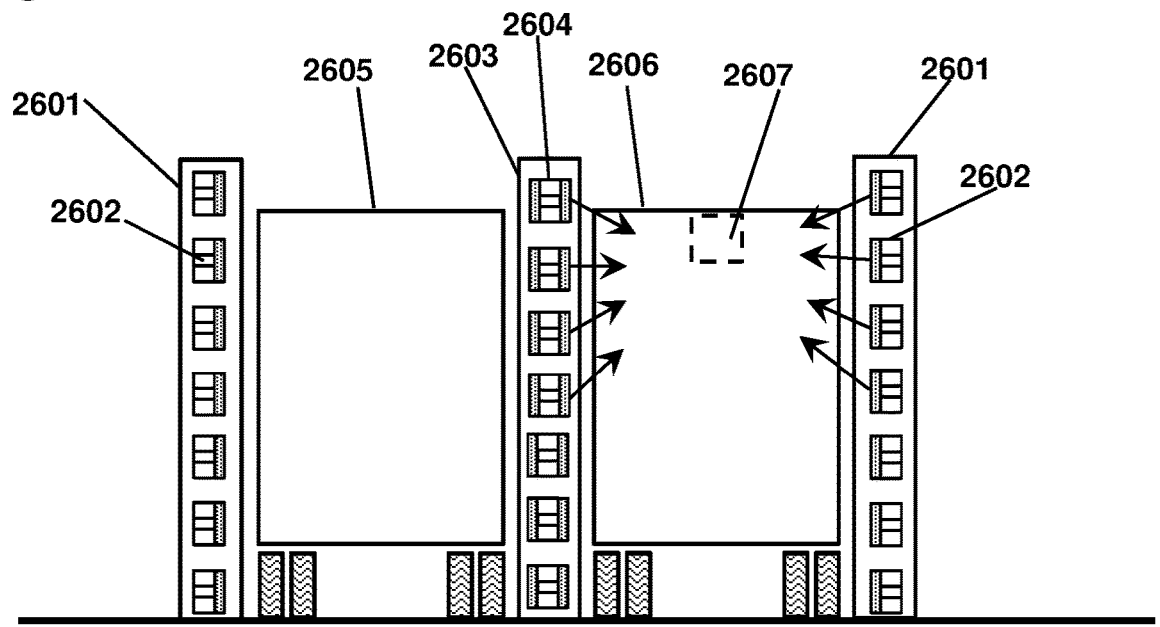
FIG. 26 shows an exemplary vehicle scanner system incorporating arrays of directional detectors.

FIG. 26 is a sketch of a drive-through vehicle inspection system comprising two side columns 2601 and a central column 2603 according to some embodiments. Each side column 2601 may contain an array of directional detectors 2602 such as that of FIG. 2, while the central column 2603 may contain an array of the double-ended detectors 2604 such as that of FIG. 11. A first truck 2605, which does not contain a threat, and a second truck 2606, which contains a shielded nuclear weapon 2607 mounted near the ceiling, are being scanned simultaneously. Radiation escaping from the shielded weapon 2607 is detected in the detectors 2602 and 2604, which then calculate the direction of the weapon 2607 relative to each detector 2602 and 2604. The calculated directions are indicated by arrows. Using data from the entire system, a central computer (not shown) can use triangulation to determine the exact three-dimensional location of the weapon 2607, including which vehicle has it.

Figure 27:
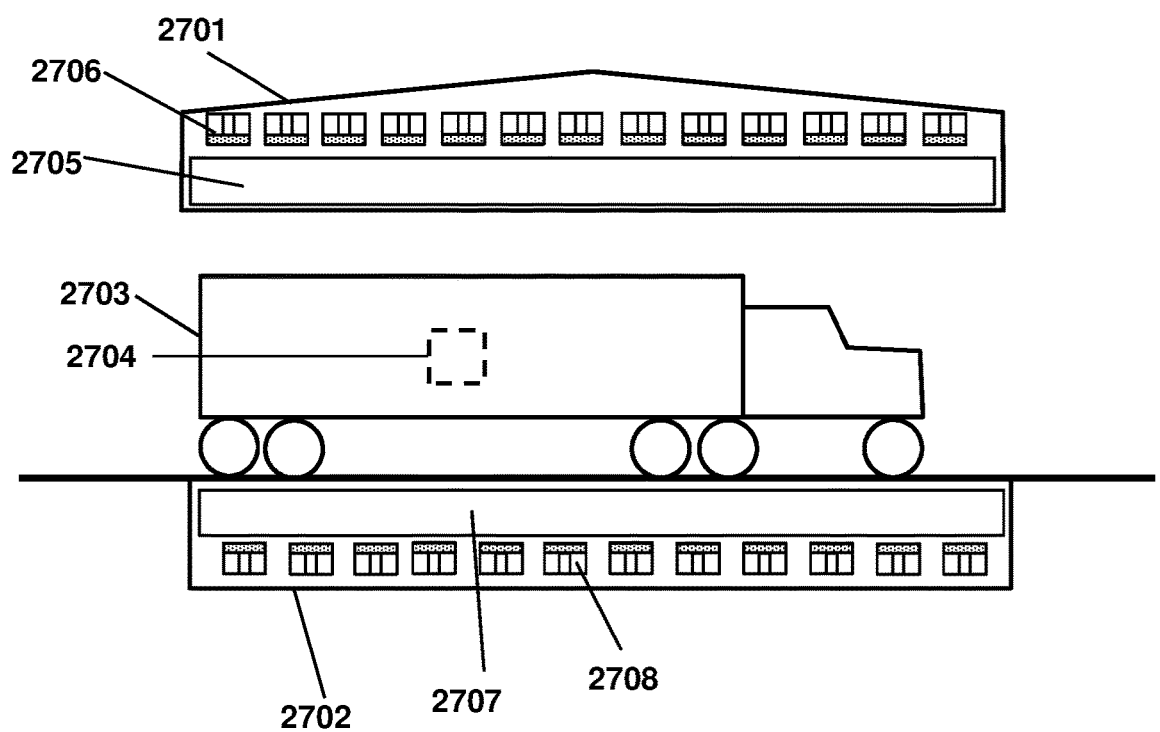
FIG. 27 shows an alternative vehicle scanner in which the directional detectors are added to a prior-art cosmic ray inspection system.

FIG. 27 is a sketch of an alternative drive-through vehicle and cargo scanner, in which a system that detects nuclear weapons using cosmic rays is improved by the addition of directional detectors. The cosmic ray system measures the tracks of cosmic rays, which scatter in a characteristic way in the heavy shielding and the high-Z core of the weapon. Thus the cosmic ray system is intended to detect the weapon or its shield by measuring the scattering angle of the cosmic ray track above and below the cargo.

The facility of FIG. 27 includes an overhead compartment 2701 and an underground compartment 2702. Each compartment 2701 and 2702 may include a cosmic ray tracking detector 2705 and 2707 which measures cosmic ray tracks and calculates the scattering angle of the cosmic rays. In addition, an array of directional detectors 2706 may be mounted in the upper compartment 2701 above the upper cosmic ray tracker 2705, and pointing down. A second array of the directional detectors 2708 may be mounted in the underground compartment 2402 under the lower cosmic ray tracker 2707, and pointing up. The directional detectors 2706 and 2708 may all be positioned entirely outside the cosmic ray tracking system 2705 and 2707, thereby avoiding any interference with the cosmic ray scattering measurement. A truck 2703 containing a shielded nuclear weapon 2704 is scanned by both systems simultaneously.

Cosmic rays (primarily GeV-range muons at sea level) easily penetrate the upper array of directional detectors 2706 before entering the upper tracker 2705. According to some embodiments, any scattering of cosmic rays in the upper array of directional detectors 2706 will have no effect at all on the cosmic ray measurement, because the cosmic ray measurement is sensitive only to scattering that occurs between the upper and lower tracker chambers 2705 and 2707. The cosmic ray trackers 2705 and 2707, meanwhile, do not interfere significantly with the directional detectors 2706 and 2708, because the cosmic ray trackers 2705 and 2707 typically comprise light, low-Z, non-hydrogenous materials which gamma rays and neutrons would readily pass through. Therefore, the two systems can operate simultaneously and independently with no degradation in performance of either system due to the presence of the other.

Synergy is a big advantage of the combined system, with directional detectors 2706 and 2708 and with the cosmic ray tracker system 2705 and 2707. If an adversary tries to reduce the emitted radiation signature by adding more shielding around a weapon, the cosmic ray scattering signature is increased and the weapon 2704 can be more easily detected by the tracking chambers 2705 and 2707. And if the adversary tries to reduce the cosmic ray scattering signature by reducing the amount of shielding, the directional radiation detectors 2706 and 2708 can more easily pick up the escaping radiation. Thus the combination of the two systems leaves an adversary with no design space for avoiding detection.

A directional detector as disclosed herein provides numerous advantages not previously available in any practical prior-art detector. According to various embodiments, the directional detector enables important applications ranging from cargo inspection, to walk-through portals, to portable survey meters, to mobile scanners searching for clandestine weapons in an urban environment, and many other critical applications. Using just a single set of detection data, the detector can indicate the source location in two dimensions, for neutrons or gamma rays or both. The detector can determine both the azimuthal and polar angles of the source relative to the detector axis, using only a single acquisition of scintillator data acquired at a single position of the detector. High detection efficiency can be provided because the shield is nearly surrounded by the scintillators. Light weight can be obtained since the shield is only thick enough to isolate the rod scintillators from each other, rather than blocking incoming particles. Since the scintillators can be mounted closely proximate to the shield, they reduce mass, eliminate wasted space, and sharpen the signal contrast. The shield can be shaped to reduce unnecessary weight, while still providing effective isolation of the rod scintillators.

Advanced radiation detection systems like that disclosed herein will be needed in the coming decades to protect innocent people from the threat of nuclear and radiological terrorism.

The embodiments and examples provided herein illustrate the principles of the invention and its practical application, thereby enabling one of ordinary skill in the art to best utilize the invention. Many other variations and modifications and other uses will become apparent to those skilled in the art, without departing from the scope of the invention, which is defined by the appended claims.

The invention claimed is:

1. A detector for detecting particles from a radioactive source, comprising:
   a shield comprising N shield plates, each shield plate being oriented parallel to a centrally positioned detector axis going from the back to the front of the detector;
   N rod scintillators configured to detect the particles, each rod scintillator being separated from all of the other rod scintillators by the shield plates; and
   a panel scintillator configured to detect the particles and positioned frontward of the rod scintillators;
   where N is an integer having a value of at least 3.

2. The detector of claim 1, including a processor configured to determine a direction toward the radioactive source in two dimensions.

3. The detector of claim 2, wherein the two respective dimensions are the azimuthal and polar angles of the source, or the horizontal and vertical angles of the source.

4. The detector of claim 1, wherein the shield protrudes frontward beyond the rod scintillators.

5. The detector of claim 1, wherein the rod scintillators are configured to detect at least 10% of the particles orthogonally incident thereon.

6. The detector of claim 1, wherein the panel scintillator has a higher detection efficiency for particles striking the panel scintillator laterally than for particles striking the panel scintillator from the front.

7. The detector of claim 1, wherein the rod scintillators are configured to detect particles that have scattered in the panel scintillator.

8. The detector of claim 1, wherein the panel scintillator has an angular sensitivity distribution that is symmetrical relative to the detector axis.

9. The detector of claim 1, further including a second panel scintillator positioned behind the rod scintillators.

10. The detector of claim 9, wherein the second panel scintillator comprises N separate portions, each portion being perpendicular to the detector axis and rearward of the rod scintillators.

11. The detector of claim 10, further including a processor configured to combine detection data from N separate portions comprising the second panel scintillator.

12. The detector of claim 10, further including N light sensors, each light sensor being configured to view one of the rod scintillators and one of the portions of the second panel scintillator respectively.

13. The detector of claim 1, wherein the shield comprises a scintillator.

14. The detector of claim 13, wherein the rod scintillators are configured to detect a first particle type and the shield is configured to detect a second particle type different from the first particle type.

15. The detector of claim 1, wherein the panel scintillator comprises N arms extending laterally from the detector axis.

16. The detector of claim 1, further including a display configured to indicate when the detector axis is substantially pointing toward the source location.

17. The detector of claim 1, wherein a portion of the shield comprises a scintillator configured to emit a first light pulse responsive to a gamma-generated electron, and a second light pulse responsive to a neutron-generated ion, wherein the first and second light pulses have detectably different wavelengths or pulse shapes.

18. The detector of claim 1, further including a camera configured to produce an image that indicates the calculated source location.

19. The detector of claim 18, wherein the image further includes an indicator indicating the location of the source on the image.

20. The detector of claim 18, wherein the camera further includes a variable-magnification lens configured to produce a plurality of images centered on the source location, wherein each image of the plurality has a different magnification.

* * * * *